(12) United States Patent  
Parsons et al.

(10) Patent No.: US 8,407,122 B2  
(45) Date of Patent: Mar. 26, 2013

(54) HIGH SPEED PROCESSING OF FINANCIAL INFORMATION USING FPGA DEVICES

(75) Inventors: Scott Parsons, St. Charles, MO (US); David E. Taylor, St. Louis, MO (US); David Vincent Schuehler, St. Louis, MO (US); Mark A. Franklin, St. Louis, MO (US); Roger D. Chamberlain, St. Louis, MO (US)

(73) Assignee: Exegy Incorporated, St. Louis, MO (US)

( * ) Notice: Subject to any disclaimer, the term of this patent is extended or adjusted under 35 U.S.C. 154(b) by 0 days.

(21) Appl. No.: 13/076,906

(22) Filed: Mar. 31, 2011

(65) Prior Publication Data

US 2011/0178911 A1 Jul. 21, 2011

Related U.S. Application Data

(62) Division of application No. 11/765,306, filed on Jun. 19, 2007, now Pat. No. 7,921,046.

(60) Provisional application No. 60/814,796, filed on Jun. 19, 2006.

(51) Int. Cl.  
*G06Q 40/00* (2006.01)

(52) U.S. Cl. ........................................ 705/35

(58) Field of Classification Search .................... None  
See application file for complete search history.

(56) References Cited

U.S. PATENT DOCUMENTS

| | | |
|---|---|---|
| 2,046,381 A | 7/1936 | Hicks et al. |
| 3,082,402 A | 3/1963 | Scantlin |
| 3,296,597 A | 1/1967 | Scantlin et al. |
| 3,573,747 A | 4/1971 | Adams et al. |
| 3,581,072 A | 5/1971 | Nymeyer |
| 3,601,808 A | 8/1971 | Vlack |
| 3,611,314 A | 10/1971 | Pritchard, Jr. et al. |
| 3,729,712 A | 4/1973 | Glassman |
| 3,824,375 A | 7/1974 | Gross et al. |
| 3,848,235 A | 11/1974 | Lewis et al. |
| 3,906,455 A | 9/1975 | Houston et al. |
| 4,081,607 A | 3/1978 | Vitols et al. |
| 4,298,898 A | 11/1981 | Cardot |
| 4,300,193 A | 11/1981 | Bradley et al. |
| 4,314,356 A | 2/1982 | Scarbrough |
| 4,385,393 A | 5/1983 | Chaure et al. |
| 4,412,287 A | 10/1983 | Braddock, III |
| 4,464,718 A | 8/1984 | Dixon et al. |
| 4,550,436 A | 10/1985 | Freeman et al. |

(Continued)

FOREIGN PATENT DOCUMENTS

| | | |
|---|---|---|
| EP | 0573991 | 12/1993 |
| EP | 0880088 | 11/1996 |

(Continued)

OTHER PUBLICATIONS

Gokhale, Maya B. & Graham, Paul S. Reconfigurable Computing: Accelerating Computation With Field-Programmable Gate Arrays. Springer. 2005. pp. 12-15.*

(Continued)

*Primary Examiner* — Jason M Borlinghaus  
(74) *Attorney, Agent, or Firm* — Thompson Coburn LLP

(57) ABSTRACT

Methods and systems for processing financial market data using reconfigurable logic are disclosed. Various functional operations to be performed on the financial market data can be implemented in firmware pipelines to accelerate the speed of processing. Also, a combination of software logic and firmware logic can be used to efficiently control and manage the high speed flow of financial market data to and from the reconfigurable logic.

42 Claims, 20 Drawing Sheets

U.S. PATENT DOCUMENTS

| | | |
|---|---|---|
| 4,674,044 A | 6/1987 | Kalmus et al. |
| 4,823,306 A | 4/1989 | Barbic et al. |
| 4,903,201 A | 2/1990 | Wagner |
| 4,941,178 A | 7/1990 | Chuang |
| 5,023,910 A | 6/1991 | Thomson |
| 5,038,284 A | 8/1991 | Kramer |
| 5,050,075 A | 9/1991 | Herman et al. |
| 5,063,507 A | 11/1991 | Lindsey et al. |
| 5,077,665 A | 12/1991 | Silverman et al. |
| 5,101,353 A | 3/1992 | Lupien et al. |
| 5,101,424 A | 3/1992 | Clayton et al. |
| 5,126,936 A | 6/1992 | Champion et al. |
| 5,140,692 A | 8/1992 | Morita |
| 5,161,103 A | 11/1992 | Kosaka et al. |
| 5,163,131 A | 11/1992 | Row et al. |
| 5,179,626 A | 1/1993 | Thomson |
| 5,226,165 A | 7/1993 | Martin |
| 5,243,655 A | 9/1993 | Wang |
| 5,249,292 A | 9/1993 | Chiappa |
| 5,255,136 A | 10/1993 | Machado et al. |
| 5,258,908 A | 11/1993 | Hartheimer et al. |
| 5,265,065 A | 11/1993 | Turtle |
| 5,267,148 A | 11/1993 | Kosaka et al. |
| 5,270,922 A | 12/1993 | Higgins |
| 5,297,032 A | 3/1994 | Trojan et al. |
| 5,313,560 A | 5/1994 | Maruoka et al. |
| 5,315,634 A | 5/1994 | Tanaka et al. |
| 5,319,776 A | 6/1994 | Hile et al. |
| 5,327,521 A | 7/1994 | Savic et al. |
| 5,339,411 A | 8/1994 | Heaton, Jr. |
| 5,371,794 A | 12/1994 | Diffie et al. |
| 5,375,055 A | 12/1994 | Togher et al. |
| 5,388,259 A | 2/1995 | Fleischman et al. |
| 5,396,253 A | 3/1995 | Chia |
| 5,404,488 A | 4/1995 | Kerrigan et al. |
| 5,418,951 A | 5/1995 | Damashek |
| 5,432,822 A | 7/1995 | Kaewell, Jr. |
| 5,461,712 A | 10/1995 | Chelstowski et al. |
| 5,465,353 A | 11/1995 | Hull et al. |
| 5,481,735 A | 1/1996 | Mortensen et al. |
| 5,488,725 A | 1/1996 | Turtle et al. |
| 5,497,317 A | 3/1996 | Hawkins et al. |
| 5,497,488 A | 3/1996 | Akizawa et al. |
| 5,500,793 A | 3/1996 | Deming, Jr. et al. |
| 5,517,642 A | 5/1996 | Bezek et al. |
| 5,544,352 A | 8/1996 | Egger |
| 5,546,578 A | 8/1996 | Takada |
| 5,596,569 A | 1/1997 | Madonna et al. |
| 5,619,574 A | 4/1997 | Johnson et al. |
| 5,651,125 A | 7/1997 | Witt et al. |
| 5,684,980 A | 11/1997 | Casselman |
| 5,701,464 A | 12/1997 | Aucsmith |
| 5,712,942 A | 1/1998 | Jennings et al. |
| 5,721,898 A | 2/1998 | Beardsley et al. |
| 5,740,244 A | 4/1998 | Indeck et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,809,483 A | 9/1998 | Broka et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,845,266 A | 12/1998 | Lupien et al. |
| 5,857,176 A | 1/1999 | Ginsberg |
| 5,864,738 A | 1/1999 | Kessler et al. |
| 5,870,730 A | 2/1999 | Furuya et al. |
| 5,873,071 A | 2/1999 | Ferstenberg et al. |
| 5,884,286 A | 3/1999 | Daughtery, III |
| 5,905,974 A | 5/1999 | Fraser et al. |
| 5,913,211 A | 6/1999 | Nitta |
| 5,930,753 A | 7/1999 | Potamianos et al. |
| 5,943,421 A | 8/1999 | Grabon |
| 5,943,429 A | 8/1999 | Händel |
| 5,963,923 A | 10/1999 | Garber |
| 5,978,801 A | 11/1999 | Yuasa |
| 5,987,432 A * | 11/1999 | Zusman et al. .................. 705/35 |
| 5,991,881 A | 11/1999 | Conklin et al. |
| 5,995,963 A | 11/1999 | Nanba et al. |
| 6,006,264 A | 12/1999 | Colby et al. |
| 6,016,483 A | 1/2000 | Rickard et al. |
| 6,023,755 A | 2/2000 | Casselman |
| 6,023,760 A | 2/2000 | Karttunen |
| 6,028,939 A | 2/2000 | Yin |
| 6,044,407 A | 3/2000 | Jones et al. |
| 6,058,391 A | 5/2000 | Gardner |
| 6,061,662 A | 5/2000 | Makivic |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,084,584 A | 7/2000 | Nahi et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,173,270 B1 | 1/2001 | Cristofich et al. |
| 6,173,276 B1 | 1/2001 | Kant et al. |
| 6,178,494 B1 | 1/2001 | Casselman |
| 6,195,024 B1 | 2/2001 | Fallon |
| 6,226,676 B1 | 5/2001 | Crump et al. |
| 6,236,980 B1 | 5/2001 | Reese |
| 6,263,321 B1 | 7/2001 | Daughtery, III |
| 6,272,616 B1 | 8/2001 | Fernando et al. |
| 6,279,113 B1 | 8/2001 | Vaidya |
| 6,279,140 B1 | 8/2001 | Slane |
| 6,289,440 B1 | 9/2001 | Casselman |
| 6,295,530 B1 | 9/2001 | Ritchie et al. |
| 6,304,858 B1 | 10/2001 | Mosler et al. |
| 6,309,424 B1 | 10/2001 | Fallon |
| 6,317,728 B1 | 11/2001 | Kane |
| 6,317,795 B1 | 11/2001 | Malkin et al. |
| 6,321,258 B1 | 11/2001 | Stollfus et al. |
| 6,336,150 B1 | 1/2002 | Ellis et al. |
| 6,339,819 B1 | 1/2002 | Huppenthal et al. |
| 6,370,592 B1 | 4/2002 | Kumpf |
| 6,370,645 B1 | 4/2002 | Lee et al. |
| 6,377,942 B1 | 4/2002 | Hinsley et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,415,269 B1 | 7/2002 | Dinwoodie |
| 6,418,419 B1 | 7/2002 | Nieboer et al. |
| 6,430,272 B1 | 8/2002 | Maruyama et al. |
| 6,456,982 B1 | 9/2002 | Pilipovic |
| 6,463,474 B1 | 10/2002 | Fuh et al. |
| 6,499,107 B1 | 12/2002 | Gleichauf et al. |
| 6,535,868 B1 | 3/2003 | Galeazzi et al. |
| 6,546,375 B1 | 4/2003 | Pang et al. |
| 6,578,147 B1 | 6/2003 | Shanklin et al. |
| 6,581,098 B1 | 6/2003 | Kumpf |
| 6,594,643 B1 | 7/2003 | Freeny, Jr. |
| 6,597,812 B1 | 7/2003 | Fallon et al. |
| 6,601,094 B1 | 7/2003 | Mentze et al. |
| 6,601,104 B1 | 7/2003 | Fallon |
| 6,604,158 B1 | 8/2003 | Fallon |
| 6,624,761 B2 | 9/2003 | Fallon |
| 6,625,150 B1 | 9/2003 | Yu |
| 6,691,301 B2 | 2/2004 | Bowen |
| 6,704,816 B1 | 3/2004 | Burke |
| 6,711,558 B1 | 3/2004 | Indeck et al. |
| 6,765,918 B1 | 7/2004 | Dixon et al. |
| 6,766,304 B2 | 7/2004 | Kemp, II et al. |
| 6,772,132 B1 | 8/2004 | Kemp, II et al. |
| 6,772,136 B2 | 8/2004 | Kant et al. |
| 6,772,345 B1 | 8/2004 | Shetty |
| 6,778,968 B1 | 8/2004 | Gulati |
| 6,785,677 B1 | 8/2004 | Fritchman |
| 6,804,667 B1 | 10/2004 | Martin |
| 6,807,156 B1 | 10/2004 | Veres et al. |
| 6,820,129 B1 | 11/2004 | Courey, Jr. |

| Patent | Date | Inventor |
|---|---|---|
| 6,839,686 B1 | 1/2005 | Galant |
| 6,847,645 B1 | 1/2005 | Potter et al. |
| 6,850,906 B1 | 2/2005 | Chadha et al. |
| 6,877,044 B2 | 4/2005 | Lo et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,978,223 B2 | 12/2005 | Milliken |
| 6,981,054 B1 | 12/2005 | Krishna |
| 7,003,488 B2 | 2/2006 | Dunne et al. |
| 7,024,384 B2 | 4/2006 | Daughtery, III |
| 7,046,848 B1 | 5/2006 | Olcott |
| 7,065,475 B1 | 6/2006 | Brundobler |
| 7,089,206 B2 | 8/2006 | Martin |
| 7,093,023 B2 | 8/2006 | Lockwood et al. |
| 7,099,838 B1 | 8/2006 | Gastineau et al. |
| 7,103,569 B1 | 9/2006 | Groveman et al. |
| 7,117,280 B2 | 10/2006 | Vasudevan |
| 7,124,106 B1 | 10/2006 | Stallaert et al. |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,161,506 B2 | 1/2007 | Fallon |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,222,114 B1 | 5/2007 | Chan et al. |
| 7,224,185 B2 | 5/2007 | Campbell et al. |
| 7,225,188 B1 | 5/2007 | Gai et al. |
| 7,228,289 B2 | 6/2007 | Brumfield et al. |
| 7,249,118 B2 | 7/2007 | Sandler et al. |
| 7,251,629 B1 | 7/2007 | Marynowski et al. |
| 7,257,842 B2 | 8/2007 | Barton et al. |
| 7,277,887 B1 | 10/2007 | Burrows et al. |
| 7,287,037 B2 | 10/2007 | An et al. |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,356,498 B2 | 4/2008 | Kaminsky et al. |
| 7,363,277 B1 | 4/2008 | Dutta et al. |
| 7,378,992 B2 | 5/2008 | Fallon |
| 7,386,046 B2 | 6/2008 | Fallon et al. |
| 7,406,444 B2 | 7/2008 | Eng et al. |
| 7,411,957 B2 | 8/2008 | Stacy et al. |
| 7,417,568 B2 | 8/2008 | Fallon et al. |
| 7,454,418 B1 | 11/2008 | Wang |
| 7,457,834 B2 | 11/2008 | Jung et al. |
| 7,461,064 B2 | 12/2008 | Fontoura et al. |
| 7,478,431 B1 | 1/2009 | Nachenberg |
| 7,487,327 B1 | 2/2009 | Chang et al. |
| 7,496,108 B2 | 2/2009 | Biran et al. |
| 7,558,753 B2 | 7/2009 | Neubert et al. |
| 7,558,925 B2 | 7/2009 | Bouchard et al. |
| 7,565,525 B2 | 7/2009 | Vorbach et al. |
| 7,580,719 B2 | 8/2009 | Karmarkar |
| 7,587,476 B2 | 9/2009 | Sato |
| 7,603,303 B1 | 10/2009 | Kraus et al. |
| 7,617,291 B2 | 11/2009 | Fan et al. |
| 7,636,703 B2 | 12/2009 | Taylor |
| 7,660,761 B2 | 2/2010 | Zhou et al. |
| 7,668,849 B1 | 2/2010 | Narancic et al. |
| 7,685,121 B2 | 3/2010 | Brown et al. |
| 7,701,945 B2 | 4/2010 | Roesch et al. |
| 7,714,747 B2 | 5/2010 | Fallon |
| 7,761,459 B1 | 7/2010 | Zhang et al. |
| 7,788,293 B2 | 8/2010 | Pasztor et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,213 B2 | 3/2011 | Monroe et al. |
| 7,908,259 B2 | 3/2011 | Branscome et al. |
| 7,917,299 B2 | 3/2011 | Buhler et al. |
| 7,921,046 B2 | 4/2011 | Parsons |
| 7,945,528 B2 | 5/2011 | Cytron et al. |
| 7,949,650 B2 | 5/2011 | Indeck et al. |
| 7,953,743 B2 | 5/2011 | Indeck et al. |
| 7,954,114 B2 | 5/2011 | Chamberlain et al. |
| 7,991,667 B2 | 8/2011 | Kraus et al. |
| 8,015,099 B2 | 9/2011 | Reid |
| 8,024,253 B2 | 9/2011 | Peterffy et al. |
| 8,027,893 B1 | 9/2011 | Burrows et al. |
| 8,046,283 B2 | 10/2011 | Burns et al. |
| 8,069,102 B2 | 11/2011 | Indeck et al. |
| 8,073,763 B1 | 12/2011 | Merrin et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 2001/0013048 A1 | 8/2001 | Imbert de Tremiolles et al. |
| 2001/0042040 A1 | 11/2001 | Keith |
| 2001/0047473 A1 | 11/2001 | Fallon |
| 2001/0056547 A1 | 12/2001 | Dixon |
| 2002/0010825 A1 | 1/2002 | Wilson |
| 2002/0019812 A1* | 2/2002 | Board et al. .................... 705/51 |
| 2002/0023010 A1 | 2/2002 | Rittmaster et al. |
| 2002/0069375 A1 | 6/2002 | Bowen |
| 2002/0072893 A1 | 6/2002 | Wilson |
| 2002/0080871 A1 | 6/2002 | Fallon et al. |
| 2002/0082967 A1 | 6/2002 | Kaminsky et al. |
| 2002/0100029 A1 | 7/2002 | Bowen |
| 2002/0101425 A1 | 8/2002 | Hamid |
| 2002/0105911 A1 | 8/2002 | Pruthi et al. |
| 2002/0129140 A1 | 9/2002 | Peled et al. |
| 2002/0138376 A1 | 9/2002 | Hinkle |
| 2002/0143521 A1 | 10/2002 | Call |
| 2002/0150248 A1 | 10/2002 | Kovacevic |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0169873 A1 | 11/2002 | Zodnik |
| 2002/0180742 A1 | 12/2002 | Hamid |
| 2002/0199173 A1 | 12/2002 | Bowen |
| 2003/0009411 A1 | 1/2003 | Ram et al. |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033240 A1 | 2/2003 | Balson et al. |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Applcby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055658 A1 | 3/2003 | RuDusky |
| 2003/0055769 A1 | 3/2003 | RuDusky |
| 2003/0055770 A1 | 3/2003 | RuDusky |
| 2003/0055771 A1 | 3/2003 | RuDusky |
| 2003/0055777 A1 | 3/2003 | Ginsberg |
| 2003/0061409 A1 | 3/2003 | RuDusky |
| 2003/0065607 A1 | 4/2003 | Satchwell |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0078865 A1 | 4/2003 | Lee |
| 2003/0079060 A1 | 4/2003 | Dunlop |
| 2003/0093347 A1 | 5/2003 | Gray |
| 2003/0097481 A1 | 5/2003 | Richter |
| 2003/0099254 A1 | 5/2003 | Richter |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |

| | | |
|---|---|---|
| 2003/0121010 A1 | 6/2003 | Aubury |
| 2003/0126065 A1 | 7/2003 | Eng et al. |
| 2003/0140337 A1 | 7/2003 | Aubury |
| 2003/0163715 A1 | 8/2003 | Wong |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0191876 A1 | 10/2003 | Fallon |
| 2003/0208430 A1 | 11/2003 | Gershon |
| 2003/0221013 A1 | 11/2003 | Lockwood et al. |
| 2003/0233302 A1 | 12/2003 | Weber et al. |
| 2004/0015502 A1 | 1/2004 | Alexander et al. |
| 2004/0015633 A1 | 1/2004 | Smith |
| 2004/0019703 A1 | 1/2004 | Burton |
| 2004/0028047 A1 | 2/2004 | Hou et al. |
| 2004/0034587 A1 | 2/2004 | Amberson et al. |
| 2004/0049596 A1 | 3/2004 | Schuehler et al. |
| 2004/0059666 A1 | 3/2004 | Waelbroeck et al. |
| 2004/0064737 A1 | 4/2004 | Milliken et al. |
| 2004/0111632 A1 | 6/2004 | Halperin |
| 2004/0162826 A1 | 8/2004 | Wyschogrod et al. |
| 2004/0177340 A1 | 9/2004 | Hsu et al. |
| 2004/0186804 A1 | 9/2004 | Chakraborty et al. |
| 2004/0186814 A1 | 9/2004 | Chalermkraivuth et al. |
| 2004/0199448 A1 | 10/2004 | Chalermkraivuth et al. |
| 2004/0205149 A1 | 10/2004 | Dillon et al. |
| 2005/0005145 A1 | 1/2005 | Teixeira |
| 2005/0033672 A1 | 2/2005 | Lasry et al. |
| 2005/0044344 A1 | 2/2005 | Stevens |
| 2005/0080649 A1 | 4/2005 | Alvarez et al. |
| 2005/0086520 A1 | 4/2005 | Dharmapurikar et al. |
| 2005/0091142 A1 | 4/2005 | Renton et al. |
| 2005/0097027 A1 | 5/2005 | Kavanaugh |
| 2005/0131790 A1 | 6/2005 | Benzschawel et al. |
| 2005/0135608 A1 | 6/2005 | Zheng |
| 2005/0187844 A1 | 8/2005 | Chalermkraivuth et al. |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |
| 2005/0195832 A1 | 9/2005 | Dharmapurikar et al. |
| 2005/0197938 A1 | 9/2005 | Davie et al. |
| 2005/0197939 A1 | 9/2005 | Davie et al. |
| 2005/0197948 A1 | 9/2005 | Davie et al. |
| 2005/0216384 A1 | 9/2005 | Partlow et al. |
| 2005/0229254 A1 | 10/2005 | Singh et al. |
| 2005/0243824 A1 | 11/2005 | Abbazia et al. |
| 2005/0267836 A1 | 12/2005 | Crosthwaite et al. |
| 2005/0283423 A1 | 12/2005 | Moser et al. |
| 2005/0283743 A1 | 12/2005 | Mulholland et al. |
| 2006/0020536 A1 | 1/2006 | Renton et al. |
| 2006/0020715 A1 | 1/2006 | Jungck |
| 2006/0031154 A1 | 2/2006 | Noviello et al. |
| 2006/0031156 A1 | 2/2006 | Noviello et al. |
| 2006/0047636 A1 | 3/2006 | Mohania et al. |
| 2006/0053295 A1 | 3/2006 | Madhusudan et al. |
| 2006/0059064 A1 | 3/2006 | Glinberg et al. |
| 2006/0059065 A1 | 3/2006 | Glinberg et al. |
| 2006/0059066 A1 | 3/2006 | Glinberg et al. |
| 2006/0059067 A1 | 3/2006 | Glinberg et al. |
| 2006/0059068 A1 | 3/2006 | Glinberg et al. |
| 2006/0059069 A1 | 3/2006 | Glinberg et al. |
| 2006/0059083 A1 | 3/2006 | Friesen et al. |
| 2006/0129745 A1 | 6/2006 | Thiel et al. |
| 2006/0143099 A1 | 6/2006 | Partlow et al. |
| 2006/0242123 A1 | 10/2006 | Williams, Jr. |
| 2006/0259417 A1 | 11/2006 | Marynowski et al. |
| 2006/0269148 A1 | 11/2006 | Farber et al. |
| 2006/0282369 A1 | 12/2006 | White |
| 2006/0294059 A1 | 12/2006 | Chamberlain et al. |
| 2007/0011183 A1 | 1/2007 | Langseth et al. |
| 2007/0011687 A1 | 1/2007 | Ilik et al. |
| 2007/0061241 A1 | 3/2007 | Jovanovic et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112837 A1 | 5/2007 | Houh et al. |
| 2007/0118457 A1 | 5/2007 | Peterffy et al. |
| 2007/0118500 A1 | 5/2007 | Indeck et al. |
| 2007/0130140 A1 | 6/2007 | Cytron et al. |
| 2007/0156574 A1 | 7/2007 | Marynowski et al. |
| 2007/0174841 A1 | 7/2007 | Chamberlain et al. |
| 2007/0179935 A1 | 8/2007 | Lee et al. |
| 2007/0209068 A1 | 9/2007 | Ansari et al. |
| 2007/0237327 A1 | 10/2007 | Taylor et al. |
| 2007/0244859 A1 | 10/2007 | Trippe et al. |
| 2007/0260602 A1 | 11/2007 | Taylor |
| 2007/0277036 A1 | 11/2007 | Chamberlain et al. |
| 2007/0294157 A1 | 12/2007 | Singla et al. |
| 2008/0082502 A1 | 4/2008 | Gupta |
| 2008/0084573 A1 | 4/2008 | Horowitz et al. |
| 2008/0086274 A1 | 4/2008 | Chamberlain et al. |
| 2008/0097893 A1 | 4/2008 | Walsky et al. |
| 2008/0104542 A1 | 5/2008 | Cohen et al. |
| 2008/0109413 A1 | 5/2008 | Indeck et al. |
| 2008/0114724 A1 | 5/2008 | Indeck et al. |
| 2008/0114725 A1 | 5/2008 | Indeck et al. |
| 2008/0114760 A1 | 5/2008 | Indeck et al. |
| 2008/0126320 A1 | 5/2008 | Indeck et al. |
| 2008/0133453 A1 | 6/2008 | Indeck et al. |
| 2008/0133519 A1 | 6/2008 | Indeck et al. |
| 2008/0189251 A1 | 8/2008 | Branscome et al. |
| 2008/0275805 A1 | 11/2008 | Hecht |
| 2009/0182683 A1 | 7/2009 | Taylor et al. |
| 2009/0262741 A1 | 10/2009 | Jungck et al. |
| 2009/0287628 A1 | 11/2009 | Indeck et al. |
| 2010/0005036 A1 | 1/2010 | Kraus et al. |
| 2011/0066832 A1 | 3/2011 | Casselman et al. |
| 2011/0125960 A1 | 5/2011 | Casselman |
| 2011/0178912 A1 | 7/2011 | Parsons et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179050 A1 | 7/2011 | Parsons et al. |
| 2011/0184844 A1 | 7/2011 | Parsons et al. |
| 2011/0199243 A1 | 8/2011 | Fallon et al. |
| 2011/0231446 A1 | 9/2011 | Buhler et al. |
| 2011/0246353 A1 | 10/2011 | Kraus et al. |
| 2011/0252008 A1 | 10/2011 | Chamberlain et al. |
| 2011/0295967 A1 | 12/2011 | Wang et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0109849 A1 | 5/2012 | Chamberlain et al. |
| 2012/0110316 A1 | 5/2012 | Chamberlain et al. |
| 2012/0116998 A1 | 5/2012 | Indeck et al. |
| 2012/0130922 A1 | 5/2012 | Indeck et al. |
| 2012/0215801 A1 | 8/2012 | Indeck et al. |
| 2012/0246052 A1 | 9/2012 | Taylor et al. |

FOREIGN PATENT DOCUMENTS

| | | |
|---|---|---|
| EP | 0851358 A | 7/1998 |
| EP | 0887723 | 12/1998 |
| EP | 0911738 A | 4/1999 |
| JP | 09145544 A | 6/1997 |
| JP | 11316765 A | 11/1999 |
| JP | 2000286715 A | 10/2000 |
| JP | 2001268071 A | 9/2001 |
| JP | 2002101089 A | 4/2002 |
| WO | 9010910 | 9/1990 |
| WO | 9409443 A1 | 4/1994 |
| WO | 9737735 | 10/1997 |
| WO | 0041136 A1 | 7/2000 |
| WO | 0122425 A | 3/2001 |
| WO | 0180082 A2 | 10/2001 |
| WO | 0180558 | 10/2001 |
| WO | 02061525 | 8/2002 |
| WO | 03100650 | 4/2003 |
| WO | 03036845 | 5/2003 |
| WO | 03100662 | 12/2003 |
| WO | 2004017604 | 2/2004 |
| WO | 2004042560 A | 5/2004 |
| WO | 2004042561 A | 5/2004 |
| WO | 2004042562 | 5/2004 |
| WO | 2004042574 A | 5/2004 |

| | | | |
|---|---|---|---|
| WO | 2005017708 | A | 2/2005 |
| WO | 2005026925 | | 3/2005 |
| WO | 2005048134 | A | 5/2005 |
| WO | 2006023948 | | 3/2006 |
| WO | 2006096324 | | 9/2006 |
| WO | 2007064685 | | 6/2007 |
| WO | 2007087507 | | 8/2007 |
| WO | 2008022036 | | 2/2008 |
| WO | 2009089467 | A2 | 7/2009 |
| WO | 2009140363 | A1 | 11/2009 |
| WO | 2010077829 | | 7/2010 |

OTHER PUBLICATIONS

Gokhale, Maya B. & Graham, Paul S. Reconfigurable Computing: Accelerating Computation With Field-Programmable Gate Arrays. Springer. 2005. pp. 1-36.*
"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20 Waterman%20Whitepaper.pdf.
"ACTIV Financial Announces Hardware Based Market Data Feed Processing Strategy", for Release on Apr. 2, 2007, 2 pages.
"ACTIV Financial Delivers Accelerated Market Data Feed", Apr. 6, 2007, byline of Apr. 2, 2007, downloaded from http://hpcwire.com/hpc.1346816.html on Jun. 19, 2007, 3 pages.
"DRC, Exegy Announce Joint Development Agreement", Jun. 8, 2007, byline of Jun. 4, 2007; downloaded from http://www.hpcwire.com/hpc/1595644.html on Jun. 19, 2007, 3 pages.
"Lucent Technologies Delivers "PayloadPlus" Network Processors for Programmable, MultiProtocol, OC-48c Processing", Lucent Technologies Press Release, downloaded from http://www.lucent.com/press/1000/0010320.meb.html on Mar. 21, 2002.
"Overview, Field Programmable Port Extender", Jan. 2002 Gigabit Workshop Tutorial, Washington University, St. Louis, MO, Jan. 3-4, 2002, pp. 1-4.
"Payload Plus™ Agere System Interface", Agere Systems Product Brief, Jun. 2001, downloaded from Internet, Jan. 2002, pp. 1-6.
"RFC793: Transmission Control Protocol, Darpa Internet Program, Protocol Specification", Sep. 1981.
"Technology Overview", Data Search Systems Incorporated, downloaded from the http://www.datasearchsystems.com/tech.htm on Apr. 19, 2004.
"The Field-Programmable Port Extender (FPX)", downloaded from http://www.arl.wustl.edu/arl/ in Mar. 2002.
Aldwairi et al., "Configurable String Matching Hardware for Speeding up Intrusion Detection", SIRARCH Comput. Archit. News, vol. 33, No. 1, pp. 99-107, Mar. 2005.
Amanuma et al., "A FPGA Architecture for High Speed Computation", Proceedings of 60th Convention Architecture, Software Science, Engineering, Mar. 14, 2000, pp. 1-163-1-164, Information Processing Society, Japan.
Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.
Anonymous, "Method for Allocating Computer Disk Space to a File of Known Size", IBM Technical Disclosure Bulletin, vol. 27, No. 10B, Mar. 1, 1985, New York.
Arnold et al., "The Splash 2 Processor and Applications", Proceedings 1993 IEEE International Conference on Computer Design: VLSI in Computers and Processors (ICCD '93), Oct. 3, 1993, pp. 482-485, IEEE Computer Society, Cambridge, MA USA.
Artan et al., "Multi-packet Signature Detection using Prefix Bloom Filters", 2005, IEEE, pp. 1811-1816.
Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.
Baboescu et al., "Scalable Packet Classification," SIGCOMM'01, Aug. 27-31, 2001, pp. 199-210, San Diego, California, USA; http://www.ecse.rpi.edu/homepages/shivkuma/teaching/sp2001/readings/baboescu-pkt-classification.pdf.

Baer, "Computer Systems Architecture", 1980, pp. 262-265; Computer Science Press, Potomac, Maryland.
Baeza-Yates et al., "New and Faster Filters for Multiple Approximate String Matching", Random Structures and Algorithms (RSA), Jan. 2002, pp. 23-49, vol. 20, No. 1.
Baker et al., "High-throughput Linked-Pattern Matching for Intrusion Detection Systems", ANCS 2005: Proceedings of the 2005 Symposium on Architecture for Networking and Communications Systems, pp. 193-202, ACM Press, 2005.
Barone-Adesi et al., "Efficient Analytic Approximation of American Option Values", Journal of Finance, vol. 42, No. 2 (Jun. 1987), pp. 301-320.
Behrens et al., "BLASTN Redundancy Filter in Reprogrammable Hardware," Final Project Submission, Fall 2003, Department of Computer Science and Engineering, Washington University.
Berk, "JLex: A lexical analyzer generator for Java™", downloaded from http://www.cs.princeton.edu/~appel/modern/java/Jlex/ in Jan. 2002, pp. 1-18.
Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.
Braun et al., "Layered Protocol Wrappers for Internet Packet Processing in Reconfigurable Hardware", Proceedings of Hot Interconnects 9 (Hotl-9) Stanford, CA, Aug. 22-24, 2001, pp. 93-98.
Braun et al., "Protocol Wrappers for Layered Network Packet Processing in Reconfigurable Hardware", IEEE Micro, Jan.-Feb. 2002, pp. 66-74.
Cavnar et al., "N-Gram-Based Text Categorization", Proceedings of SDAIR-94, 3rd Annual Symposium on Document Analysis and Information Retrieval, Las Vegas, pp. 161-175, 1994.
Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.
Chamberlain et al., "The Mercury System: Embedding Computation Into Disk Drives", 7th High Performance Embedded Computing Workshop, Sep. 2003, Boston, MA.
Chamberlain et al., "The Mercury System: Exploiting Truly Fast Hardware for Data Search", Proc. of Workshop Storage Network Architecture and Parallel I/Os, Sep. 2003, New Orleans, LA.
Cho et al., "Deep Packet Filter with Dedicated Logic and Read Only Memories", 12th Annual IEEE Symposium on Field-Programmable Custom Computing Machines, Apr. 2004.
Choi et al., "Design of a Flexible Open Platform for High Performance Active Networks", Allerton Conference, 1999, Champaign, IL.
Cholleti, "Storage Allocation in Bounded Time", MS Thesis, Dept. of Computer Science and Engineering, Washington Univeristy, St. Louis, MO (Dec. 2002). Available as Washington University Technical Report WUCSE-2003-2.
Clark et al., "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.
Cloutier et al., "VIP: An FPGA-Based Processor for Image Processing and Neural Networks", Proceedings of Fifth International Conference on Microelectronics for Neural Networks, Feb. 12, 1996, pp. 330-336, Los Alamitos, California.
Compton et al., "Configurable Computing: A Survey of Systems and Software", Technical Report, Northwestern University, Dept. of ECE, 1999.
Compton et al., "Reconfigurable Computing: A Survey of Systems and Software", Technical Report, Northwestern University, Dept. of ECE, 1999, presented by Yi-Gang Tai.
Cong et al., "An Optional Technology Mapping Algorithm for Delay Optimization in Lookup-Table Based FPGA Designs", IEEE, 1992, pp. 48-53.
Crosman, "Who Will Cure Your Data Latency?", Storage & Servers, Jun. 20, 2007, URL: http://www.networkcomputing.com/article/printFullArticleSrc.jhtml?article ID=199905630.
Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters," IEEE Micro, Jan.-Feb. 2004, vol. 24, Issue: 1, pp. 52-61.

Dharmapurikar et al., "Deep Packet Inspection Using Parallel Bloom Filters," Symposium on High Performance Interconnects (Hotl), Stanford, California, 2003, pp. 44-51.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Dharmapurikar, "Fast and Scalable Pattern Matching for Content Filtering", ACM, ANCS 05, 2005, pp. 183-192.

Ebeling et al., "RaPiD—Reconfigurable Pipelined Datapath", University of Washington, Dept. of Computer Science and Engineering, Sep. 23, 1996, Seattle, WA.

Sidhu et al., "String Matching on Multicontext FPGAs Using Self-Reconfiguration", FPGA '99: Proceedings of the 1999 ACM/SIGDA 7th International Symposium on Field Programmable Gate Arrays, Feb. 1999, pp. 217-226.

Singh et al., "The EarlyBird System for Real-Time Detection on Unknown Worms", Technical report CS2003-0761, Aug. 2003.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Summons to Attend Oral Proceedings for EP Application 03729000.4 dated Mar. 17, 2010.

Tan et al., "A High Throughput String Matching Architecture for Intrusion Detection and Prevention", ISCA 2005: 32nd Annual International Symposium on Computer Architecture, pp. 112-122, 2005.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor et al., "Scalable Packet Classification using Distributed Crossproducting of Field Labels", Proceedings of IEEE Infocom, Mar. 2005, pp. 1-12, vol. 20, No. 1.

Taylor, "Models, Algorithms, and Architectures for Scalable Packet Classification", doctoral thesis, Department of Computer Science and Engineering, Washington University, St. Louis, MO, Aug. 2004, pp. 1-201.

Thomson Reuters, "Mellanox InfiniBand Accelerates the Exegy Ticker Plant at Major Exchanges", Jul. 22, 2008, URL: http://www.reuters.com/article/pressRelease/idUS125385+22-Jul-2008+BW20080722.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA, Apr. 17-19, 1996, pp. 70-79, 1996 IEEE, Napa Valley, CA, Los Alamitos, CA, USA.

Waldvogel et al., "Scalable High-Speed Prefix Matching", ACM Transactions on Computer Systems, Nov. 2001, pp. 440-482, vol. 19, No. 4.

Ward et al., "Dynamically Reconfigurable Computing: A Novel Computation Technology with Potential to Improve National Security Capabilities", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

West et al., "An FPGA-Based Search Engine for Unstructured Database", Proc. of 2nd Workshop on Application Specific Processors, Dec. 2003, San Diego, CA.

Wooster et al., "HTTPDUMP Network HTTP Packet Snooper", Apr. 25, 1996.

Written Submissions to EPO for EP Application 03729000.4 dated May 10, 2010.

Yamaguchi et al., "High Speed Homology Search with FPGAs", Proceedings Pacific Symposium on Biocomputing, Jan. 3-7, 2002, pp. 271-282, vol. 7, Online, Lihue, Hawaii, USA.

Yan et al., "Enhancing Collaborative Spam Detection with Bloom Filters", 2006, IEEE, pp. 414-425.

Yoshitani et al., "Performance Evaluation of Parallel Volume Rendering Machine Re Volver/C40", Study Report of Information Processing Society, Mar. 5, 1999, pp. 79-84, vol. 99, No. 21.

Ziv et al., "A Universal Algorithm for Sequential Data Compression", IEEE Trans. Inform. Theory, IT-23(3): 337-343 (1997).

English Translation of Office Action for JP Application 2004-508044 dated Feb. 9, 2010.

Exegy Inc., "Exegy and HyperFeed to Unveil Exelerate TP at SIA Conference", Release Date: Jun. 20, 2006, downloaded from http://news.thomasnet.com/companystory/488004 on Jun. 19, 2007, 4 pages.

Exegy Inc., "First Exegy Ticker Plant Deployed", Release Date: Oct. 17, 2006, downloaded from http://news.thomasnet.com/companystory/496530 on Jun. 19, 2007, 5 pages.

Feldman, "High Frequency Traders Get Boost From FPGA Acceleration", Jun. 8, 2007, downloaded from http://www.hpcwire.com/hpc.1600113.html on Jun. 19, 2007, 4 pages.

Forgy, "RETE: A fast algorithm for the many pattern/many object pattern matching problem", Artificial Intelligence, 19, pp. 17-37, 1982.

Franklin et al., "An Architecture for Fast Processing of Large Unstructured Data Sets". Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gavrila et al., "Multi-feature Hierarchical Template Matching Using Distance Transforms", IEEE, Aug. 16-20, 1998, vol. 1, pp. 439-444.

Google Search Results Page for "field programmable gate array financial calculation stock market" over dates of Jan. 1, 1990-May 21, 2002, 1 page.

Gunther et al., "Assessing Document Relevance with Run-Time Reconfigurable Machines", FPGAs for Custom Computing Machines, 1996, Proceedings, IEEE Symposium on, pp. 10-17, Napa Valley, CA, Apr. 17, 1996.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Harris, "Pete's Blog: Can FPGAs Overcome the FUD?", Low-Latency.com, May 14, 2007, URL: http://www.a-teamgroup.com/article/pete-blog-can-fpgas-overcome-the-fud/.

Hauck et al., "Software Technologies for Reconfigurable Systems", Northwestern University, Dept. of ECE, Technical Report, 1996.

Hayes, "Computer Architecture and Organization", Second Edition, 1988, pp. 448-459, McGraw-Hill, Inc.

Hezel et al., "FPGA-Based Template Matching Using Distance Transforms", Proceedings of the 10th Annual IEEE Symposium on Field-Programmable Custom Computing Machines, Apr. 22, 2002, pp. 89-97, IEEE Computer Society, USA.

Hirsch, "Tech Predictions for 2008", Reconfigurable Computing, Jan. 16, 2008, URL: http://fpgacomputing.blogspot.com/2008_01_01_archive.html.

Hoinville, et al. "Spatial Noise Phenomena of Longitudinal Magnetic Recording Media", IEEE Transactions on Magnetics, vol. 28, No. 6, Nov. 1992.

Hollaar, "Hardware Systems for Text Information Retrieval", Proceedings of the Sixth Annual International ACM Sigir Conference on Research and Development in Information Retrieval, Jun. 6-8, 1983, pp. 3-9, Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

International Preliminary Report on Patentability (Chapter I) for PCT/US2008/066929 dated Jan. 7, 2010.

International Search Report and Written Opinion for PCT/US2009/030623 dated May 5, 2009.

International Search Report for PCT/US2001/011255 dated Jul. 10, 2003.

International Search Report for PCT/US2002/033286 dated Jan. 22, 2003.

International Search Report for PCT/US2003/015638 dated May 6, 2004.

International Search Report for PCT/US2004/016021 dated Aug. 18, 2005.

International Search Report for PCT/US2004/016398 dated Apr. 12, 2005.

International Search Report for PCT/US2005/030046; Sep. 25, 2006.

International Search Report for PCT/US2006/006105 dated Oct. 31, 2006.

International Search Report for PCT/US2006/045653 dated Jul. 8, 2008.

International Search Report for PCT/US2007/060835 dated Jul. 9, 2007.

International Search Report for PCT/US2007/084466 dated Jul. 23, 2008.

International Search Report for PCT/US2008/065955 dated Aug. 22, 2008.

International Search Report for PCT/US2008/066929 dated Aug. 29, 2008.

Invitation to Pay Additional Fees and Annex to Form PCT/ISA/206 Communication Relating to the Results of the Partial International Search for International Application PCT/US2003/015638 dated Feb. 3, 2004.

Jacobson et al., "RFC 1072: TCP Extensions for Long-Delay Paths", Oct. 1988.

Jacobson et al., "tcpdump—dump traffic on a network", Jun. 30, 1997, online at www.cse.cuhk.edu.hk/~cslui/CEG4430/tcpdump.ps.gz.

Jones et al., "A Probabilistic Model of Information Retrieval: Development and Status", Information Processing and Management, Aug. 1998, 76 pages.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Krishnamurthy et al., "Biosequence Similarity Search on the Mercury System", Proceedings of the 15th IEEE International Conference on Application-Specific Systems, Architectures, and Processors (ASAP04), Sep. 2004, pp. 365-375.

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 137-144.

Lockwood et al., "Hello, World: A Simple Application for the Field Programmable Port Extender (FPX)", Washington University, Department of Computer Science, Technical Report WUCS-00-12, Jul. 11, 2000.

Lockwood et al., "Parallel FPGA Programming over Backplane Chassis", Washington University, Department of Computer Science, Technical Report WUCS-00-11, Jun. 12, 2000.

Lockwood et al., "Reprogrammable Network Packet Processing on the Field Programmable Port Extender (FPX)", ACM International Symposium on Field Programmable Gate Arrays (FPGA 2001), Monterey, CA, Feb. 2001, pp. 87-93.

Lockwood, "An Open Platform for Development of Network Processing Modules in Reprogrammable Hardware", IEC DesignCon 2001, Santa Clara, CA, Jan. 2001, Paper WB-19.

Lockwood, "Building Networks with Reprogrammable Hardware", Field Programmable Port Extender: Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW'01), Long Beach, CA, Jul. 12-14, 2001, pp. 271-279.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE'2001), Las Vegas, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender: Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mosanya et al., "A FPGA-Based Hardware Implementation of Generalized Profile Search Using Online Arithmetic", ACM/Sigda International Symposium on Field Programmable Gate Arrays (FPGA '99), Feb. 21-23, 1999, pp. 101-111, Monterey, CA, USA.

Moscola et al., "FPGrep and FPSed: Regular Expression Search and Substitution for Packet Streaming in Field Programmable Hardware", Dept. of Computer Science, Applied Research Lab, Washington University, Jan. 8, 2002, unpublished, pp. 1-19, St. Louis, MO.

Moscola et al., "FPSed: A Streaming Content Search-and-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Navarro, "A Guided Tour to Approximate String Matching", ACM Computing Surveys, vol. 33, No. 1, Mar. 2001, pp. 31-88.

Notice of Allowance for U.S. Appl. No. 11/339,892 dated Jan. 20, 2011.

Notice of Allowance for U.S. Appl. No. 11/932,391 dated Jan. 19, 2011.

Notice of Allowance for U.S. Appl. No. 11/932,652 dated Jan. 19, 2011.

Nunez et al., "The X-MatchLITE FPGA-Based Data Compressor", Euromicro Conference 1999, Proceedings, Italy, Sep. 8-10, 1999, pp. 126-132, Los Alamitos, CA.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

Office Action for U.S. Appl. No. 10/550,323 dated Jan. 3, 2011.

Office Action for U.S. Appl. No. 11/561,615 dated Jun. 17, 2010.

Office Action for U.S. Appl. No. 11/561,615 dated Sep. 28, 2009.

Office Action for U.S. Appl. No. 11/760,211 dated Nov. 2, 2009.

Office Action Response for U.S. Appl. No. 11/561,615 dated Mar. 26, 2010.

Pramanik et al., "A Hardware Pattern Matching Algorithm on a Dataflow"; Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, May 1994, pp. 1621-1636, vol. 1, No. 1.

Ramakrishna et al., "Efficient Hardware Hashing Functions for High Performance Computers", IEEE Transactions on Computers, Dec. 1997, vol. 46, No. 12.

Ratha et al., "Convolution on Splash 2", Proceedings of IEEE Symposium on FPGAS for Custom Computing Machines, Apr. 19, 1995, pp. 204-213, Los Alamitos, California.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Sachin Tandon, "A Programmable Architecture for Real-Time Derivative Trading", Master's Thesis, University of Edinburgh, 2003.

Schmerken, "With Hyperfeed Litigation Pending, Exegy Launches Low-Latency Ticker Plant", in Wall Street & Technology Blog, Mar. 20, 2007, pp. 1-2.

Schmit, "Incremental Reconfiguration for Pipelined Applications", FPGAs for Custom Computing Machines, Proceedings, The 5th Annual IEEE Symposium, Dept. of ECE, Carnegie Mellon University, Apr. 16-18, 1997, pp. 47-55, Pittsburgh, PA.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.

Seki et al., "High Speed Computation of Shogi With FPGA", Proceedings of 58th Convention Architecture, Software Science, Engineering, Mar. 9, 1999, pp. 1-133-1-134.

Shah, "Understanding Network Processors", Version 1.0, University of California-Berkeley, Sep. 4, 2001.

Shalunov et al., "Bulk TCP Use and Performance on Internet 2", ACM SIGCOMM Internet Measurement Workshop, 2001.

Shirazi et al., "Quantitative Analysis of FPGA-based Database Searching", Journal of VLSI Signal Processing Systems for Signal, Image, and Video Technology, May 2001, pp. 85-96, vol. 28, No. 1/2, Kluwer Academic Publishers, Dordrecht, NL.

Sidhu et al., "Fast Regular Expression Matching Using FPGAs", IEEE Symposium on Field Programmable Custom Computing Machines (FCCM 2001), Apr. 2001.

Bianchi et al., "Improved Queueing Analysis of Shared Buffer Switching Networks", ACM, Aug. 1993, pp. 482-490.

Brodie et al., "Dynamic Reconfigurable Computing", in Proc. of 9th Military and Aerospace Programmable Logic Devices International Conference, Sep. 2006.

Decision of the Examining Division for EP Patent Application No. 03729000.4 dated Jul. 12, 2010.

Extended European Search Report for EP Application 08771027.3 dated Mar. 23, 2011.

Gupta et al., "High-Speed Implementations of Rule-Based Systems," ACM Transactions on Computer Systems, May 1989, pp. 119-146, vol. 7, Issue 2.

Gupta et al., "PMM: A Parallel Architecture for Production Systems," Proceedings of the IEEE, Apr. 1992, pp. 693-696, vol. 2.

Minutes of the Oral Proceedings for EP Patent Application No. 03729000.4 dated Jul. 12, 2010.

Provisional Opinion of Examining Division for EP Patent Application No. 03729000.4 dated Jun. 2, 2010.

Russ et al., Non-Intrusive Built-In Self-Test for FPGA and MCM Applications, Aug. 8-10, 1995, IEEE, 480-485.

Statement of Grounds of Appeal for EP Patent Application No. 03729000.4 dated Nov. 22, 2010.

Prosecution History for U.S. Appl. No. 11/765,306, now USPN 7,921,046, filed Jun. 19, 2007.

Response to Office Action for EP08771027.3 dated Apr. 11, 2011.

U.S. Appl. No. 13/132,408, filed Jun. 2, 2011 (Taylor et al.).

U.S. Appl. No. 13/154,804, filed Jun. 7, 2011 (Taylor et al.).

U.S. Appl. No. 13/154,824, filed Jun. 7, 2011 (Taylor et al.).

U.S. Appl. No. 13/301,340, filed Nov. 21, 2011 (Indeck et al.).

U.S. Appl. No. 13/301,387, filed Nov. 21, 2011 (Indeck et al.).

U.S. Appl. No. 13/316,332, filed Dec. 9, 2011 (Taylor et al.).

U.S. Appl. No. 13/344,986, filed Jan. 6, 2012 (Chamberlain et al.).

U.S. Appl. No. 13/345,011, filed Jan. 6, 2012 (Chamberlain et al.).

U.S. Appl. No. 61/570,670, filed Dec. 14, 2011 (Taylor et al.).

Celko, "Joe Celko's Data & Databases: Concepts in Practice", 1999, pp. 72-74, Morgan Kaufmann Publishers.

Ibrahim et al., "Lecture Notes in Computer Science: Database and Expert Systems Applications", 2000, p. 769, vol. 1873, Springer.

International Preliminary Report on Patentability (Chapter I) for PCT/US2009/067935 issued Jun. 30, 2011.

International Search Report and Written Opinion for PCT/US2009/067935 dated Apr. 30, 2010.

Motwani et al., "Randomized Algorithms", 1995, pp. 215-216, Cambridge University Press.

Mueller, "Upgrading and Repairing PCs, 15th Anniversary Edition", 2004, pp. 63-66, 188, Que.

Office Action for EP Application 08756734.3 dated Jun. 4, 2012.

Office Action for EP Application 08771027.3 dated Feb. 6, 2012.

Office Action for U.S. Appl. No. 12/013,302 dated Jul. 20, 2012.

Office Action for U.S. Appl. No. 13/076,929 dated Mar. 2, 2012.

Office Action for U.S. Appl. No. 13/076,951 dated Feb. 29, 2012.

Office Action for U.S. Appl. No. 13/077,036 dated Mar. 16, 2012.

Office Action for U.S. Appl. No. 13/077,224 dated May 9, 2012.

Office Action for U.S. Appl. No. 13/154,804 dated Aug. 15, 2012.

Office Action for U.S. Appl. No. 13/301,340 dated May 9, 2012.

Office Action for U.S. Appl. No. 13/301,387 dated Jun. 6, 2012.

Office Action for U.S. Appl. No. 13/345,011 dated Aug. 28, 2012.

Shasha et al., "Database Tuning", 2003, pp. 280-284, Morgan Kaufmann Publishers.

Skiena et al., "Programming Challenges: The Programming Contest Training Manual", 2003, pp. 30-31, Springer.

Worboys, "GIS: A Computing Perspective", 1995, pp. 245-247, 287, Taylor & Francis Ltd.

Dehon, "DPGA-coupled microprocessors: commodity ICs for the early 21st Century", FPGAS for Custom Computing Machines, 1994, Proceedings. IEEE Workshop on Napa Valley, CA, pp. 31-39, Los Alamitos, CA.

Gokhale et al., "Reconfigurable Computing: Accelerating Computation with Field-Programmable Gate Arrays", Springer, 2005, pp. 1-36.

Office Action for U.S. Appl. No. 13/076,982 dated Nov. 8, 2012.
Office Action for U.S. Appl. No. 13/077,294 dated Dec. 26, 2012.

* cited by examiner

HIGH SPEED PROCESSING OF FINANCIAL INFORMATION USING FPGA DEVICES

CROSS-REFERENCE AND PRIORITY CLAIM TO RELATED PATENT APPLICATIONS

This patent application is a divisional of U.S. patent application Ser. No. 11/765,306, filed Jun. 19, 2007, entitled "High Speed Processing of Financial Information Using FPGA Devices", and published as U.S. Pat. App. Pub. 2008/0243675, now U.S. Pat. No. 7,921,046, which claims priority to provisional patent application 60/814,796, filed Jun. 19, 2006, and entitled "High Speed Processing of Financial Information Using FPGA Devices", the entire disclosures of each of which are incorporated herein by reference.

This patent application is related to the following patent applications: U.S. patent application Ser. No. 13/076,968, filed this same day, and entitled "High Speed Processing of Financial Information Using FPGA Devices", U.S. patent application Ser. No. 13/077,036, filed this same day, and entitled "High Speed Processing of Financial Information Using FPGA Devices", U.S. patent application Ser. No. 13/077,294, filed this same day, and entitled "High Speed Processing of Financial Information Using FPGA Devices", U.S. patent application Ser. No. 13/076,982, filed this same day, and entitled "High Speed Processing of Financial Information Using FPGA Devices", U.S. patent application Ser. No. 13/076,951, filed this same day, and entitled "High Speed Processing of Financial Information Using FPGA Devices", U.S. patent application Ser. No. 13/077,224, filed this same day, and entitled "High Speed Processing of Financial Information Using FPGA Devices", and U.S. patent application Ser. No. 13/076,929, filed this same day, and entitled "High Speed Processing of Financial Information Using FPGA Devices".

This patent application is also related to the following patent applications: U.S. patent application Ser. No. 09/545,472 (filed Apr. 7, 2000, and entitled "Associative Database Scanning and Information Retrieval", now U.S. Pat. No. 6,711,558), U.S. patent application Ser. No. 10/153,151 (filed May 21, 2002, and entitled "Associative Database Scanning and Information Retrieval using FPGA Devices", now U.S. Pat. No. 7,139,743), published PCT applications WO 05/048134 and WO 05/026925 (both filed May 21, 2004, and entitled "Intelligent Data Storage and Processing Using FPGA Devices"), published PCT patent application WO 06/096324 (filed Feb. 22, 2006, entitled "Method and Apparatus for Performing Biosequence Similarity Searching"), U.S. patent application Ser. No. 11/293,619 (filed Dec. 2, 2005, entitled "Method and Device for High Performance Regular Expression Pattern Matching", and published as 2007/0130140), U.S. patent application Ser. No. 11/339,892 (filed Jan. 26, 2006, and entitled "Firmware Socket Module for FPGA-Based Pipeline Processing"), U.S. patent application Ser. No. 11/381,214 (filed May 2, 2006, and entitled "Method and Apparatus for Approximate Pattern Matching"), U.S. patent application Ser. No. 11/561,615 (filed Nov. 20, 2006, entitled "Method and Apparatus for Processing Financial Information at Hardware Speeds Using FPGA Devices", and published as 2007/0078837), and U.S. patent application Ser. No. 11/760,211 (filed Jun. 8, 2007, and entitled "Method and System for High Speed Options Pricing"), the entire disclosures of each of which are incorporated herein by reference.

FIELD OF THE INVENTION

The present invention relates to the field of data processing platforms for financial market data.

BACKGROUND AND SUMMARY OF THE INVENTION

Speed of information delivery is a valuable dimension to the financial instrument trading and brokerage industry. The ability of a trader to obtain pricing information on financial instruments such as stocks, bonds and particularly options as quickly as possible cannot be understated; improvements in information delivery delay on the order of fractions of a second can provide important value to traders.

For example, suppose there is an outstanding "bid" on stock X that is a firm quote to buy 100 shares of Stock X for $21.50 per share. Also suppose there are two traders, A and B, each trying to sell 100 shares of stock X, but would prefer not to sell at a price of $21.50. Next, suppose another party suddenly indicates a willingness to buy 100 shares of Stock X for a price of $21.60. A new quote for that amount is then submitted, which sets the "best bid" for Stock X to $21.60, up 10 cents from its previous value of $21.50. The first trader, A or B, to see the new best bid price for Stock X and issue a counter-party order to sell Stock X will "hit the bid", and sell his/her Stock X for $21.60 per share. The other trader will either have to settle for selling his/her shares of Stock X for the lower $21.50 price or will have to decide not to sell at all at that lower price. Thus, it can be seen that speed of information delivery can often translate into actual dollars and cents for traders, which in large volume situations, can translate to significant sums of money.

In an attempt to promptly deliver financial information to interested parties such as traders, a variety of market data platforms have been developed for the purpose of ostensible "real time" delivery of streaming bid, offer, and trade information for financial instruments to traders. FIG. 1 illustrates an exemplary platform that is currently known in the art. As shown in FIG. 1, the market data platform 100 comprises a plurality of functional units 102 that are configured to carry out data processing operations such as the ones depicted in units 102, whereby traders at workstations 104 have access to financial data of interest and whereby trade information can be sent to various exchanges or other outside systems via output path 110. The purpose and details of the functions performed by functional units 102 are well-known in the art. A stream 106 of financial data arrives at the system 100 from an external source such as the exchanges themselves (e.g., NYSE, NASDAQ, etc.) over private data communication lines or from extranet providers such as Savvis or BT Radians. The financial data source stream 106 comprises a series of messages that individually represent a new offer to buy or sell a financial instrument, an indication of a completed sale of a financial instrument, notifications of corrections to previously-reported sales of a financial instrument, administrative messages related to such transactions, and the like. As used herein, a "financial instrument" refers to a contract representing equity ownership, debt or credit, typically in relation to a corporate or governmental entity, wherein the contract is saleable. Examples of "financial instruments" include stocks, bonds, commodities, currency traded on currency markets, etc. but would not include cash or checks in the sense of how those items are used outside financial trading markets (i.e., the purchase of groceries at a grocery store using cash or check would not be covered by the term "financial instrument" as used herein; similarly, the withdrawal of $100 in cash from an Automatic Teller Machine using a debit card would not be covered by the term "financial instrument" as used herein). Functional units 102 of the system then operate on stream 106 or data derived therefrom to carry out a variety of financial processing tasks. As used herein, the term "financial market data" refers to the data contained in or derived from a series of messages that individually represent a new offer to buy or sell a financial instrument, an indication of a completed sale of a financial instrument, notifications of corrections to previously-reported sales of a financial instrument, administrative messages related to such transactions, and the like. The term "financial market source data" refers to a feed of financial market data directly from a data source such as an exchange itself or a third party provider (e.g., a Savvis or BT Radianz provider). The term "financial market secondary data" refers to financial market data that has been derived from financial market source data, such as data produced by a feed compression operation, a feed handling operation, an option pricing operation, etc.

Because of the massive computations required to support such a platform, current implementations known to the inventors herein typically deploy these functions across a number of individual computer systems that are networked together, to thereby achieve the appropriate processing scale for information delivery to traders with an acceptable degree of latency. This distribution process involves partitioning a given function into multiple logical units and implementing each logical unit in software on its own computer system/server. The particular partitioning scheme that is used is dependent on the particular function and the nature of the data with which that function works. The inventors believe that a number of different partitioning schemes for market data platforms have been developed over the years. For large market data platforms, the scale of deployment across multiple computer systems and servers can be physically massive, often filling entire rooms with computer systems and servers, thereby contributing to expensive and complex purchasing, maintenance, and service issues.

This partitioning approach is shown by FIG. 1 wherein each functional unit 102 can be thought of as its own computer system or server. Buses 108 and 110 can be used to network different functional units 102 together. For many functions, redundancy and scale can be provided by parallel computer systems/servers such as those shown in connection with options pricing and others. To the inventors' knowledge, these functions are deployed in software that is executed by the conventional general purpose processors (GPPs) resident on the computer systems/servers 102. The nature of general purpose processors and software systems in the current state of the art known to the inventors herein imposes constraints that limit the performance of these functions. Performance is typically measured as some number of units of computational work that can be performed per unit time on a system (commonly called "throughput"), and the time required to perform each individual unit of computational work from start to finish (commonly called "latency" or delay). Also, because of the many physical machines required by system 100, communication latencies are introduced into the data processing operations because of the processing overhead involved in transmitting messages to and from different machines.

Despite the improvements to the industry that these systems have provided, the inventors herein believe that significant further improvements can be made. In doing so, the inventors herein disclose that the underlying technology disclosed in the related patents and patent applications listed and incorporated herein above to fundamentally change the system architecture in which market data platforms are deployed.

In above-referenced related patent application Ser. No. 10/153,151, it was first disclosed that reconfigurable logic, such as Field Programmable Gate Arrays (FPGAs), can be deployed to process streaming financial information at hardware speeds. As examples, the Ser. No. 10/153,151 application disclosed the use of FPGAs to perform data reduction operations on streaming financial information, with specific examples of such data reduction operations being a minimum price function, a maximum price function, and a latest price function. (See also the above-referenced and incorporated Ser. No. 11/561,615 patent application).

Since that time, the inventors herein have greatly expanded the scope of functionality for processing streams of financial information with reconfigurable logic. With the invention described herein, vast amounts of streaming financial information can be processed with varying degrees of complexity at hardware speeds via reconfigurable logic deployed in hardware appliances that greatly consolidate the distributed GPP architecture shown in FIG. 1 such that a market data platform built in accordance with the principles of the present invention can be implemented within fewer and much smaller appliances while providing faster data processing capabilities relative to the conventional market data platform as illustrated by FIG. 1; for example, the inventors envision that a 5:1 or greater reduction of appliances relative to the system architecture of FIG. 1 can be achieved in the practice of the present invention.

As used herein, the term "general-purpose processor" (or GPP) refers to a hardware device that fetches instructions and executes those instructions (for example, an Intel Xeon processor or an AMD Opteron processor). The term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture. The term "software" will refer to data processing functionality that is deployed on a GPP. The term "firmware" will refer to data processing functionality that is deployed on reconfigurable logic.

Thus, as embodiments of the present invention, the inventors herein disclose a variety of data processing pipelines implemented in firmware deployed on reconfigurable logic, wherein a stream of financial data can be processed through these pipelines at hardware speeds.

Also disclosed as an embodiment of the invention is a ticker plant that is configured to process financial market data with a combination of software logic and firmware logic. Through firmware pipelines deployed on the ticker plant and efficient software control and management over data flows to and from the firmware pipelines, the inventors herein believe that the ticker plant of the preferred embodiment is capable of greatly accelerating the speed with which financial market data is processed. In a preferred embodiment, financial market data is first processed within the ticker plant by software logic. The software logic controls and manages the flow of received financial market data into and out of the firmware logic deployed on the reconfigurable logic device(s), preferably in a manner such that each financial market data message travels only once from the software logic to the firmware logic and only once from the firmware logic back to the software logic. As used herein, the term "ticker plant" refers to a plurality of functional units, such as functional units 102 depicted in FIG. 1, that are arranged together to operate on a financial market data stream 106 or data derived therefrom.

These and other features and advantages of the present invention will be understood by those having ordinary skill in the art upon review of the description and figures hereinafter.

DETAILED DESCRIPTION OF THE PREFERRED EMBODIMENT

Figure 2:
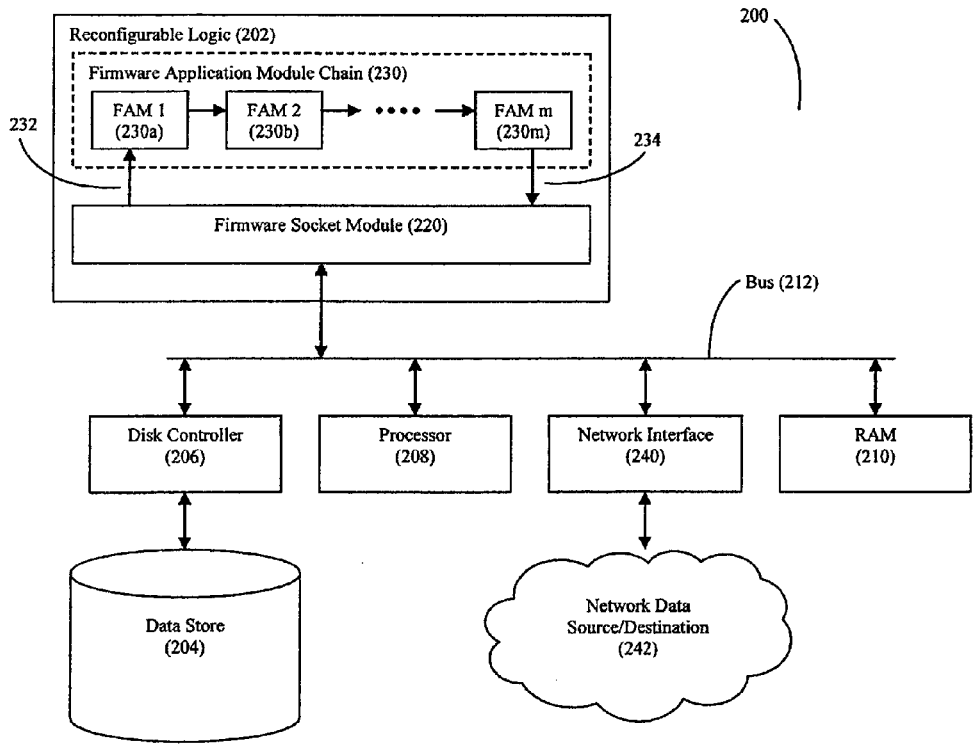
FIG. 2 is a block diagram view of an exemplary system architecture in accordance with an embodiment of the present invention.

FIG. 2 depicts an exemplary system 200 in accordance with the present invention. In this system, a reconfigurable logic device 202 is positioned to receive data that streams off either or both a disk subsystem defined by disk controller 206 and data store 204 (either directly or indirectly by way of system memory such as RAM 210) and a network data source/destination 242 (via network interface 240). Preferably, data streams into the reconfigurable logic device by way of system bus 212, although other design architectures are possible (see FIG. 4(b)). Preferably, the reconfigurable logic device 202 is a FPGA, although this need not be the case. System bus 212 can also interconnect the reconfigurable logic device 202 with the computer system's main processor 208 as well as the computer system's RAM 210. The term "bus" as used herein refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses. In a preferred embodiment, system bus 212 may be a PCI-X bus, although this need not be the case.

Figure 1:
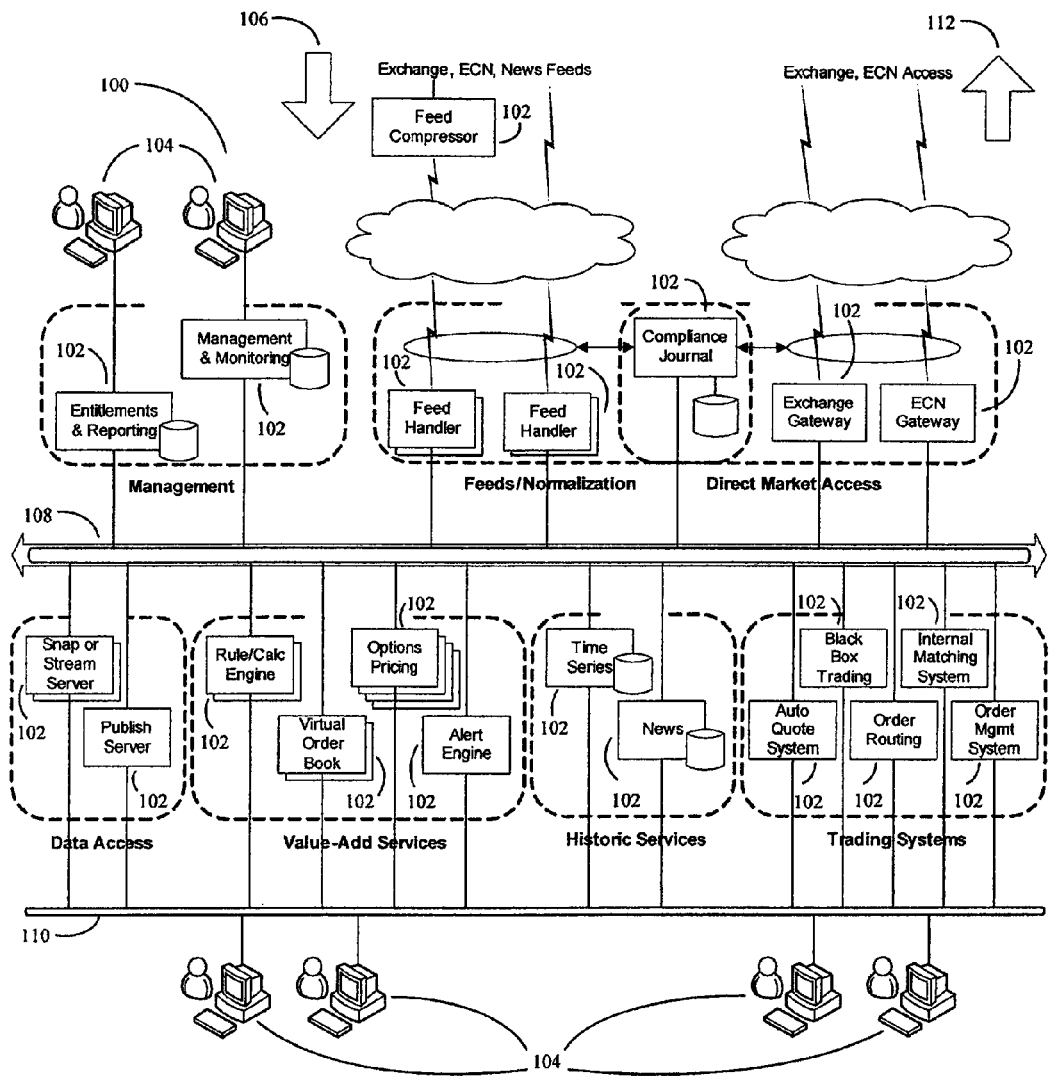
FIG. 1 depicts an exemplary system architecture for a conventional market data platform.

The data store can be any data storage device/system, but is preferably some form of a mass storage medium. For example, the data store 204 can be a magnetic storage device such as an array of Seagate disks. However, it should be noted that other types of storage media are suitable for use in the practice of the invention. For example, the data store could also be one or more remote data storage devices that are accessed over a network such as the Internet or some local area network (LAN). Another source/destination for data streaming to or from the reconfigurable logic device 202, is network 242 by way of network interface 240, as described above. In the financial industry, a network data source (e.g., the exchanges themselves, a third party provider, etc.) can provide the financial data stream 106 described above in connection with FIG. 1.

The computer system defined by main processor 208 and RAM 210 is preferably any commodity computer system as would be understood by those having ordinary skill in the art. For example, the computer system may be an Intel Xeon system or an AMD Opteron system.

The reconfigurable logic device 202 has firmware modules deployed thereon that define its functionality. The firmware socket module 220 handles the data movement requirements (both command data and target data) into and out of the reconfigurable logic device, thereby providing a consistent application interface to the firmware application module (FAM) chain 230 that is also deployed on the reconfigurable logic device. The FAMs 230i of the FAM chain 230 are configured to perform specified data processing operations on any data that streams through the chain 230 from the firmware socket module 220. Preferred examples of FAMs that can be deployed on reconfigurable logic in accordance with a preferred embodiment of the present invention are described below.

The specific data processing operation that is performed by a FAM is controlled/parameterized by the command data that a FAM receives from the firmware socket module 220. This command data can be FAM-specific, and upon receipt of the command, the FAM will arrange itself to carry out the data processing operation controlled by the received command. For example, within a FAM that is configured to compute an index value (such as the Dow Jones Industrial Average), the FAM's index computation operation can be parameterized to define which stocks will be used for the computation and to define the appropriate weighting that will be applied to the value of each stock to compute the index value. In this way, a FAM that is configured to compute an index value can be readily re-arranged to compute a different index value by simply loading new parameters for the different index value in that FAM.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of target data through the FAM), but the FAMs can also be flexibly reprogrammed to change the parameters of their data processing operations.

The FAM chain 230 preferably comprises a plurality of firmware application modules (FAMs) 230a, 230b, . . . that are arranged in a pipelined sequence. As used herein, "pipeline", "pipelined sequence", or "chain" refers to an arrangement of FAMs wherein the output of one FAM is connected to the input of the next FAM in the sequence. This pipelining arrangement allows each FAM to independently operate on any data it receives during a given clock cycle and then pass its output to the next downstream FAM in the sequence during another clock cycle.

A communication path 232 connects the firmware socket module 220 with the input of the first one of the pipelined FAMs 230a. The input of the first FAM 230a serves as the entry point into the FAM chain 230. A communication path 234 connects the output of the final one of the pipelined FAMs 230m with the firmware socket module 220. The output of the final FAM 230m serves as the exit point from the FAM chain 230. Both communication path 232 and communication path 234 are preferably multi-bit paths.

Figure 3:
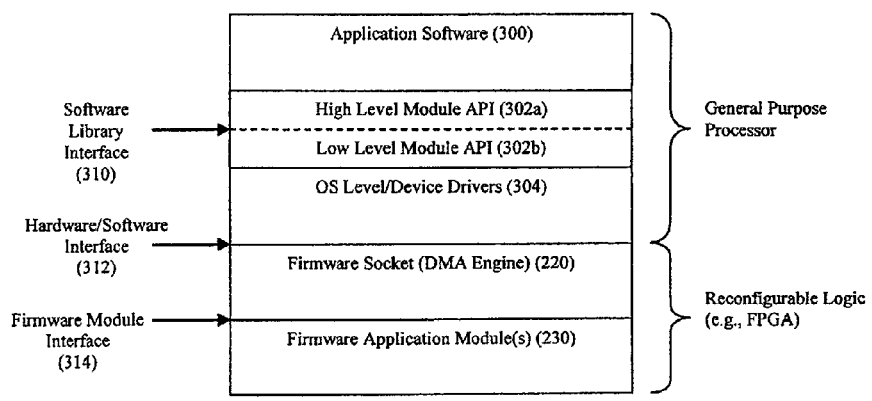
FIG. 3 illustrates an exemplary framework for the deployment of software and firmware for an embodiment of the present invention.

FIG. 3 depicts an exemplary framework for the deployment of applications on the system 200 of FIG. 2. The top three layers of FIG. 3 represent functionality that is executed in software on the computer system's general-purpose processor 208. The bottom two layers represent functionality that is executed in firmware on the reconfigurable logic device 202.

The application software layer 300 corresponds to high level functionality such as the type of functionality wherein one or more users interact with the application to define which data processing operations are to be performed by the FAMs and to define what data those data processing operations are to be performed upon.

The next layer is the module application programming interface (API) layer 302 which comprises a high level module API 302a and a low level module API 302b. The high level module API 302a can provide generic services to application level software (for example, managing callbacks). The low level module API 302b manages the operation of the operating system (OS) level/device driver software 304. A software library interface 310 interfaces the high level module API 302a with the low level module API 302b. Additional details about this software library interface can be found in the above-referenced patent application Ser. No. 11/339,892.

The interface between the device driver software 304 and the firmware socket module 220 serves as the hardware/software interface 312 for the system 200. The details of this interface 312 are described in greater detail in the above-referenced patent application Ser. No. 11/339,892.

The interface between the firmware socket module 220 and the FAM chain 230 is the firmware module interface 314. The details of this interface are described in greater detail in the above-referenced patent application Ser. No. 11/339,892.

Figure 4A:
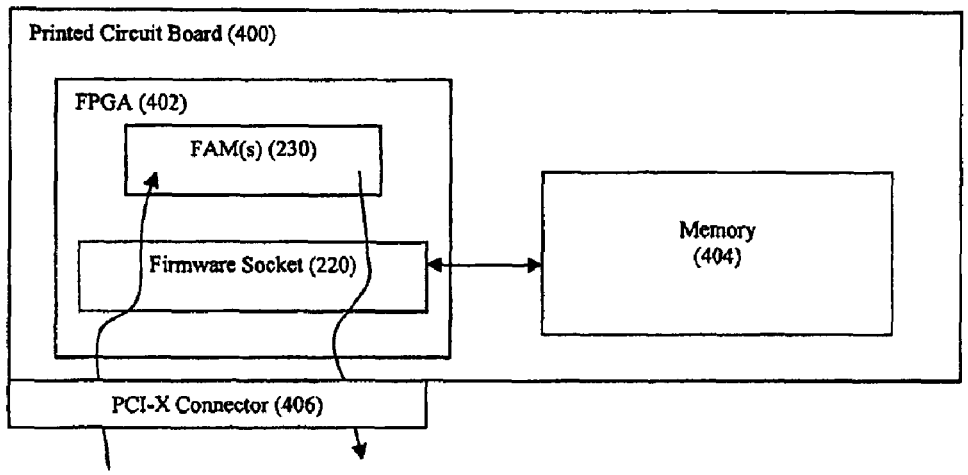
FIG. 4(a) is a block diagram view of a preferred printed circuit board for installation into a market data platform to carry out data processing tasks in accordance with the present invention.

FIG. 4(a) depicts a printed circuit board or card 400 that can be connected to the PCI-X bus 212 of a commodity computer system for use in a market data platform. In the example of FIG. 4(a), the printed circuit board includes an FPGA 402 (such as a Xilinx Virtex II FPGA) that is in communication with a memory device 404 and a PCI-X bus connector 406. A preferred memory device 404 comprises SRAM and SDRAM memory. A preferred PCI-X bus connector 406 is a standard card edge connector.

Figure 4B:
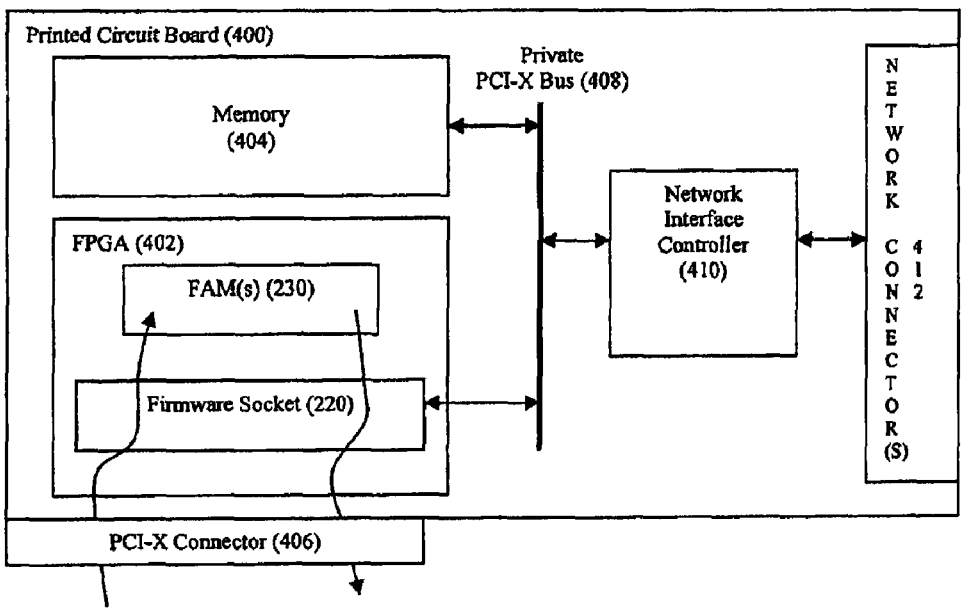
FIG. 4(b) is a block diagram view of an alternate printed circuit board for installation into a market data platform to carry out data processing tasks in accordance with the present invention.

FIG. 4(b) depicts an alternate configuration for a printed circuit board/card 400. In the example of FIG. 4(b), a private bus 408 (such as a PCI-X bus), a network interface controller 410, and a network connector 412 are also installed on the printed circuit board 400. Any commodity network interface technology can be supported, as is understood in the art. In this configuration, the firmware socket 220 also serves as a PCI-X to PCI-X bridge to provide the processor 208 with normal access to the network(s) connected via the private PCI-X bus 408.

Figure 5:
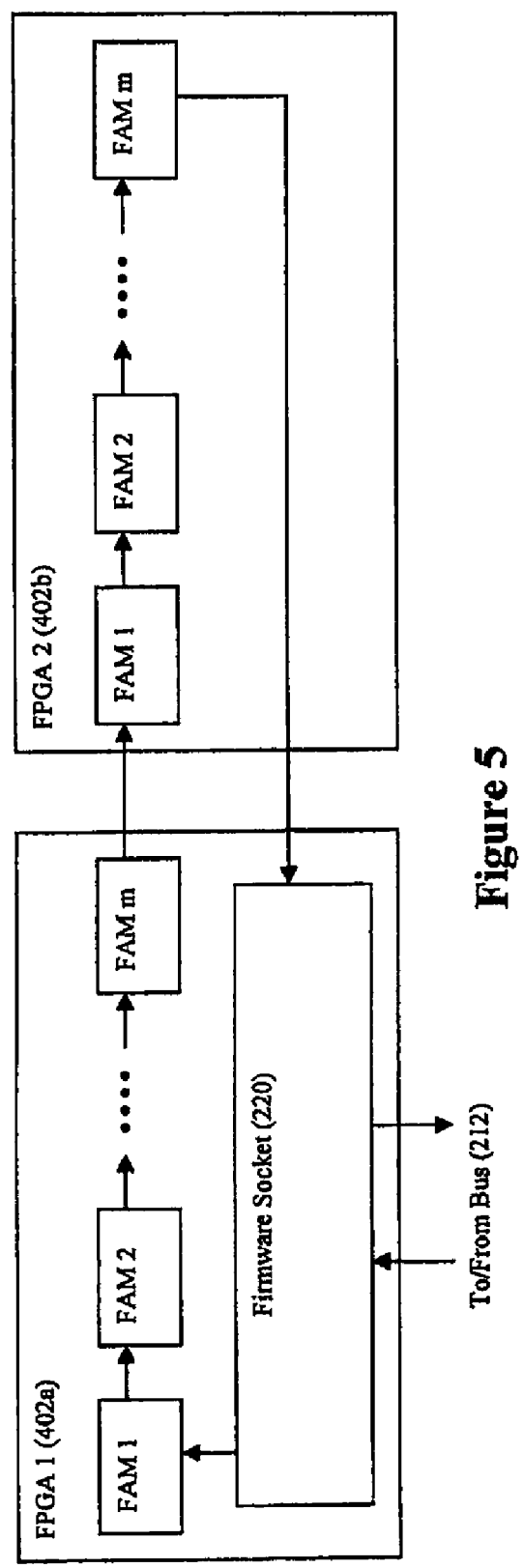
FIG. 5 illustrates an example of how the firmware application modules of a pipeline can be deployed across multiple FPGAs.

It is worth noting that in either the configuration of FIG. 4(a) or 4(b), the firmware socket 220 can make memory 404 accessible to the PCI-X bus, which thereby makes memory 404 available for use by the OS kernel 304 as the buffers for transfers from the disk controller and/or network interface controller to the FAMs. It is also worth noting that while a single FPGA 402 is shown on the printed circuit boards of FIGS. 4(a) and (b), it should be understood that multiple FPGAs can be supported by either including more than one FPGA on the printed circuit board 400 or by installing more than one printed circuit board 400 in the computer system. FIG. 5 depicts an example where numerous FAMs in a single pipeline are deployed across multiple FPGAs.

As shown in FIGS. 2-4, inbound data (from the kernel 304 to the card 400) is moved across the bus 212 in the computer system to the firmware socket module 220 and then delivered by the firmware socket module 220 to the FAM chain 230. Outbound data (from the card 400 to the kernel 304) are delivered from the FAM chain 230 to the firmware socket module 220 and then delivered by the firmware socket module 220 across the PCI-X bus to the software application executing on the computer system. As shown in FIG. 3, the three interacting interfaces that are used are the firmware module interface 314, the hardware/software interface 312, and the software library interface 310.

Figure 6:
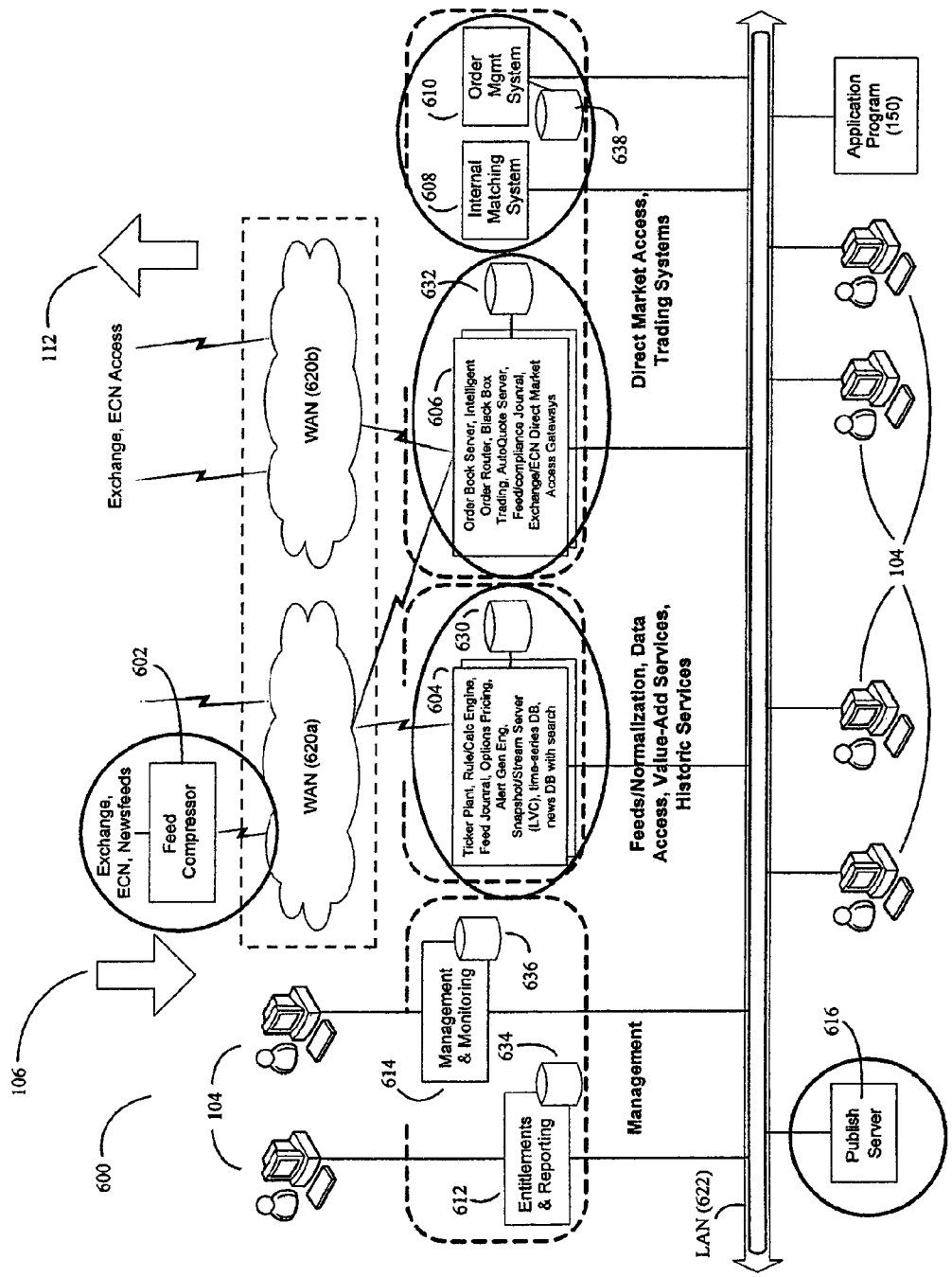
FIG. 6 illustrates an exemplary architecture for a market data platform in accordance with an embodiment of the present invention.

In an effort to improve upon conventional market data platforms, the inventors herein disclose a new market data platform architecture, an embodiment of which is shown in FIG. 6. The market data platform 600 shown in FIG. 6 consolidates the functional units 102 shown in FIG. 1 into much fewer physical devices and also offloads much of the data processing performed by the GPPs of the functional units 102 to reconfigurable logic.

For example, with the architecture of FIG. 6, the feed compressor 602 can be deployed in an appliance such as system 200 shown in FIG. 2. The reconfigurable logic 202 can be implemented on a board 400 as described in connection with FIG. 4(a) or 4(b). Feed compressor 602 is used to compress the content of the financial data stream 106 arriving from various individual sources. Examples of compression techniques that can be used include the open standard "glib" as well as any proprietary compression technique that may be used by a practitioner of the present invention. Appropriate FAM modules and a corresponding FAM pipeline to implement such a feed compression operation can be carried out by a person having ordinary skill in the art using the design techniques described in connection with the above-referenced patent and patent applications and basic knowledge in the art concerning feed compression. As a result, a variety of hardware templates available for loading on reconfigurable logic can be designed and stored for use by the market data platform 600 to implement a desired feed compression operation.

Preferably, the feed compressor device 602 is deployed in a physical location as close to the feed source 106 as possible, to thereby reduce communication costs and latency. For example, it would be advantageous to deploy the feed compressor device 602 in a data center of an extranet provider (e.g., Savvis, BT Radianz, etc.) due to the data center's geographic proximity to the source of the financial market data 106. Because the compression reduces message sizes within the feed stream 106, it will be advantageous to perform the compression prior to the stream reaching wide area network (WAN) 620a; thereby improving communication latency through the network because of the smaller message sizes.

WAN 620 preferably comprises an extranet infrastructure or private communication lines for connection, on the inbound side, to the feed handlers deployed in device 604. On the outbound side, WAN 620 preferably connects with device 606, as explained below. It should be noted that WAN 620 can comprise a single network or multiple networks 620a and 620b segmented by their inbound/outbound role in relation to platform 600. It is also worth noting that a news feed with real-time news wire reports can also be fed into WAN 620a for delivery to device 604.

Device 604 can be deployed in an appliance such as system 200 shown in FIG. 2. The reconfigurable logic 202 can be implemented on a board 400 as described in connection with FIG. 4(a) or 4(b). Whereas the conventional GPP-based system architecture shown in FIG. 1 deployed the functional units of feed handling/ticker plant, rule-based calculation engines, an alert generation engine, options pricing, Last Value Cache (LVC) servers supplying snapshot and/or streaming interfaces, historical time-series oriented databases with analytics, and news databases with search capabilities in software on separate GPPs, the architecture of FIG. 6 can consolidate these functions, either partially or in total, in firmware resident on the reconfigurable logic (such as one or more FPGAs) of device 604.

Feed handlers, which can also be referred to as feed producers, receive the real-time data stream, either compressed from the feed compressor 602 as shown in FIG. 6 or uncompressed from a feed source, and converts that compressed or uncompressed stream from a source-specific format (e.g., an NYSE format) to a format that is common throughout the market data platform 600. This conversion process can be referred to as "normalization". This "normalization" can be implemented in a FAM chain that transforms the message structure, converts the based units of specific field values within each message, maps key field information to the common format of the platform, and fills in missing field information from cached or database records. In situations where the received feed stream is a compressed feed stream, the feed handler preferably also implements a feed decompression operation.

LVCs maintain a database of financial instrument records whose functionality can be implemented in a FAM pipeline. Each record represents the current state of that financial instrument in the market place. These records are updated in real-time via a stream of update messages received from the feed handlers. The LVC is configured to respond to requests from other devices for an up-to-the-instant record image for a set of financial instruments and redistribute a selective stream of update messages pertaining to those requested records, thereby providing real-time snapshots of financial instrument status. From these snapshots, information such as the "latest price" for a financial instrument can be determined, as described in the above-referenced Ser. No. 10/153,151 application.

Rule-based calculation engines are engines that allow a user to create his/her own synthetic records whose field values are derived from calculations performed against information obtained from the LVC, information extracted from a stream of update messages generated from the LVC, or from alternate sources. These rule-based calculation engines are amenable to implementation in a FAM pipeline. It should also be noted that the rule-based calculation engine can be configured to create new synthetic fields that are included in existing records maintained by the LVC. The new values computed by the engine are computed by following a set of rules or formulas that have been specified for each synthetic field. For example, a rule-based calculation engine can be configured to compute a financial instrument's Volume Weighted Average Price (VWAP) via a FAM pipeline that computes the VWAP as the sum of P×S for every trade meeting criteria X, wherein P equals the trade price and wherein S equals the trade size. Criteria X can be parameterized into a FAM filter that filters trades based on size, types, market conditions, etc. Additional examples of rule-based calculations that can be performed by the rule-based calculation engine include, but are not limited to, a minimum price calculation for a financial instrument, a maximum price calculation for a financial instrument, a Top 10 list for a financial instrument or set of financial instruments, etc.

An alert generation engine can also be deployed in a FAM pipeline. Alert generation engines are similar to a rule-based calculation engine in that they monitor the current state of a financial instrument record (or set of financial instrument records), and the alert generation engine will trigger an alert when any of a set of specified conditions is met. An indication is then delivered via a variety of means to consuming applications or end users that wish to be notified upon the occurrence of the alert.

Option pricing is another function that is highly amenable to implementation via a FAM pipeline. An "option" is a derivative financial instrument that is related to an underlying financial instrument, and the option allows a person to buy or sell that underlying financial instrument at a specific price at some specific time in the future. An option pricing engine is configured to perform a number of computations related to these options and their underlying instruments (e.g., the theoretical fair market value of an option or the implied volatility of the underlying instrument based upon the market price of the option). A wide array of computational rules can be used for pricing options, as is known in the art. Most if not all industry-accepted techniques for options pricing are extremely computation intensive which introduces significant latency when the computations are performed in software. However, by implementing option pricing in a FAM pipeline, the market data platform 600 can significantly speed up the computation of option pricing, thereby providing in important edge to traders who use the present invention. An example of options pricing functionality that can be deployed in firmware is described in pending U.S. patent application Ser. No. 11/760,211, filed Jun. 8, 2007, the entire disclosure of which is incorporated herein by reference.

A time series database is a database that maintains a record for each trade or quote event that occurs for a set of financial instruments. This information may be retrieved upon request and returned in an event-by-event view. Alternative views are available wherein events are "rolled up" by time intervals and summarized for each interval. Common intervals include monthly, weekly, daily, and "minute bars" where the interval is specified to be some number of minutes. The time series database also preferably compute a variety of functions against these historic views of data, including such statistical measures as volume weighted average price (VWAP), money flow, or correlations between disparate financial instruments.

A news database maintains a historical archive of news stories that have been received from a news wire feed by way of the feed handler. The news database is preferably configured to allow end users or other applications to retrieve news stories or headlines based upon a variety of query parameters. These query parameters often include news category assignments, source identifiers, or even keywords or keyword phrases. The inventors herein note that this searching functionality can also be enhanced using the search and data matching techniques described in the above-referenced patent and patent applications.

Appropriate FAM modules and corresponding FAM pipelines to implement these various functions for device 604 can be carried out by a person having ordinary skill in the art using the design techniques described in connection with the above-referenced patent and patent applications and basic knowledge in the art concerning each function. As a result, a variety of hardware templates available for loading on reconfigurable logic can be designed and stored in memory (such as on a disk embodied by data store 204 in connection with FIG. 2) for use by the market data platform 600 to implement a desired data processing function. Persistent data storage unit 630 can be accessible to device 604 as device 604 processes the feed stream in accordance with the functionality described above. Storage 630 can be embodied by data store 204 or other memory devices as desired by a practitioner of the invention.

Traders at workstations 104 (or application programs 150 running on an entity's own trading platform) can then access the streaming financial data processed by device 604 via a connection to local area network (LAN) 622. Through this LAN connection, workstations 104 (and application program 15) also have access to the data produced by devices 606, 608, 610, 612, 614, and 616. Like devices 602 and 604, devices 606, 608, 610, 612, 614, and 616 can also be deployed in an appliance such as system 200 shown in FIG. 2, wherein the reconfigurable logic 202 of system 200 can be implemented on a board 400 as described in connection with FIG. 4(*a*) or 4(*b*).

Device 606 preferably consolidates the following functionality at least partially into firmware resident on reconfigurable logic: an order book server; an order router; direct market access gateways to exchanges, Electronic Communication Networks (ECNs), and other liquidity pools; trading engines; an auto-quote server; and a compliance journal.

An "order book server" is similar to a LVC in that the order book server maintains a database in memory (e.g., in memory device 404 on board 400) of financial instrument records, and keeps that database up to date in real-time via update messages received from the feed handlers. For each record, the order book server preferably maintains a sorted list of the bids and offers associated with all outstanding orders for that instrument. This list is known as the "book" for that instrument. The order information for each instrument is received from a variety of different trading venues in stream 106 and is aggregated together to form one holistic view of the market for that particular instrument. The order book server is configured to respond to requests from workstation 104 users or application programs 150 to present the book in a number of different ways. There are a variety of different "views", including but not limited to: a "top slice" of the book that returns orders whose prices are considered to be within a specified number of price points of the best price available in the market (the best price being considered to be the "top" of the book); a price aggregate view where orders at the same price point are aggregated together to create entries that are indicative of the total number of orders available at each price point; and an ordinary view with specific trading venues (which are the source of orders) excluded.

An order router is a function that can take a buy or sell order for a specified financial instrument, and based upon a variety of criteria associated with the order itself or the end user or application submitting the order, route the order (in whole or in part) to the most appropriate trading venue, such as an exchange, an Alternate Trading System (ATS), or an ECN.

The direct market access gateway functionality operates to relay orders to a trading venue (such as an exchange, ECN, ATS, etc.) via WAN 620*b*. Before sending an order out however, the gateway preferably transforms the order message to a format appropriate for the trading venue.

The trading engine functionality can also be deployed on reconfigurable logic. An algorithmic trading engine operates to apply a quantitative model to trade orders of a defined quantity to thereby automatically subdivide that trade order into smaller orders whose timing and size are guided by the goals of the quantitative model so as to reduce the impact that the original trade order may have on the current market price. Also, a black box trading engine operates to automatically generate trades by following a mathematical model that specifies relationships or conditional parameters for an instrument or set of instruments. To aid this processing, the black box trading engine is fed with real-time market data.

An auto-quote server is similar to a black box trading engine. The auto-quote server operates to automatically generate firm quotes to buy or sell a particular financial instrument at the behest of a "market maker"; wherein a "market maker" is a person or entity which quotes a buy and/or sell price in a financial instrument hoping to make a profit on the "turn" or the bid/offer spread.

A feed/compliance journal can also be implemented in a FAM pipeline. The feed/compliance journal functions to store information (in persistent storage 632) related to the current state of the entire market with regard to a particular financial instrument at the time a firm quote or trade order is submitted to a single particular marketplace. The feed/compliance journal can also provide a means for searching storage 632 to provide detailed audit information on the state of the market when a particular firm quote or trade order was submitted. The inventors herein note that this searching functionality can also be enhanced using the search and data matching techniques described in the above-referenced patent and patent applications.

As mentioned above in connection with device 604, appropriate FAM modules and corresponding FAM pipelines to implement these various functions for device 606 can be carried out by a person having ordinary skill in the art using the design techniques described in connection with the above-referenced patent and patent applications and basic knowledge in the art concerning each function. As a result, a variety of hardware templates available for loading on reconfigurable logic can be designed and stored for use by the market data platform 600 to implement a desired data processing function. Persistent data storage unit 632, which can be embodied by data store 204, can be accessible to device 606 as device 606 processes the feed stream in accordance with the functionality described above.

Device 608 preferably implements an internal matching system/engine in firmware resident on reconfigurable logic. An internal matching system/engine operates to match a buyer's bid with a seller's offer to sell for a particular financial instrument, to thereby execute a deal or trade. An indication of a completed trade is then submitted to the appropriate reporting and settlement systems. The internal matching system/engine may create bids or offers as would a market maker in order to provide an orderly market and a minimum amount of liquidity by following a set of programmatically-defined rules.

Device 610 preferably implements an order management system (OMS) in firmware resident on reconfigurable logic. An OMS operates to facilitate the management of a group of trading accounts, typically on behalf of a broker. The OMS will monitor buy and sell orders to ensure that they are appropriate for the account owner in question based upon his/her account status, credit and risk profiles. The OMS typically incorporates a database via persistent storage 638 (which may be embodied by data store 204) used to hold account information as well as an archive of orders and other activity for each account.

Device 612 preferably implements entitlements and reporting functionality. A market data platform such as system 600 is a mechanism for distributing data content to a variety of end users.

Many content providers charge on a per user basis for access to their data content. Such content providers thus prefer a market data platform to have a mechanism to prohibit (or entitle) access to specific content on an individual user basis. Entitlement systems may also supply a variety of reports that detail the usage of different content sets. To achieve this functionality, device 612, in conjunction with database 634, preferably operates to maintain a database of users, including authentication credentials and entitlement information which can be used by devices 604, 606, 608, 610 and 616 for entitlement filtering operations in conjunction with the data processing operations performed thereby.

Device 614 preferably implements management and monitoring for the market data platform 600. Management and monitoring functionality provides a means for users to operate the applications running within the platform 600 and monitor the operational state and health of individual components thereon. Preferably, the management and monitoring functionality also provides facilities for reconfiguring the components as well as means for performing any other appropriate manual chores associated with running the platform.

Device 616 preferably implements publishing and contribution server functionality. Contribution servers (also known as publishing servers) allow users to convert information obtained from an end-user application (or some other source within his/her enterprise) into a suitable form, and to have it distributed by the market data platform 600.

As mentioned above in connection with devices 604 and 606, appropriate FAM modules and corresponding FAM pipelines to implement these various functions for devices 608, 610, 612, 614, and 616 can be carried out by a person having ordinary skill in the art using the design techniques described in connection with the above-referenced patent and patent applications and basic knowledge in the art concerning each function. As a result, a variety of hardware templates available for loading on reconfigurable logic can be designed and stored for use by the market data platform 600 to implement a desired data processing function. Persistent data storage units 634 and 636 can be accessible to devices 612 and 614 respectively as those devices process the data in accordance with the functionality described above.

In deploying this functionality, at least in part, upon reconfigurable logic, the following modules/submodules of the functions described above are particularly amenable to implementation on an FPGA: fixed record format message parsing, fixed record format message generation, FIX message parsing, FIX message generation, FIX/FAST message parsing, FIX/FAST message generation, message compression, message decompression, interest and entitlement filtering, financial instrument symbol mapping, record ID mapping, price summary LVC update/retrieve/normalize (LVC), order book cache update/retrieve/normalize (OBC), generic LVC (GVC), minute bar generation, programmatic field generation (with LVC, OBC, etc.), historic record search and filter, book-based algorithmic order routing, trade order generation, basket calculation (including ETF, index, and portfolio valuation), and autoquote generation. It should be understood by those having ordinary skill in the art that this list is exemplary only and not exhaustive; additional modules for financial data processing can also be employed in a FAM or FAM pipeline in the practice of the present invention.

With fixed record format message parsing, a fixed format message is decomposed into its constituent fields as defined by a programmable "data dictionary". Entries within the data dictionary describe the fields within each type of message, their positions and sizes within those messages, and other metadata about the field (such as data type, field identifiers, etc.). Preferably, the data dictionary is stored in persistent storage such as data store 204 of the system 200. Upon initialization of the FAM pipeline on board 400, the data dictionary is then preferably loaded into memory 404 for usage by the FAM pipeline during data processing operations.

With fixed record format message generation, a fixed format message is generated by concatenating the appropriate data representing fields into a message record. The message structure and format is described by a programmable data dictionary as described above.

With FIX message parsing, a FIX-formatted message is decomposed into its constituent fields as defined by a programmable data dictionary as described above; FIX being a well-known industry standard for encoding financial message transactions.

With FIX message generation, a FIX-formatted message is generated by concatenating the appropriate data representing the fields into a FIX message record. Once again, the message structure and format is described by a programmable data dictionary as described above.

With FIX/FAST message parsing, a FIX and/or FAST message (FAST being a well known variation of FIX) is decomposed into its constituent fields as defined by a programmable data dictionary as described above.

With FIX/FAST message generation, a FIX-formatted and/or FAST-formatted message is generated by concatenating the appropriate data representing fields into a FIX/FAST message record. The message structure and format is defined by a programmable data dictionary as described above.

With message compression, a message record is compressed so as to require less space when contained in a memory device and to require less communication bandwidth when delivered to other systems. The compression technique employed is preferably sufficient to allow for reconstruction of the original message when the compressed message is processed by a corresponding message decompression module.

With interest and entitlement filtering, a stream of messages coming from a module such as one of the caching modules described below (e.g., price summary LVC, order book OBC, or generic GVC) is filtered based upon a set of entitlement data and interest data that is stored for each record in the cache. This entitlement and interest data defines a set of users (or applications) that are both entitled to receive the messages associated with the record and have expressed an interest in receiving them. This data can be loaded into memory from storage 634 during initialization of the board 400, or from Application Software 300 during normal operation of the board 400. An exemplary embodiment of a FAM configured to perform interest and entitlement filtering is described hereinafter with respect to FIG. 16.

With financial instrument symbol mapping, a common identifying string for a financial instrument (typically referred to as the "symbol") is mapped into a direct record key number that can be used by modules such as caching modules (LVC, OBC, GVC) to directly address the cache record associated with that financial instrument. The record key number may also be used by software to directly address a separate record corresponding to that instrument that is kept in a storage, preferably separate from board 400. An exemplary embodiment of a FAM configured to perform symbol mapping is described hereinafter with respect to FIGS. 12-14.

With record ID mapping, a generic identifying string for a record is mapped into a direct record key number that can be used by a caching module (e.g., LVC, OBC, GVC) or software to directly address the record in a storage medium.

The price summary Last Value Cache update/retrieve/normalize (LVC) operation operates to maintain a cache of financial instrument records whose fields are updated in real-time with information contained in streaming messages received from a message parsing module, and to enhance or filter the messages received from a message parsing module before passing them on to subsequent processing modules. The type of update performed for an individual field in a record will be defined by a programmable data dictionary as described above, and may consist of moving the data field from the message to the record, updating the record field by accumulating the data field over a series of messages defined within a time-bounded window, updating the record field only if certain conditions as defined by a set of programmable rules are true, or computing a new value based upon message and/or record field values as guided by a programmable formula. The type of enhancement or filtering applied to an individual message may consist of replacing a message field with one created by accumulating the data over a series of messages defined within a time-bounded window, flagging a field whose value falls outside of a programmatically defined range of values, or suppressing the message in its entirety if the value of a field or set of fields fails to change with respect to the corresponding values contained within the cache record. An exemplary embodiment of a FAM configured to perform LVC updating is described hereinafter with respect to FIGS. 15(a) and (b).

The order book cache update, retrieve and normalize (OBC) operation operates to maintain a cache of financial instrument records where each record consists of an array of sub-records that define individual price or order entries for that financial instrument. A sort order is maintained for the sub-records by the price associated with each sub-record. The fields of the sub-records are updated in real-time with information contained in streaming messages received from a message parsing module. Sub-records associated with a record are created and removed in real-time according to information extracted from the message stream, and the sort order of sub-records associated with a given record is continuously maintained in real-time. The type of update performed for an individual field in a sub-record will be defined by a programmable data dictionary, and may consist of moving the data field from the message to the sub-record, updating the sub-record field by accumulating the data field over a series of messages defined within a time-bounded window, updating the sub-record field only if certain conditions as defined by a set of programmable rules are true, or computing a new value based upon message and/or record or sub-record fields as guided by a programmable formula. The OBC includes the ability to generate various views of the book for a financial instrument including but not limited to a price-aggregated view and a composite view. A composite view is a sort order of the price or order entries for a financial instrument across multiple exchanges. The OBC also includes the ability to synthesize a top-of-book quote stream. When an update operation causes the best bid or offer entry in a given record to change, the OBC may be configured to generate a top-of-book quote reporting the current best bid and offer information for the financial instrument.

A synthesized top-of-book quote stream has the ability to report best bid and offer information with less latency than an exchange-generated quote stream. This may be used to accelerate a variety of latency sensitive applications.

The Generic Last Value Cache (GVC) operation operates to maintain a cache of records whose fields are updated in real-time with information contained in streaming messages received from a message parsing module. The structure of a record and the fields contained within it are defined by a programmable data dictionary, as described above. The type of update performed for an individual field in a record will be defined by a programmable data dictionary, and may consist of moving the data field from the message to the record, updating the record field by accumulating the data field over a series of messages defined within a time-bounded window, updating the record field only if certain conditions as defined by a set of programmable rules are true, or computing a new value based upon message and/or record field values as guided by a programmable formula.

A minute bar generation operation operates to monitor real-time messages from a message parsing module or last value cache module for trade events containing trade price information, or for quote events containing quote price information, and create "minute bar" events that summarize the range of trade and/or quote prices that have occurred over the previous time interval. The time interval is a programmable parameter, as is the list of records for which minute bars should be generated, and the fields to include in the generated events.

A Top 10 list generation operation operates to monitor real-time messages from a message parsing module or last value cache module for trade events containing price information and create lists of instruments that indicate overall activity in the market. Such lists may include (where 'N' is programmatically defined): top N stocks with the highest traded volume on the day; top N stocks with the greatest positive price change on the day; top N stocks with the largest percentage price change on the day; top N stocks with the greatest negative price change on the day; top N stocks with the greatest number of trade events recorded on the day; top N stocks with the greatest number of "large block" trades on the day, where the threshold that indicates whether a trade is a large block trade is defined programmatically.

A programmatic field generation (via LVC, OBV, GVC, etc.) operation operates to augment messages received from a message parsing module with additional fields whose values are defined by a mathematical formula that is supplied programmatically. The formula may reference any field within the stream of messages received from a message parsing module, any field contained within a scratchpad memory associated with this module, or any field contained within any record held within any the record caches described herein.

A programmatic record generation (with LVC, OBC, GVC, etc.) operation operates to generate records that represent synthetic financial instruments or other arbitrary entities, and a series of event messages that signal a change in state of each record when the record is updated. The structure of the records and the event messages are programmatically defined by a data dictionary. The field values contained with the record and the event messages are defined by mathematical formulas that are supplied programmatically. The formulas may reference any field within the stream of messages received from a message parsing module, any field contained within a scratchpad memory associated with this module, or any field contained within any record held within any the record caches described herein. Updates to field values may be generated upon receipt of a message received from another module, or on a time interval basis where the interval is defined programmatically. A basket calculation engine is one example of programmatic record generation. A synthetic instrument may be defined to represent a given portfolio of financial instruments, constituent instruments in an Exchange Traded Fund (ETF), or market index. The record for that synthetic instrument may include fields such as the Net Asset Value (NAV) and total change.

A historic record search and filter operation operates to filter messages received from a message parsing module that represent a time series of events to partition the events into various sets, where each set is defined by a collection of criteria applied to event attributes. The event message structure, criteria and attributes are all programmatically defined. Event attributes include, but are not limited to: financial instrument symbol, class of symbol, time and date of event, type of event, or various indicator fields contained within the event. Multiple events within a set may be aggregated into a single event record according to a collection of aggregation rules that are programmatically defined and applied to attributes of the individual events. Aggregation rules may include, but are not limited to, aggregating hourly events into a single daily event, aggregating daily events into a single weekly event, or aggregating multiple financial instruments into a single composite instrument.

These functions (as well as other suitable financial data processing operations) as embodied in FAMs can then be combined to form FAM pipelines that are configured to produce useful data for a market data platform. For example, a feed compressor FAM pipeline can employ FAMs configured with the following functions: fixed record format message parsing, fixed record format message generation, FIX message parsing, FIX message generation, FIX/FAST message parsing, FIX/FAST message generation, message compression, and message decompression.

Figure 7:
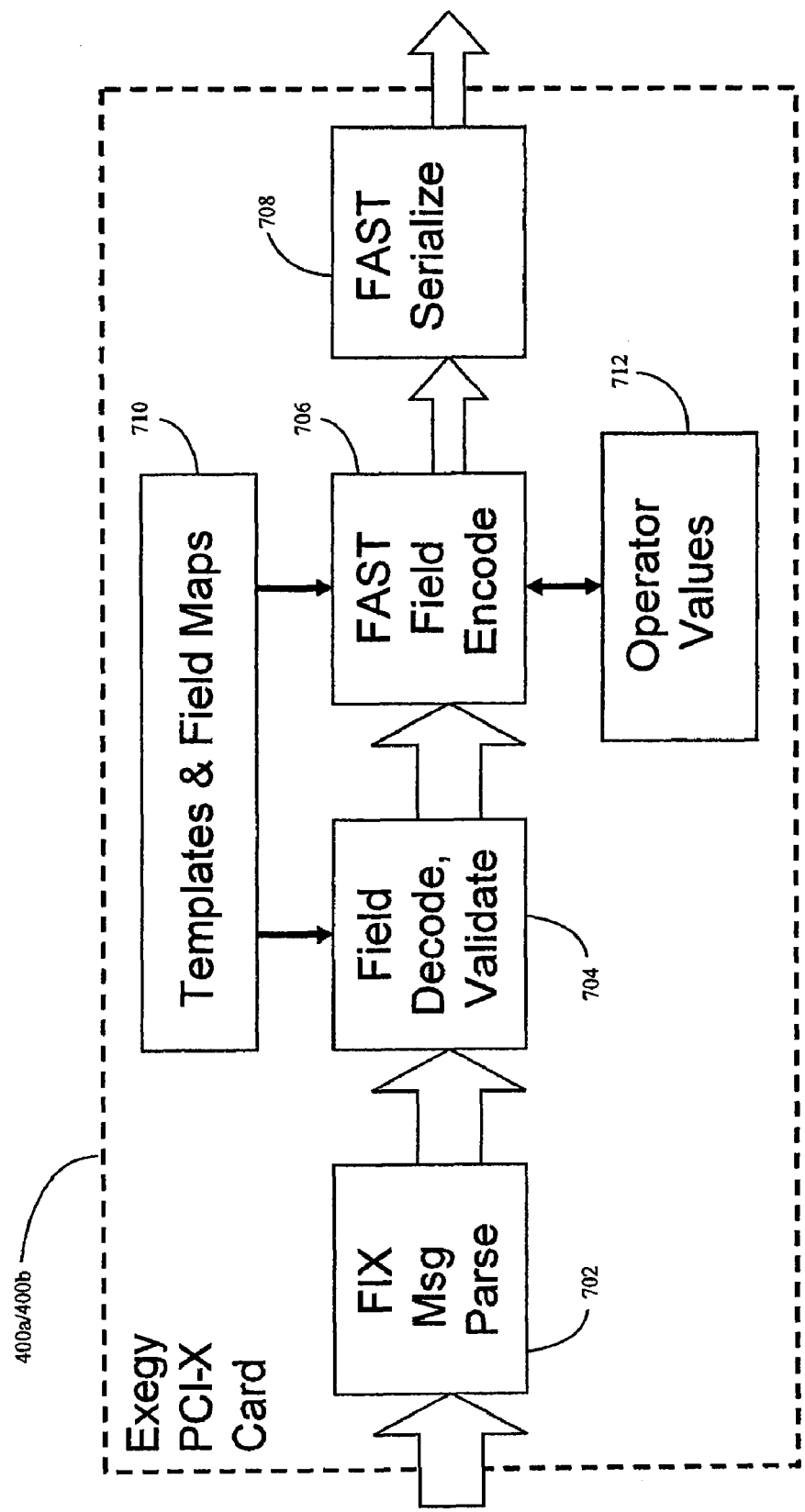
FIG. 7 illustrates an exemplary firmware application module pipeline for a message transformation from the Financial Information Exchange (FIX) format to the FIX Adapted for Streaming (FAST) format.

FIG. 7 illustrates an exemplary FAM pipeline for performing a FIX-to-FAST message transformation. FAM 702 is configured to receive an incoming stream of FIX messages and perform FIX message parsing thereon, as described above. Then the parsed message is passed to FAM 704, which is configured to field decode and validate the parsed message. To aid this process, FAM 704 preferably has access to stored templates and field maps in memory 710 (embodied by memory 404 on board 400). The templates identify what fields exist in a given message type, while the field maps uniquely identify specific fields in those message (by location or otherwise). Next, FAM 704 provides its output to FAM 706, which is configured to perform a FAST field encode on the received message components. Memory 710 and any operator values stored in memory 712 aid this process (memory 712 also being embodied by memory 404 on board 400). The operator values in memory 712 contains various state values that are preserved form one message to the next, as defined by the FAST encoding standard. Then, the encoded FAST messages are serialized by FAM 708 to form a FAST message stream and thereby complete the FIX to FAST transformation.

Figure 8:
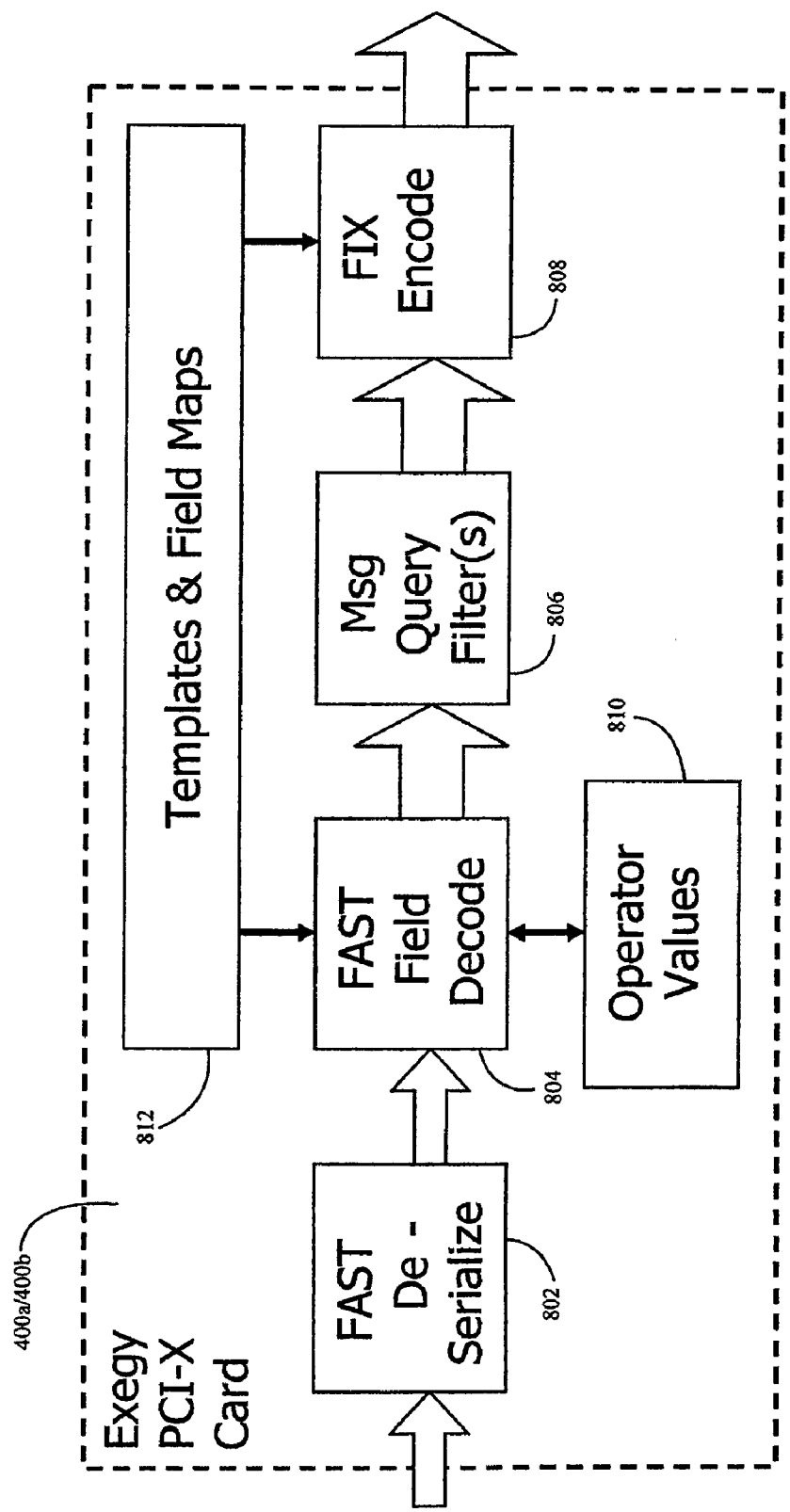
FIG. 8 illustrates an exemplary firmware application module pipeline for a message transformation from the FAST format to the FIX format.

FIG. 8 illustrates an exemplary FAM pipeline for performing a FAST-to-FIX message transformation. An incoming FAST stream is received by FAM 802, which deserializes the stream of FAST messages. The deserialized FAST messages are then provided to FAM 804, which operates to decode the various fields of the FAST messages as aided by the templates and field maps in memory 812 and the operator values in memory 810. Thereafter, FAM 806 is preferably configured to perform message query filtering. Message query filters allow for certain messages to be excluded from the message flow. Such filters are preferably parameterized in FAM 806 such that filtering criteria based on the field values contained within each message can be flexibly defined and loaded onto the FPGA. Examples of filtering criteria that can be used to filter messages include a particular type of instrument (e.g., common stock, warrant, bond, option, commodity, future, etc.), membership within a prescribed set of financial instruments (e.g., an index or "exchange traded fund" (ETF)), message type, etc. Next, FAM 808 operates to perform FIX message generation by appropriately encoding the various message fields, as aided by the templates and field maps in memory 812. Thus, the FAM pipeline shown in FIG. 8 operates to transform FAST message to FIX messages. Memory units 810 and 812 are preferably embodied by memory 404 of board 400.

Figure 9:
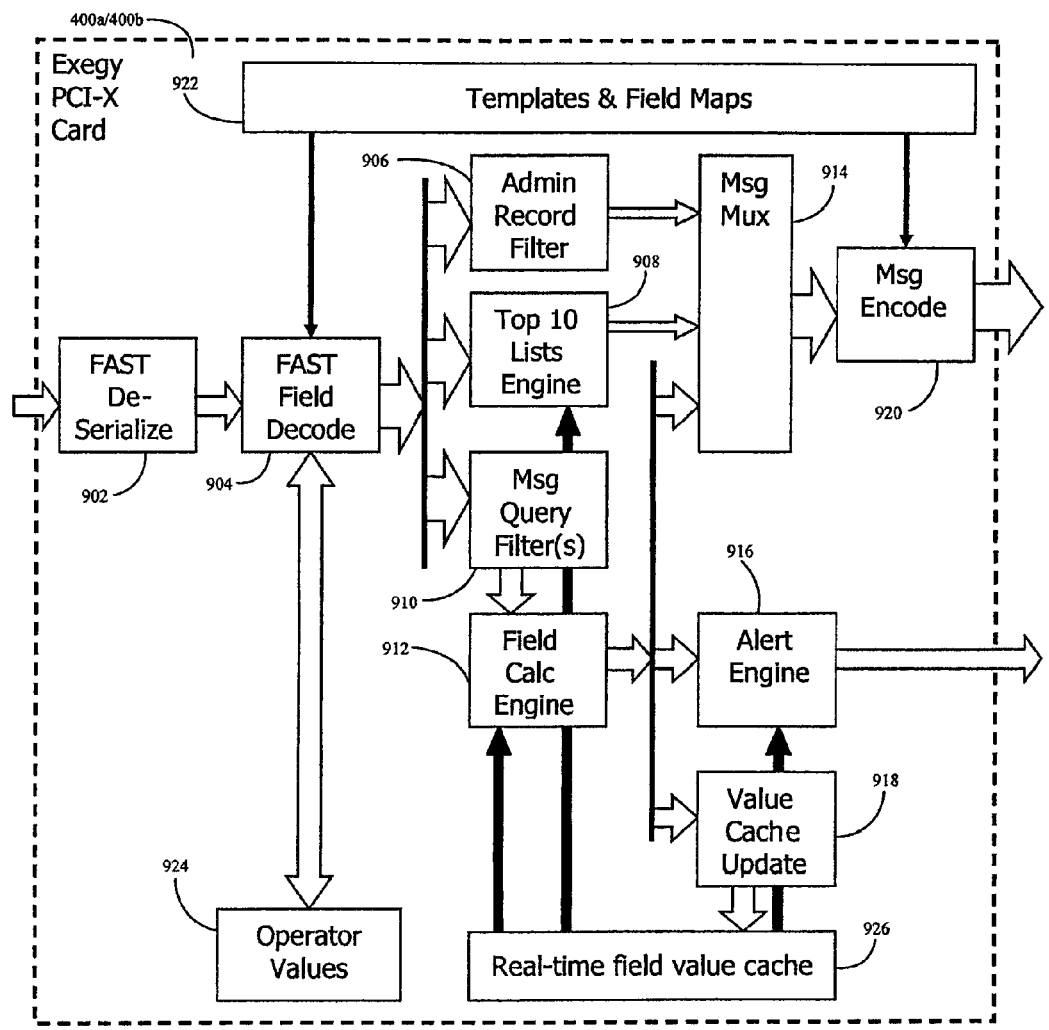
FIG. 9 illustrates an exemplary firmware application module pipeline for message format transformation, message data processing, and message encoding.

FIG. 9 depicts an exemplary FAM pipeline for carrying out a variety of data processing tasks. The FAM pipeline of FIG. 9 takes in a FAST message stream. FAMs 902 and 904 operate in the same manner as FAMs 802 and 804 in FIG. 8. Thus, the output of FAM 904 comprises the data content of the FAST message decomposed into its constituent fields. This content is then passed to a variety of parallel FAMS 906, 908, and 910. FAM 906 performs an administrative record filter on the data it receives. The administrative record filter preferably operates to pass through message types that are not processed by any of the other FAM modules of the pipeline. FAM 908 serves as a Top 10 lists engine, as described above. FAM 910 serves as a message query filter, as described above.

The output of FAM 910 is then passed to FAM 912, which is configured as a rule-based calculation engine, as described above. FAM 912 also receives data from a real time field value cache 926 to obtain LVC data, as does the top 10 list FAM

908. Cache 926 is preferably embodied by memory 404 of board 400. The output from the rule-based calculation engine FAM 912 is then passed to parallel FAMs 914, 916, and 918. FAM 914 serves as a message multiplexer, and receives messages from the outputs of FAMs 906, 908 and 912. FAM 920 receives the messages multiplexed by FAM 914, and serves to encode those messages to a desired format. FAM 916 serves as an alert engine, whose function is explained above, and whose output exits the pipeline. FAM 918 serves as a value cache update engine to ensuring that cache 926 stays current.

Figure 10:
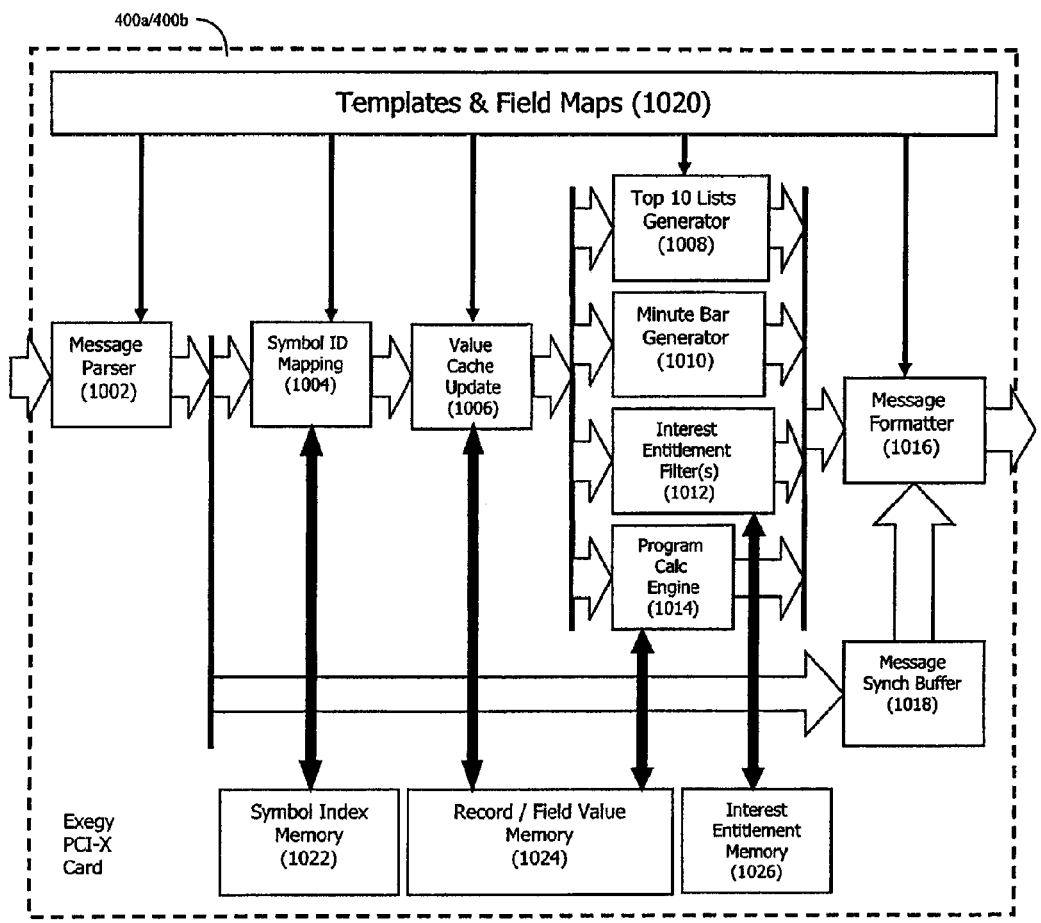
FIG. 10 illustrates another exemplary firmware application module pipeline for message format transformation, message data processing, and message encoding.

FIG. 10 depicts another exemplary FAM pipeline for carrying out multiple data processing tasks. FAM 1002 takes in a stream of fixed format messages and parses those messages into their constituent data fields. The output of FAM 1002 can be provided to FAM 1004 and FAM 1018. FAM 1018 serves as a message synchronization buffer. Thus, as the fields of the original parsed message are passed directly from FAM 1002 to FAM 1018, FAM 1018 will buffer those data fields while the upper path of FIG. 10 (defined by FAMs 1004, 1006, 1008, 1010, 1012, and 1014) process select fields of the parsed message. Thus, upon completion of the processing performed by the FAMs of the upper path, the message formatting FAM 1016, can generate a new message for output from the pipeline using the fields as processed by the upper path for that parsed message as well as the fields buffered in FAM 1018. The message formatter 1016 can then append the fields processed by the upper path FAMs to the fields buffered in FAM 1018 for that message, replace select fields buffered in FAM 1018 for that message with fields processed by the upper path FAMs, or some combination of this appending and replacing.

FAM 1004 operates to map the known symbol for a financial instrument (or set of financial instruments) as defined in the parsed message to a symbology that is internal to the platform (e.g., mapping the symbol for IBM stock to an internal symbol "12345"). FAM 1006 receives the output from FAM 1004 and serves to update the LVC cache via memory 1024. The output of FAM 1006 is then provided in parallel to FAMs 1008, 1010, 1012, and 1014.

FAM 1008 operates as a Top 10 list generator, as described above. FAM 1010 operates as a Minute Bar generator, as described above. FAM 1012 operates as an interest/entitlement filter, as described above, and FAM 1014 operates as a programmatic calculation engine, as described above. The outputs from FAMs 1008, 1010, 1012 and 1014 are then provided to a message formatter FAM 1016, which operates as described above to construct a fixed format message of a desired format from the outputs of FAMs 1008, 1010, 1012, 1014 and 1018.

In performing these tasks, FAM 1004 is aided by memory 1020 that stores templates and field maps, as well as memory 1022 that stores a symbol index. FAM 1006 is also aided by memory 1020 as well as memory 1024 which serves as an LVC cache. Memory 1020 is also accessed by FAM 1008, while memory 1024 is also accessed by FAM 1014. FAM 1012 accesses interest entitlement memory 1026, as loaded from storage 634 or provided by Application Software 300 during initialization of the board 400.

Figure 11:
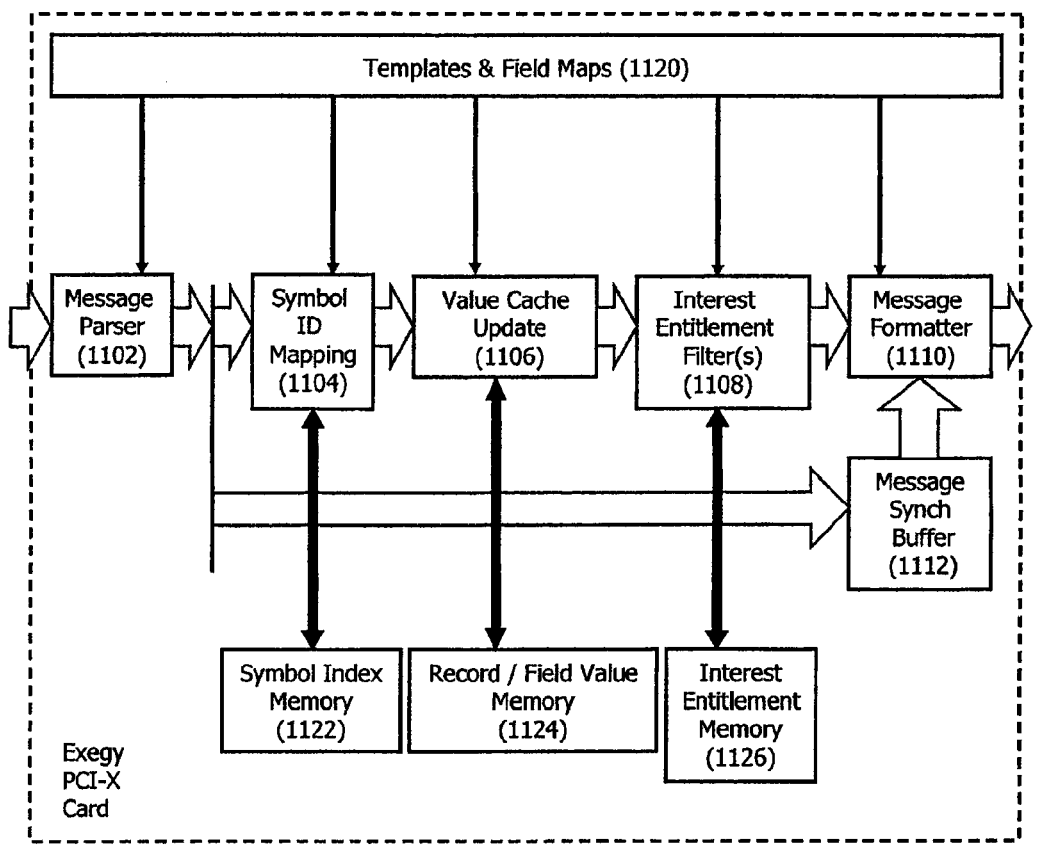
FIG. 11 depicts another exemplary firmware application module pipeline for performing the functions including symbol mapping, Last Value Cache (LVC) updates, interest and entitlement filtering.

FIG. 11 depicts an exemplary FAM pipeline for performing the functions of an exemplary ticker plant embodiment, including message parsing, symbol mapping, Last Value Cache (LVC) updates, and interest and entitlement filtering.

Message Parser FAM 1102 ingests a stream of messages, parses each message into its constituent fields, and propagates the fields to downstream FAMs. Message fields required for processing in FAMs 1104, 1106, and 1108 are passed to FAM 1104. Other message fields are passed to Message Synchronization Buffer FAM 1112. Message Parser FAM 1102 may be implemented to support a variety of message formats, including various types of fixed-formats and self-describing formats. A preferable message format provides sufficient flexibility to support the range of possible input events from financial exchanges. In a preferred implementation, the Message Parser FAM 1102 may be configured to support different message formats without altering the firmware. This may be achieved by loading message format templates into Template & Field Map buffer 1120. Message Parser FAM 1102 reads the message format description from buffer 1120 prior to processing input messages to learn how a given message is to be parsed.

Figure 12:
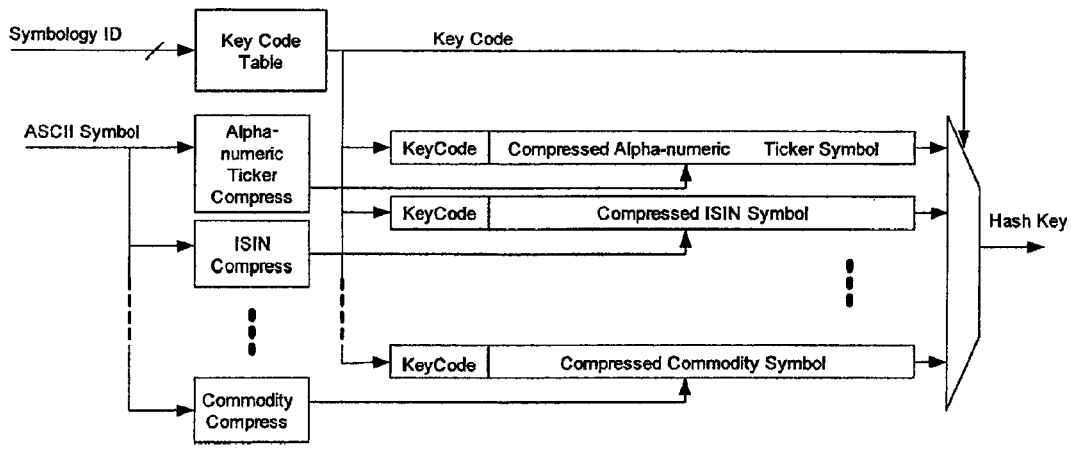
FIG. 12 depicts an exemplary embodiment of a compression function used to generate a hash key within a firmware application module configured to perform symbol mapping.

Like FAM 1004 in FIG. 10, Symbol ID Mapping FAM 1104 operates to map the known symbol for a financial instrument (or set of financial instruments) as defined in the parsed message to a symbology that is internal to the platform (e.g., mapping the symbol for IBM stock to an internal symbol "12345"). Preferably, the internal platform symbol identifier (ID) is an integer in the range 0 to N−1, where N is the number of entries in Symbol Index Memory 1122. Preferably, the symbol ID is formatted as a binary value of size $M=\log_2(N)$ bits. The format of financial instrument symbols in input exchange messages varies for different message feeds and financial instrument types. Typically, the symbol is a variable-length ASCII character string. A symbology ID is an internal control field that uniquely identifies the format of the symbol string in the message. As shown in FIG. 12, a symbology ID is preferably assigned by the feed handler, as the symbol string format is typically shared by all messages on a given input feed.

A preferred embodiment of the Symbol ID Mapping FAM maps each unique symbol character string to a unique binary number of size M bits. In the preferred embodiment, the symbol mapping FAM performs a format-specific compression of the symbol to generate a hash key of size K bits, where K is the size of the entries in the Symbol Index Memory 1122. The symbology ID may be used to lookup a Key Code that identifies the symbol compression technique that should be used for the input symbol. Preferably, the symbol mapping FAM compresses the symbol using format-specific compression engines and selects the correct compressed symbol output using the key code. Preferably, the key code is concatenated with the compressed symbol to form the hash key. In doing so, each compression technique is allocated a subset of the range of possible hash keys. This ensures that hash keys will be unique, regardless of the compression technique used to compress the symbol. An example is shown in FIG. 12 wherein the ASCII symbol for a financial instrument is compressed in parallel by a plurality of different compression operations (e.g., alpha-numeric ticker compression, ISIN compression, and commodity compression). Compression techniques for different symbologies can be selected and/or devised on an ad hoc basis as desired by a practitioner of the invention. A practitioner of the present invention is free to select a different compression operation as may be appropriate for a given symbology. Based on the value of the key code, the symbol mapping FAM will pass one of the concatenations of the key code and compression results as the output from the multiplexer for use as the hash key.

Alternatively, the format-specific compression engines may be implemented in a programmable processor. The key code may then be used to fetch a sequence of instructions that specify how the symbol should be compressed.

Once the hash key is generated, the symbol mapping FAM maps the hash key to a unique address in the Symbol Index Memory in the range 0 to N−1. The Symbol Index Memory may be implemented in a memory "on-chip" (within the reconfigurable logic device) or in "off-chip" high speed memory devices such as SRAM and SDRAM that are accessible to the reconfigurable logic device. Preferably, this mapping is performed by a hash function. A hash function attempts to minimize the number of probes, or table lookups, to find the input hash key. In many applications, additional meta-data is associated with the hash key. In the preferred embodiment, the location of the hash key in the Symbol Index Memory is used as the unique internal Symbol ID for the financial instrument.

Figure 13:
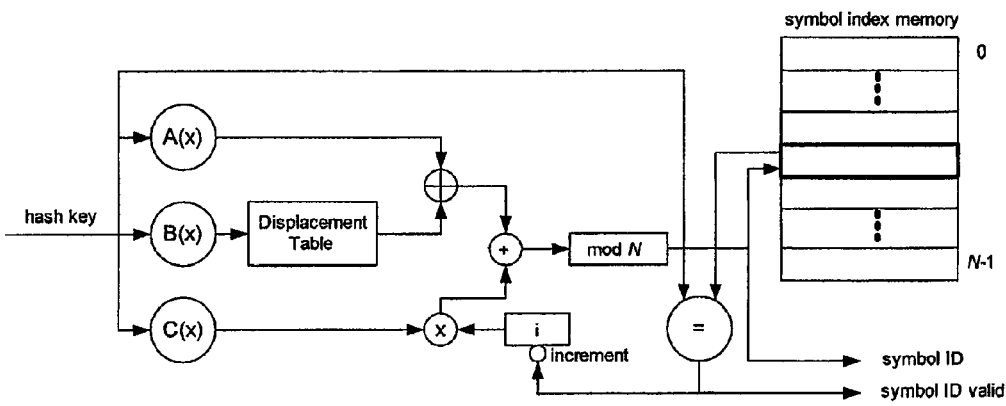
FIG. 13 depicts an exemplary embodiment of a hash function for deployment within a firmware application module configured to perform symbol mapping.

FIG. 13 shows a preferred embodiment of a hash function to perform this mapping that represents a novel combination of known hashing methods. The hash function of FIG. 13 uses near-perfect hashing to compute a primary hash function, then uses open-addressing to resolve collisions. The hash function H(x) is described as follows:

$$H(x) = (h1(x) + (i*h2(x))) \bmod N$$

$$h1(x) = A(x) \oplus d(x)$$

$$d(x) = T(B(x))$$

$$h2(x) = C(x)$$

The operand x is the hash key generated by the previously described compression stage. The function h1(x) is the primary hash function. The value i is the iteration count. The iteration count i is initialized to zero and incremented for each hash probe that results in a collision. For the first hash probe, hash function H(x)=h1(x), thus the primary hash function determines the first hash probe. The preferred hash function disclosed herein attempts to maximize the probability that the hash key is located on the first hash probe. If the hash probe results in a collision, the hash key stored in the hash slot does not match hash key x, the iteration count is incremented and combined with the secondary hash function h2(x) to generate an offset from the first hash probe location. The modulo N operation ensures that the final result is within the range 0 to N−1, where N is the size of the Symbol Index Memory. The secondary hash function h2(x) is designed so that its outputs are prime relative to N. The process of incrementing i and recomputing H(x) continues until the input hash key is located in the table or an empty table slot is encountered. This technique of resolving collisions is known as open-addressing.

The primary hash function, h1(x), is computed as follows. Compute hash function B(x) where the result is in the range 0 to Q−1. Use the result of the B(x) function to lookup a displacement vector d(x) in table T containing Q displacement vectors. Preferably the size of the displacement vector d(x) in bits is equal to M. Compute hash function A(x) where the result is M bits in size. Compute the bitwise exclusive OR, ⊕, of A(x) and d(x). This is one example of near-perfect hashing where the displacement vector is used to resolve collisions among the set of hash keys that are known prior to the beginning of the query stream. Typically, this fits well with streaming financial data where the majority of the symbols for the instruments trading in a given day is known. Methods for computing displacement table entries are known in the art.

The secondary hash function, h2(x), is computed by computing a single hash function C(x) where the result is always prime relative to N. Hash functions A(x), B(x), and C(x) may be selected from the body of known hash functions with favorable randomization properties. Preferably, hash functions A(x), B(x), and C(x) are efficiently implemented in hardware. The set of H3 hash functions are good candidates. (See Krishnamurthy et al., "*Biosequence Similarity Search on the Mercury System*", Proc. of the IEEE 15th Int'l Conf. on Application-Specific Systems, Architectures and Processors, September 2004, pp. 365-375, the entire disclosure of which is incorporated herein by reference).

Once the hash function H(x) produces an address whose entry is equal to the input hash key, the address is passed on as the new Symbol ID to be used internally by the ticker plant to reference the financial instrument. As shown in FIG. 13, the result of the hash key compare function may be used as a valid signal for the symbol ID output.

Hash keys are inserted in the table when an exchange message contains a symbol that was unknown at system initialization. Hash keys are removed from the table when a financial instrument is no longer traded. Alternatively, the symbol for the financial instrument may be removed from the set of known symbols and the hash table may be cleared, recomputed, and initialized. By doing so, the displacement table used for the near-perfect hash function of the primary hash may be optimized. Typically, financial markets have established trading hours that allow for after-hours or overnight processing. The general procedures for inserting and deleting hash keys from a hash table where open-addressing is used to resolve collisions is well-known in the art.

Figure 14:
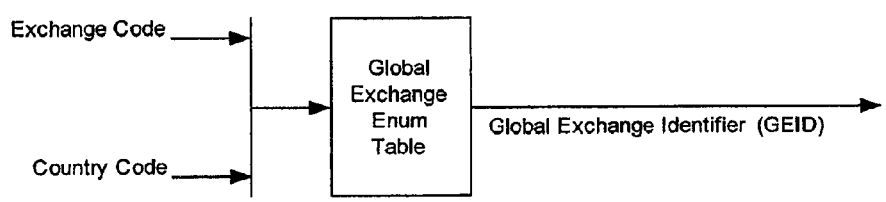
FIG. 14 depicts a preferred embodiment for generating a global exchange identifier (GEID) within a firmware application module configured to perform symbol mapping.

In a preferred embodiment, the symbol mapping FAM also computes a global exchange identifier (GEID) that maps the exchange code and country code fields in the exchange message to an integer in the range 0 to G−1, as shown in FIG. 14. Similar to the symbol field for financial instruments, the exchange code and country code fields uniquely identify the source of the exchange message. The value of G should be selected such that it is larger than the total number of sources (financial exchanges) that will be generating input messages for a given instance of the system. Hashing could be used to map the country codes and exchange codes to the GEID. Alternatively, a "direct addressing" approach can be used to map country and exchange codes to GEIDs. For example, the exchange code and country codes can each be represented by two character codes, where the characters are 8-bit uppercase ASCII alpha characters. These codes can then be truncated to 5-bit characters in embodiment where only 26 unique values of these codes are needed. For each code, these truncated values are concatenated to generate a 10-bit address that is used to lookup a compressed intermediate value in a stage 1 table. Then the compressed intermediate values for the exchange and country code can be concatenated to generate an address for a stage 2 lookup. The result of the stage 2 lookup is the GEID. The size of the intermediate values and the stage 2 address will depend on the number of unique countries and the max number of exchanges in any one country, which can be adjusted as new exchanges open in different countries.

Symbol mapping FAM 1106 passes input message field values, the symbol ID, and global exchange ID to Last Value Cache (LVC) Update FAM 1106. LVC Update FAM serves to update the LVC cache via memory 1124, as well as message fields that may depend on record field values. One example is the tick direction which indicates if the price in the message is larger or smaller than the previous price captured in the record.

Figure 15:
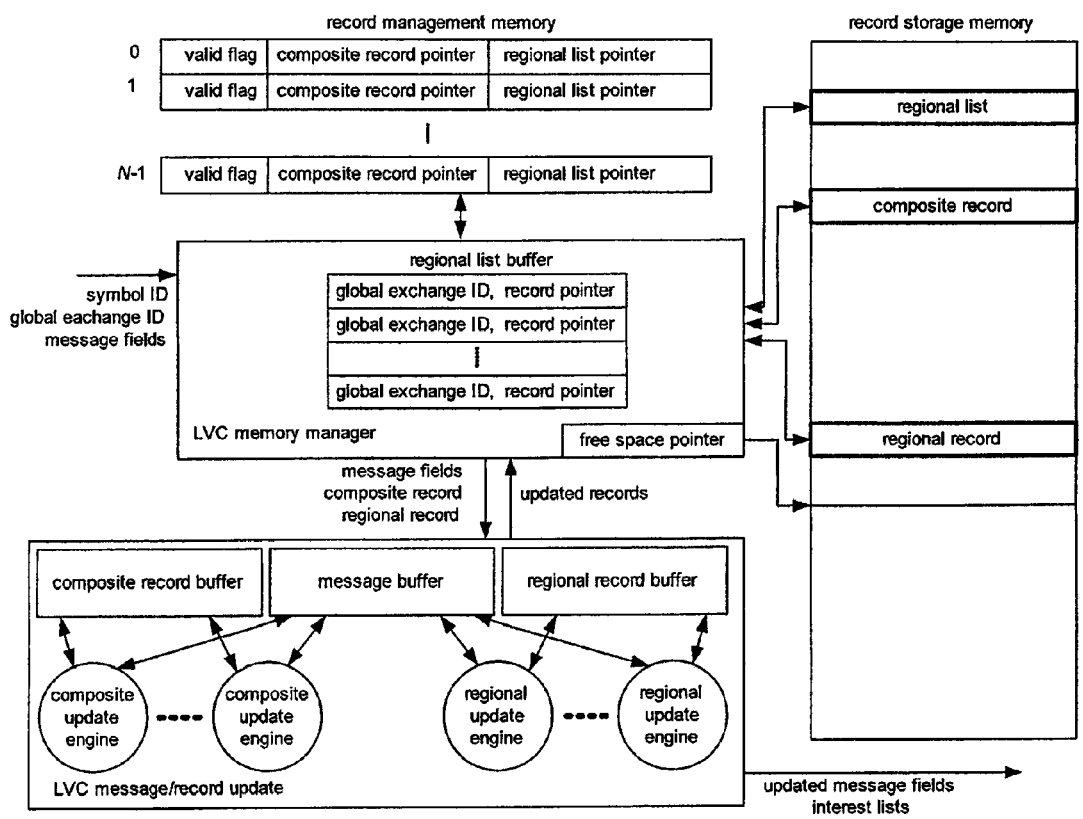
FIGS. 15(a) and (b) depict an exemplary embodiment for a firmware application module configured to perform Last Value Cache (LVC) updating.

As shown in FIGS. 15(*a*) and (*b*), the LVC memory manager retrieves one or more records associated with the financial instrument. The LVC memory manager passes the record and message fields to the LVC message/record updater. The LVC message/record updater contains a set of update engines that update the record and message fields according to specified business logic. The business logic for field updates may vary according to a number of parameters including event type (trade, quote, cancel, etc.), financial instrument type (security, option, commodity, etc.), and record type. In a preferred embodiment, the update engines are directed by business logic templates contained in Templates & Field Maps 1120. Techniques for template-driven update engines are well-known in the art.

Record fields may include but are not limited to: last trade price, last trade size, last trade time, best bid price, best bid size, best bid time, best ask price, best ask size, best ask time, total trade volume, daily change, tick direction, price direction, high trade price, high price time, low trade price, low price time, and close price. In a preferred embodiment, record fields also include derived fields such as: total trade volume at bid, total trade volume at ask, traded value, traded value at bid, traded value at ask, and volume-weighted average price (VWAP).

As reflected in FIGS. 15(*a*) and (*b*), a preferred embodiment of the LVC Update FAM maintains a composite record and a set of regional records for every financial instrument observed on the input feeds. A composite record reflects the current state of the financial instrument across all exchanges upon which it trades. A regional record reflects the current state of the financial instrument on a given exchange. For example, if stock ABC trades on exchanges AA, BB, and CC, then four records will be maintained by the LVC Update FAM, one composite record and three regional records. If an input message reports a trade of stock ABC on exchange BB, then the LVC Update FAM updates the composite record for ABC, the regional record for ABC on exchange BB, and the message fields according to the business logic for stock trade events on exchange BB.

As shown in FIG. 15(*a*), the LVC Memory Manger uses the symbol ID and global exchange ID to retrieve the composite and regional record. In a preferred embodiment, the symbol ID is used to retrieve an entry in the record management memory. The entry contains a valid flag, a composite record pointer, and a regional list pointer. The valid flag indicates whether the symbol ID is known, record(s) have been allocated, and the pointers in the entry are valid.

If the valid flag is set, the LVC Memory Manager uses the composite record pointer to retrieve the composite record from the record storage memory. The composite record is passed to the LVC message/record updater where it is stored in a composite record buffer for processing by the update engines. The LVC Memory Manger uses the regional list pointer to retrieve a regional list from the record storage memory. Note that regional list blocks may also be stored in the record management memory or in another independent memory. The regional list block contains pointers to the regional records for the financial instrument identified by the symbol ID. Since each regional record reflects the state of the instrument on a given exchange, a global exchange ID is stored with each regional pointer. The pointer to the regional record associated with the exchange specified in the message is located by matching the global exchange ID computed by the Symbol ID Mapping FAM. The LVC Memory Manger uses the regional pointer associated with the matching global exchange ID to retrieve the regional record from the record storage memory. The regional record is passed to the LVC message/record updater where it is stored in a regional record buffer for processing by the update engines.

If the valid flag in the record management memory entry is not set, then the LVC Memory Manager creates a new composite record, a new regional list block, and a new regional record for the financial instrument. The initial values for record fields may be drawn from Templates and Field Maps 1120. The regional list block will be initialized with at least one entry that contains a pointer to the new regional record and the global exchange ID received from the Symbol ID Mapping FAM. The LVC Memory Manger uses a free space pointer to allocate available memory in the record storage memory. After the memory is allocated, the free space pointer is updated. Freeing unused memory space, defragmenting memory, and adjusting the free space pointer may be performed by the LVC Memory Manager or by control software during market down times. Techniques for freeing memory space and defragmenting are well-known in the art. Once the records are initialized in record storage memory, the LVC Memory Manger writes the pointers into the management memory entry and sets the valid flag.

The LVC Memory Manager may also encounter a case where the valid flag in the memory management entry is set, but a matching global exchange ID is not found in the regional list. This will occur when a known financial instrument begins trading on a new exchange. In this case, the LVC Memory Manager allocates a new regional record and creates a new entry in the regional list block.

Once the record and message fields are loaded into their respective buffers, the update engines perform the field update tasks as specified by the business logic. Upon completion of their update tasks, the update engines signal the LVC Memory Manager. When all processor engines complete, the LVC Memory Manager writes updated records back to record storage memory. Processing can be deployed across the plurality of update engines in any of a number of ways. In one embodiment, a given record and its related message fields are passed through a sequence of update engines arranged in a pipeline. In another embodiment, each record and its related message fields are passed directly to an update engine that is configured to perform processing appropriate for the type of processing that the record and message fields needs. Preferably, the LVC updater is configured to balance the distribution of records and message fields across the plurality of different update engines so that a high throughput is maintained. In an exemplary embodiment, each update engine is configured to be responsible for updating a subset of the record fields (either regional or composite), with multiple engines operating in parallel with each other.

The LVC message/record updater passes updated message fields and interest lists to the Interest Entitlement Filter FAM 1108. An interest list contains a set of unique identifiers for users/applications that registered interest in receiving updates for the financial instrument. In a preferred embodiment, the set of user identifiers is specified using a bit vector where each bit position in the vector corresponds to a user identifier. For example, a 4-bit vector with the value 1010 represents the set of user identifiers {3,1}. The size of the interest list in bits is equal to the total number of user subscriptions allowed by the Ticker Plant. In a preferred embodiment, each record contains an interest list that is updated in response to user subscribe and unsubscribe events. By maintaining an interest list in the composite record, the Ticker Plant allows a subscription to include all transactions for a given financial instrument on every exchange upon which it trades. Preferably, each interest list for a given record is stored with that record in the record storage memory. Control software for the ticker plant, which maintains the set of interest lists for each record in a control memory can be configured to advise the LVC FAM of a new interest list vector for a given record so that the record storage memory can be updated as appropriate. Other types of subscriptions, such as exchange-based subscriptions, may also be enabled by the FAM pipeline.

In a preferred embodiment, the record storage memory and/or the record management memory is an external memory to the reconfigurable logic, such as a Synchronous Random Access Memory (SRAM) or Synchronous Dynamic Random Access Memory (SDRAM) device. Read and write transactions to external memory devices incur processing delays. A common technique for improving processing performance is to mask these delays by performing multiple transactions in a pipelined fashion. The LVC Memory Manger is designed as a pipelined circuit capable of performing the various processing steps in parallel, therefore allowing it to mask memory latencies and process multiple messages in parallel. Doing so enables the LVC Memory Manger to process more messages per unit time, i.e. achieve higher message throughput. By employing a functional pipeline, the LVC Memory Manager preferably recognizes occurrences of the same symbol ID within the pipeline and ensure correctness of records in update engine buffers. One method for doing so is to stall the pipeline until the updated records associated with the previous occurrence of the symbol ID are written back to record storage memory. In a preferred embodiment, the LVC Memory Manager utilizes a caching mechanism to always feed the correct record field values to the update engine buffers. Techniques for a memory cache are well-known in the art. The caching mechanism can be embodied as a memory, preferably a high-speed memory, located either on-chip (within the reconfigurable logic device) or off-chip (e.g., an SRAM or SDRAM device accessible to the reconfigurable logic device). However, it should also be noted that the cache can also be embodied by a full memory hierarchy with a multi-level cache, system memory, and magnetic storage. A record typically stays in the cache memory for the duration of a trading day. Such recently updated records can then be flushed out of the cache during an overnight processing ("roll") and archived. However, it should be noted that the cache can be configured to maintain records so long as space is available in the cache for storing new records, in which case a FIFO scheme can be used to maintain the cache.

Figure 15B:
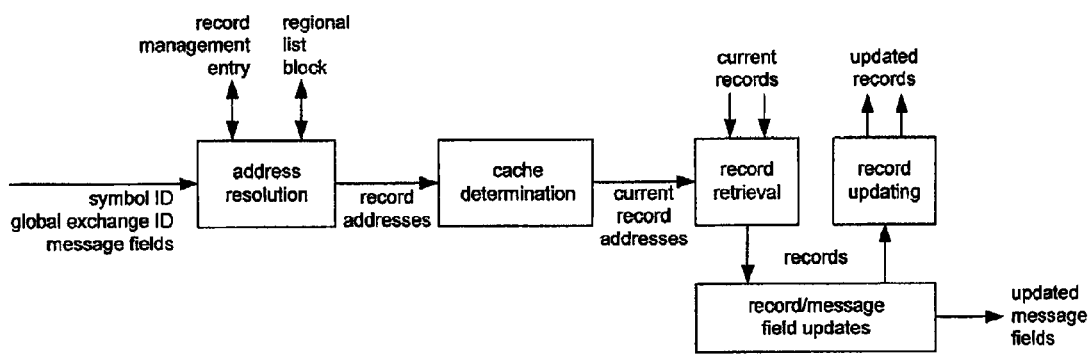

FIG. 15(b) presents an exemplary functional pipeline for masking memory and processing latencies. As discussed in relation to FIG. 15(a), the address resolution block determines the address of the regional and composite records using the symbol ID and global exchange ID to locate the memory management entry and regional list block. Note that each functional block in FIG. 15(b) may also be implemented in a pipelined fashion. For example, one sub-block in the address resolution block may issue a stream of read commands to the record management memory to retrieve record management entries. Another sub-block may process the stream of returned entries and issue a stream of read commands to the record storage memory to retrieve regional list blocks. Another sub-block may process the stream of returned list blocks to resolve regional record addresses. The last sub-block of the address resolution block passes the regional and composite record addresses to the cache determination block. By tracking the sequence of record addresses, this block determines the physical location of the "current" (most up-to-date) records: in the record cache or in the record storage memory. The cache determination block passes the physical record pointers to the record retrieval block. The record retrieval block fetches the records from the specified locations, loads them into the processing buffers for updating, then signals the processors to begin processing. Note that if the record cache and processing buffers are in the same memory space, the record retrieval block may essentially queue up several sets of records for the processors, allowing the processors to complete a processing task and immediately move on to the next set of records, even if the same set of records must be updated sequentially. Once the processors complete a set of records, they signal the record updating block to write the updated records back to record storage memory. Depending on the implementation of the record cache, copies of the updated records are written to cache or simply persist in the processing buffers for a period of time. In parallel, updated message fields are passed to the downstream FAM.

The LVC Update FAM 1106 passes interest lists, the global exchange ID, and updated message fields to the Interest Entitlement FAM 1108. The Interest Entitlement FAM computes a single interest list that is used to distribute the output message to the set of users/applications that have registered interest and are entitled to receive the message. As previously described, interest may be registered by subscribing to updates for the regional or composite interest, as well as subscribing to all updates from a given exchange. Access to real-time financial data is typically a purchased service where the price may vary depending on the scope of data access. In a preferred embodiment, a ticker plant is capable of accepting subscription requests from users/applications with varying levels of data access privileges.

Figure 16:
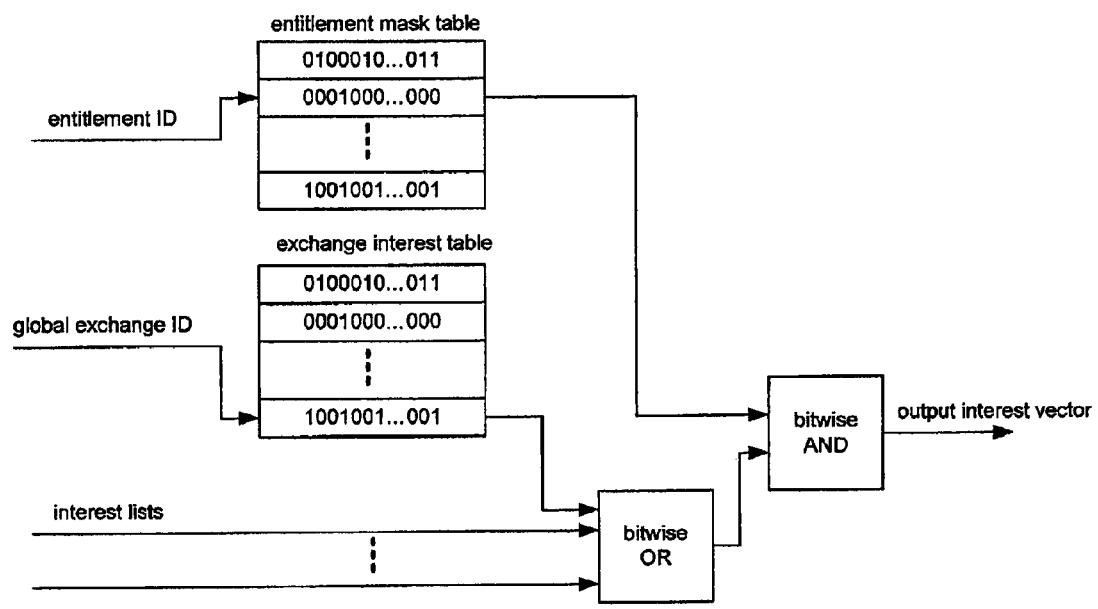
FIG. 16 depicts an exemplary embodiment for a firmware application module configured to perform interest and entitlement filtering.

As shown in FIG. 16, a preferred embodiment of the Interest Entitlement FAM operates on interest lists specified as bit vectors. The global exchange ID is used to lookup the exchange interest list in the exchange interest table. By using an exchange interest list, the embodiment of FIG. 16 allows traders to request notification of everything traded on a given exchange without individually subscribing to every instrument traded on that given exchange. Note that a global interest list, specifying users interested in all events, may also be stored in a register in the FAM. As shown in FIG. 16, all interest list vectors applicable to a message are combined using a bitwise OR operation. The resulting composite interest list vector contains the set of users that are interested in receiving the output message. An entitlement ID is used to lookup an entitlement mask. The entitlement ID may be specified by the feed handler that receives messages from the exchange, or alternative mechanisms such as a lookup based on message fields such as the global exchange ID, event type, and instrument type. Similar to the interest lists, the entitlement mask specifies which users/applications are entitled to receive the output message. The entitlement mask is applied to the combined interest list using a bitwise AND operation. The result is the final entitled interest vector specifying the set of entitled and interested users/applications. If the entitled interest bit vector is empty (e.g., all zeros), the message can be dropped from the pipeline. This entitled interest list and the message fields received from the LVC Update FAM are passed to the Message Formatter FAM 1110.

As previously described, the Message Formatter FAM 1110 serves to construct an output message from updated fields received from the Interest Entitlement Filter FAM and fields contained in the Message Synch Buffer FAM 1112. In a preferred embodiment, the format of the output message is specified by the Templates and Field Maps 1120. In a preferred embodiment, the output message includes the entitled interest list computed by the Interest Entitlement Filter. A subsequent functional block in the Ticker Plant processes the interest list and transmits copies of the output message to the interested and entitled users/applications.

Figure 17:
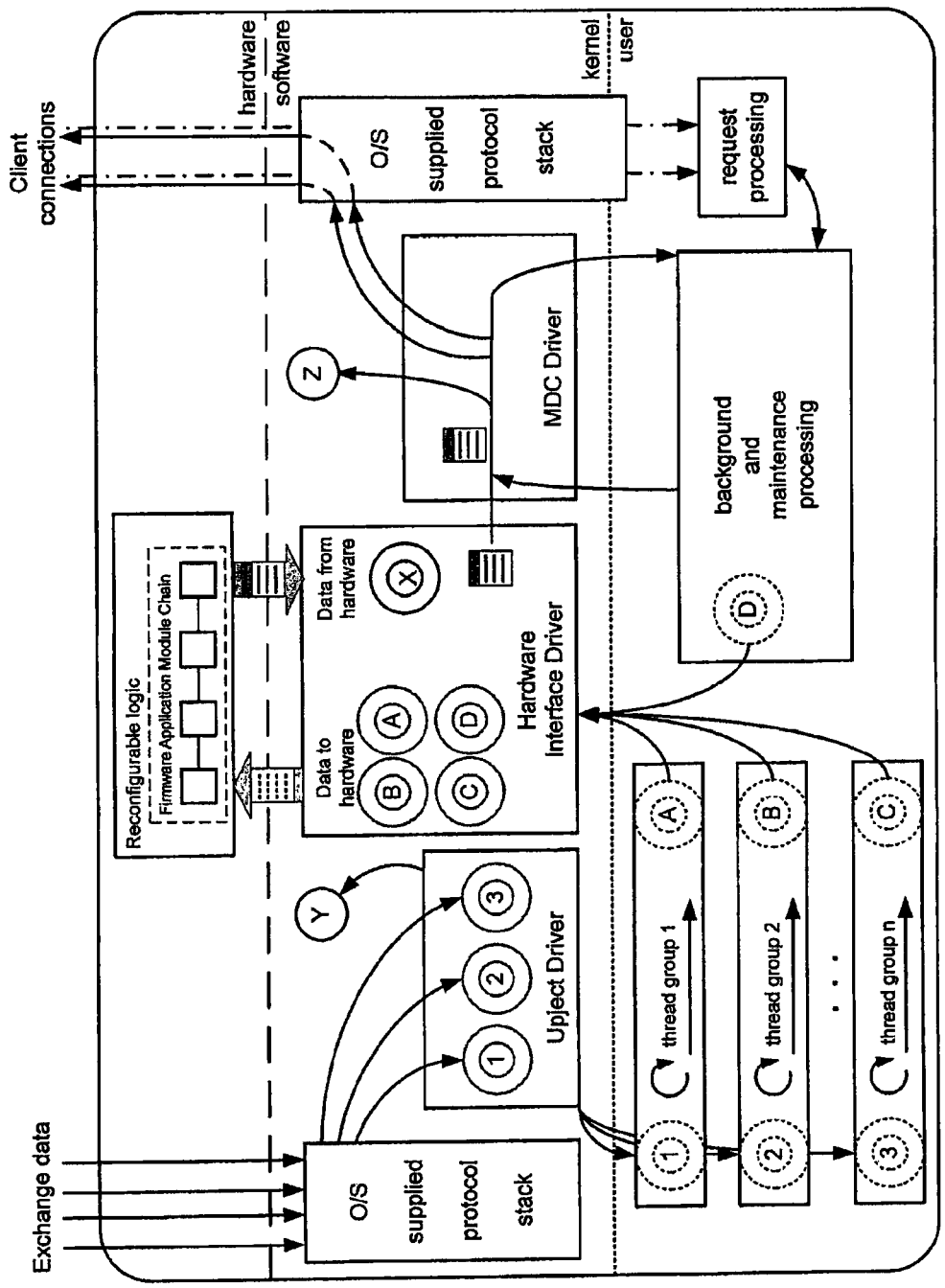
FIG. 17 depicts an exemplary embodiment of a ticker plant where the primary data processing functional units are deployed in reconfigurable hardware and where the control and management functional units are deployed in software on general purpose processors.

FIG. 17 depicts an exemplary embodiment of a ticker plant highlighting the interaction and data flow amongst the major subcomponents that enable this embodiment of a ticker plant to maintain high performance and low latency while processing financial data. FIGS. 18, 19, 20, 21, and 22 depict detailed views of the data flow and the component interaction presented in FIG. 16. These figures provide additional information for inbound exchange data processing, data normalization, interaction with reconfigurable logic, data routing, and client interaction respectively.

Financial market data generated by exchanges is increasing at an exponential rate. Individual market events (trades, quotes, etc) are typically bundled together in groups and delivered via an exchange feed. These exchange feeds are overwhelmingly delivered to subscribers using the Internet Protocol over an Ethernet network. Due to constraints on packet size dictated by the network environment, data groups transmitted by the exchange tend to be limited to sizes less than 1500 bytes.

As market data rates increase, the number of data groups that must be processed by a ticker plant increases. In typical ticker plant environments, each network packet received by the ticker plant must be processed by the network protocol stack contained within the Operating System and delivered to a user buffer. This processing includes one or more data copies and an Operating System transition from "kernel" or "supervisor" mode to user for each exchange data packet. An increase in data rates in turn increases the processing burden on the ticker plant system to deliver individual exchange data messages to the user level process.

Figure 18:
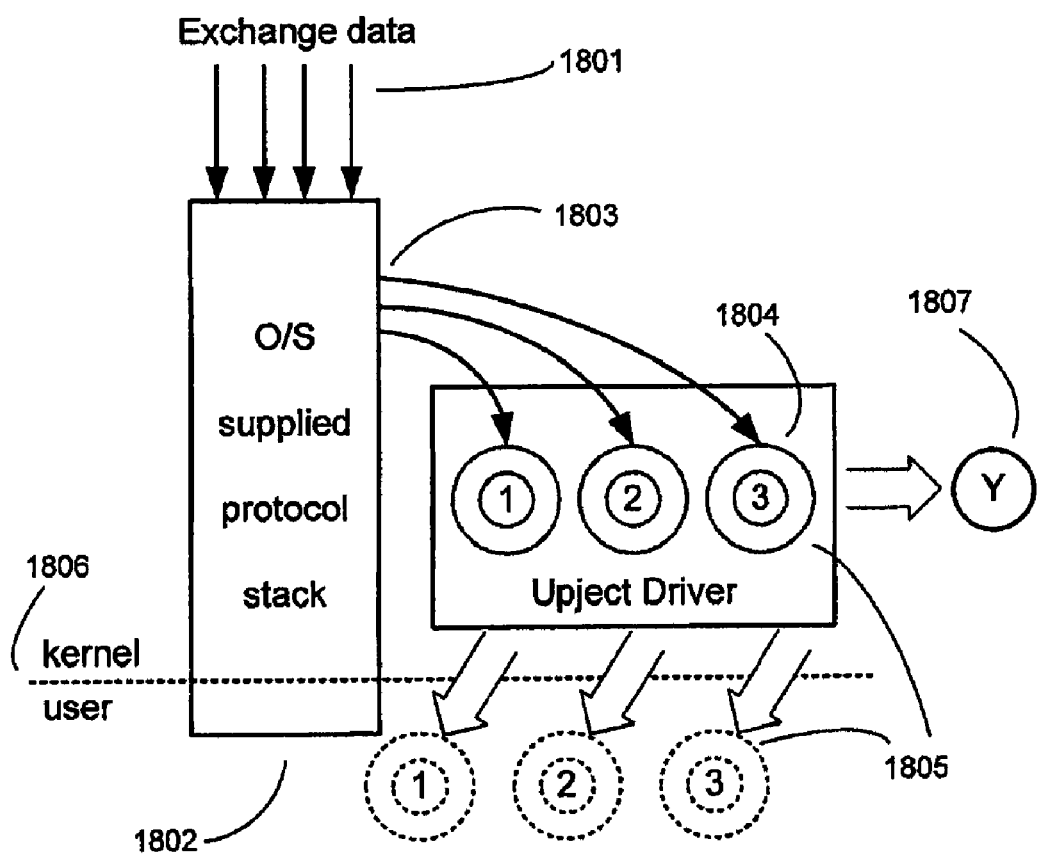
FIG. 18 depicts an exemplary data flow for inbound exchange traffic in the ticker plant of FIG. 17.

The device depicted in FIG. 17 uses a novel approach to efficiently deliver the exchange data to the user process. FIG. 18 shows the exemplary data flow for inbound exchange traffic in a ticker plant. Exchange data enters the ticker plant at 1801 and is processed by the Operating System supplied network protocol stack. Typical ticker plants use a user-mode interface into the network protocol stack at 1802. This method of connecting to the protocol stack incurs processing overhead relating to buffer copies, buffer validation, memory descriptor table modifications, and kernel to user mode transitions for every network data packet received by the ticker plant. As shown in FIG. 18, an Upject Driver is employed that interfaces with the operating system supplied network protocol stack at the kernel level at 1803. Individual data packets are processed at the kernel level and copied directly into a ring buffer at 1804, thus avoiding subsequent data copies and kernel to user mode transitions incurred when accessing the protocol stack via the user mode interface.

The ring buffers employed by the Upject Driver are shared memory ring buffers that are mapped into both kernel and user address spaces supported by the Operating System at 1805. The boundary between kernel mode operations and user mode operations is shown at 1806. Data written to the kernel address space of one of these ring buffers is instantly accessible to the user mode code because both the user mode and kernel mode virtual addresses refer to the same physical memory. Utilizing the shared ring buffer concepts, the preferred embodiment of a Ticker Plant does not have to perform user to kernel mode transitions for each network data packet received and thus achieves a performance boost. Additionally, the Upject Driver can utilize the shared ring buffer library to directly transfer inbound data to other kernel processes, device drivers, or user processes at 1807. This versatile shared ring buffer interconnect enables fast-track routing of network traffic directly to Reconfigurable logic via the Hardware Interface Driver.

General purpose computers as known in the art employ "multi-core" or "multi-processor" technology to increase the available compute resources in a computer system. Such multi-core systems allow the simultaneous execution of two or more instruction streams, commonly referred to as "threads of execution". To fully utilize the compute power of these multiple processor systems, software must be designed to intelligently manage thread usage, resource contention and interdependencies between processing threads. The data normalization component of the preferred embodiment of a Ticker Plant employs thread groups to efficiently normalize raw exchange data.

Thread groups improve processing efficiency of the preferred embodiment of a Ticker Plant by using the following techniques:
1. Limit the execution of the Operating System scheduling mechanism by matching the number of worker threads to the number of available instruction processors.
2. Enable multiple exchange feeds to be processed by a single thread group.
3. Eliminate resource contention between different thread groups.
4. Remove synchronization points within the compute path of each thread group, further increasing processing efficiency.
5. Perform message normalization in a single compute path, including line arbitration, gap detection, retransmission processing, event parsing, and normalized event generation.
6. Associate exchange feeds with individual thread groups using a configuration file.

Figure 19:
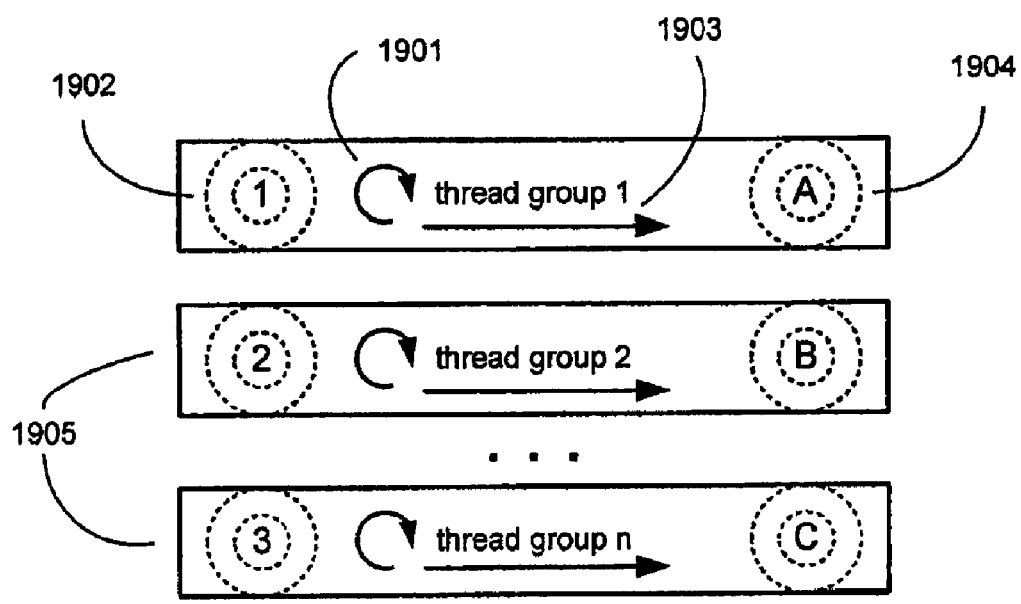
FIG. 19 depicts an exemplary processing of multiple thread groups within the ticker plant of FIG. 17.

FIG. 19 depicts the processing of several thread groups. Each thread group contains a single thread of execution at 1901. All operations performed by a thread group are executed on the single processing thread associated with the thread group. A separate input ring buffer is associated with each thread group at 1902. Inbound exchange data is deposited into the appropriate ring buffer. The processing thread for the thread group detects the presence of new data in the ring buffer and initiates normalization processing on the data one event at a time at 1903. Normalization processing involves parsing inbound messages, arbitrating amongst messages received on multiple lines, detecting sequence gaps, initiating retransmission requests for missed messages, eliminating duplicate events, and generating normalized exchanged events. This processing results in the creation of normalized events that are deposited into an output ring buffer at 1904.

All of the processing for any single thread group is completely independent of the processing for any other thread group. No data locking or resource management is required during the normalization process which eliminates the possibility of thread blocking due to contention for a shared resource. The preferred embodiment of a Ticker Plant supports a variable number of thread groups at 1905. The number of thread groups and the number of exchange feeds processed by each thread group are configurable, enabling the Ticker Plant to efficiently utilize additional compute resources as they become available in future generations of computer systems. The association of inbound data feeds with individual thread groups is defined in a configuration file that is read during initialization processing.

Figure 20:
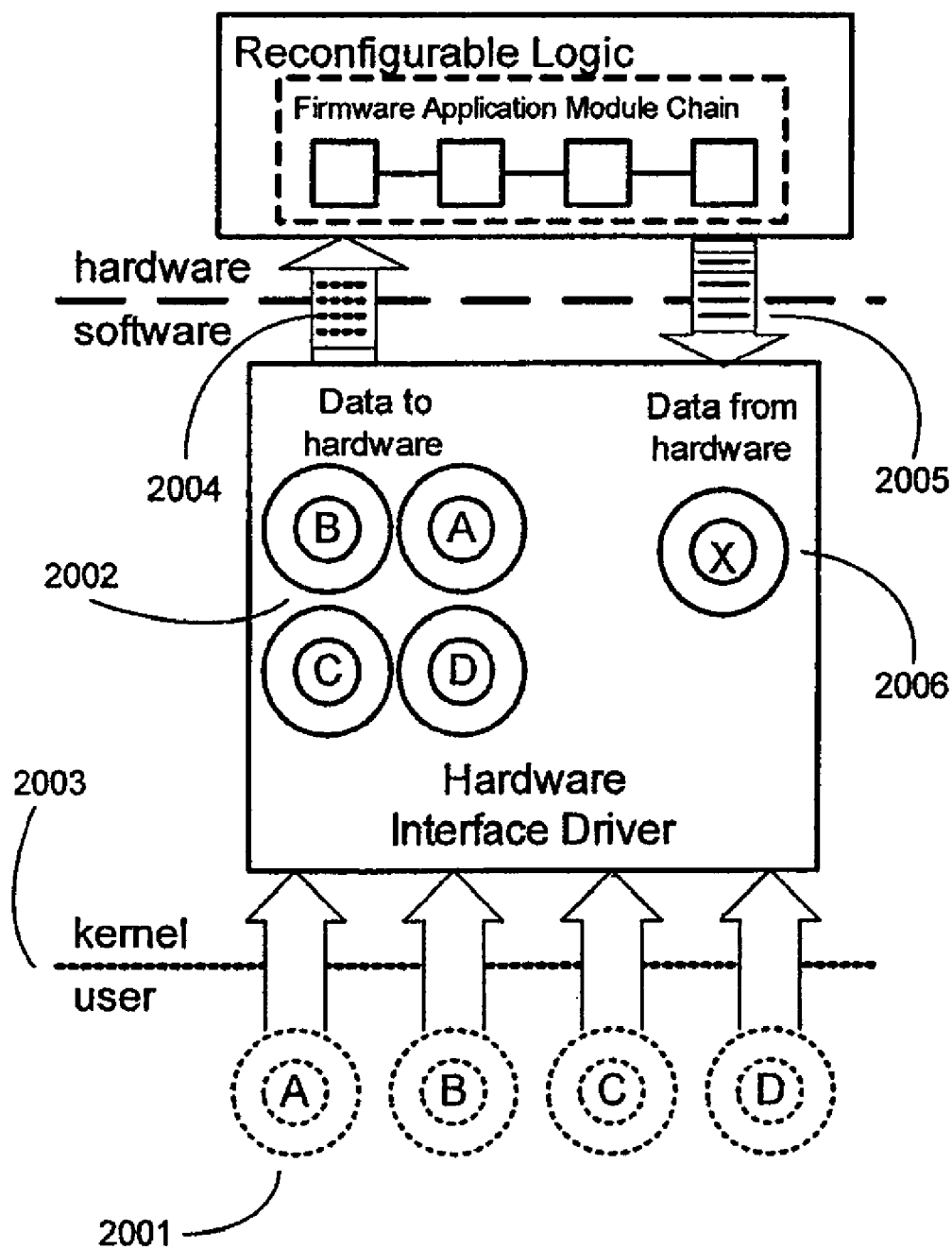
FIG. 20 depicts an example of data flow between the hardware interface driver and reconfigurable logic within the ticker plant of FIG. 17.

The Hardware Interface Driver in the preferred embodiment of a Ticker Plant is optimized to facilitate the efficient movement of large amounts of data between system memory and the reconfigurable logic. FIG. 20 shows the data movement between the Hardware Interface Driver and the reconfigurable logic. User mode application data destined for the reconfigurable logic is written to one of the shared memory ring buffers at 2001. These are the same buffers shown at 1904 in FIG. 19. These ring buffers are mapped into both kernel address space and into user space. Data written to these buffers is immediately available for use by the Hardware Interface Driver at 2002. The boundary between user space and kernel space is noted at 2003.

The Hardware Interface Driver is responsible for updating descriptor tables which facilitates the direct memory access (DMA) data transfers to the reconfigurable logic. Normalized market data events are transferred to the reconfigurable logic at 2004. The reconfigurable logic and Firmware Application Module Chain perform the operational functions as noted above. Processed market events are transferred back to the Hardware Interface Driver at 2005 and deposited into a ring buffer at 2006.

Figure 21:
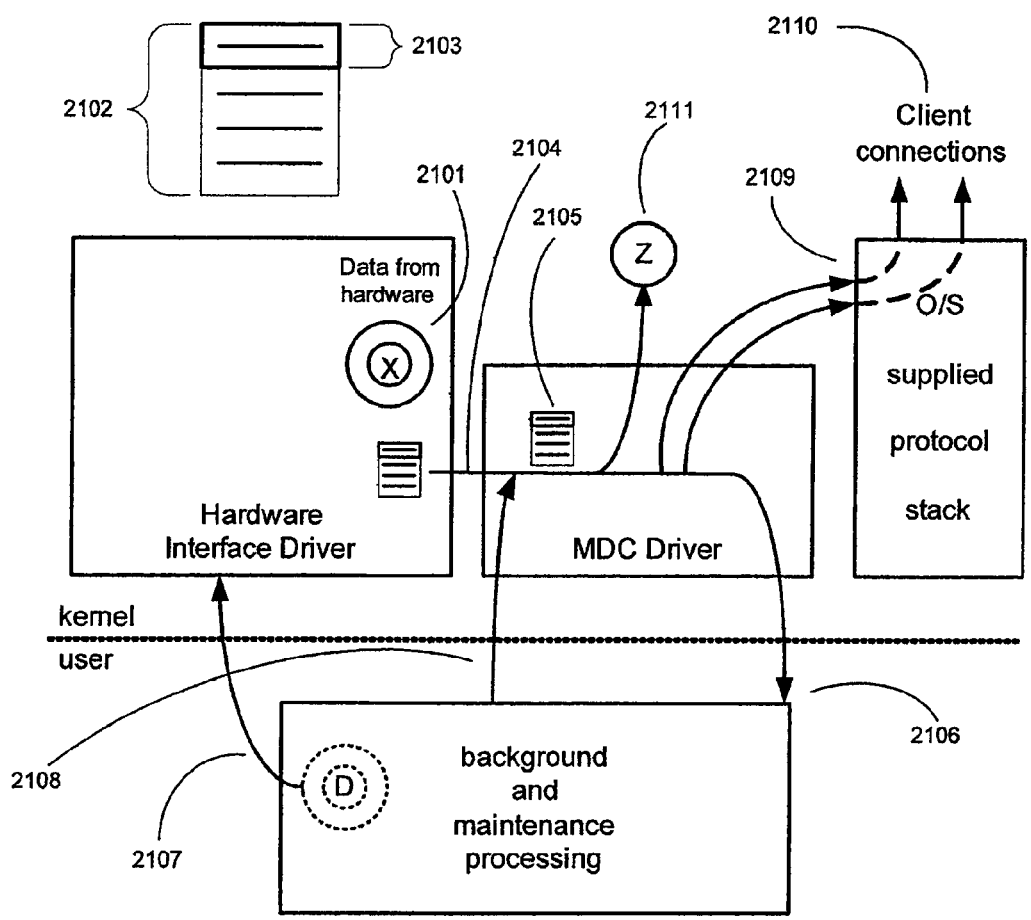
FIG. 21 depicts an example of data flows within the ticker plant of FIG. 17 for data exiting the reconfigurable logic.

A novel feature of the preferred embodiment of a Ticker Plant is the ability to route data to consumers through a "fast track" by bypassing the time consuming data copies and Operating System mode switches. An operating system mode switch occurs whenever software transitions between user mode processing and kernel mode processing. Mode switches are expensive operations which can include one or more of the following operations: software interrupt processing, address validation, memory locking and unlocking, page table modifications, data copies, and process scheduling. FIG. 21 depicts an exemplary design of a low latency data routing module. After processing by the reconfigurable logic, market data events are delivered to the Hardware Interface Driver at 2101. Each market data event as shown at 2102 contains a routing vector at 2103. This routing vector, which is preferably embodied by the entitled interest bit vector, is populated by the reconfigurable logic (preferably the interest and entitlement FAM) and contains the information necessary to deliver each event to the appropriate consumers. A table maintained by the software preferably translates the bit positions of the entitled interest bit vector to the actual entities entitled to the subject data and who have expressed interest in being notified of that data.

The Hardware Interface Driver calls into the MDC Driver for each event received from the reconfigurable logic at 2104. The MDC Driver is responsible for the fast track data routing of individual enhanced market data events. The routing information associated with each event is interrogated at 2105. This interrogation determines the set of destination points for each event. Each event can be routed to one or more of the following: kernel modules, protocol stacks, device drivers, and/or user processes. Exception events, results from maintenance commands, and events that require additional processing are routed via a slow path to the user mode background and maintenance processing module at 2106. The background and maintenance processing module has the ability do inject events directly into the Hardware Interface Driver at 2107 for delivery to the reconfigurable logic or to the MDC Driver at 2108 for delivery to a connected consumer.

Similar to the Upject Driver, the MDC Driver also maintains a kernel level interface into the Operating System supplied network protocol stack at 2109. This kernel level interface between the MDC Driver and the protocol stack provides a fast path for delivering real-time market events to clients connects via a network at 2110. The event routing logic contained within the MDC Driver interrogates the event routing information contained in each event and passes the appropriate events directly to the network protocol stack.

The MDC driver also has the ability to route market events to other consumers at 2111. These other consumers of real-time market events include, but are not limited to, network drivers for clients connected via a variety of network interconnect methodologies, kernel-mode modules or device drivers, hardware devices including reconfigurable logic, and different user mode processes. The MDC Driver is a flexible data routing component that enables the preferred embodiment of a Ticker Plant to deliver data to clients with the lowest possible latency.

Figure 22:
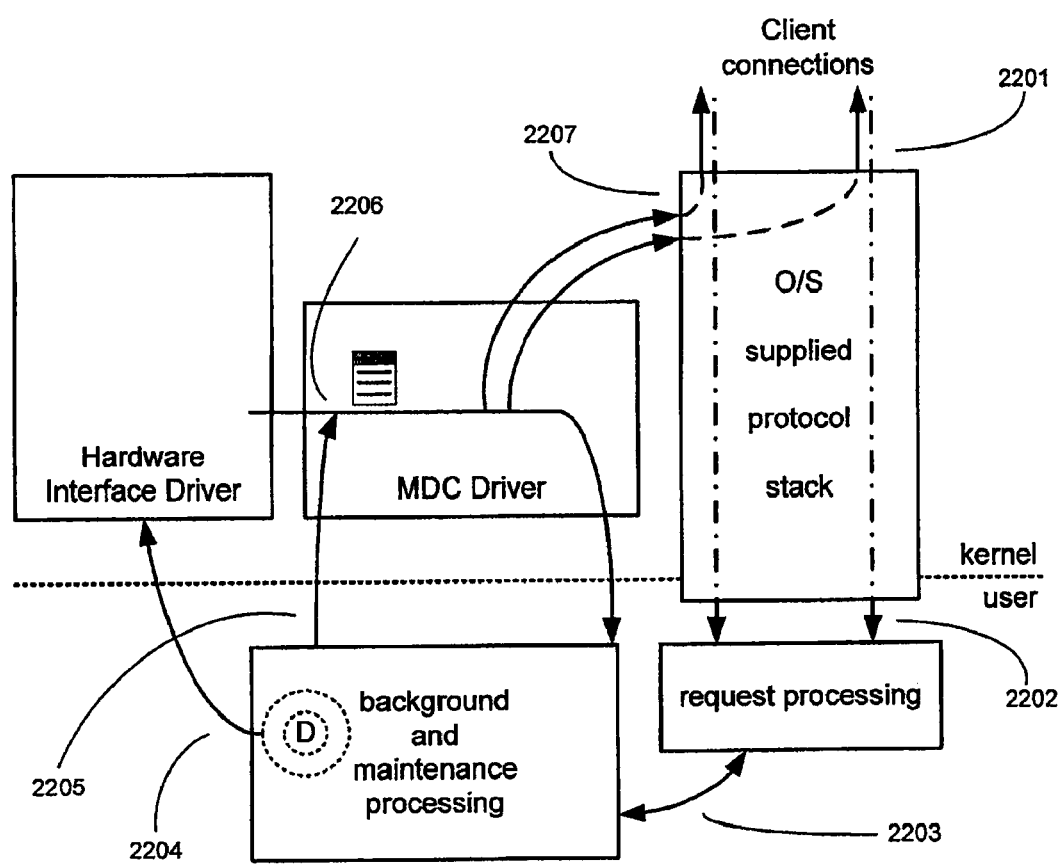
FIG. 22 depicts an exemplary model for managing client connections with the ticker plant of FIG. 17.

FIG. 22 depicts an exemplary model for managing client connections. Remote clients connect to the over a network that is driven by an Operating System supplied network protocol stack at 2201. A request processing module interfaces with the Operating System supplied network protocol stack in user mode at 2202. The request processing module parses and validates all client requests. Client requests are then passed to the background and maintenance processing module at 2203. Clients typically make subscription requests that include the name of one or more securities instruments. A subscription request for a valid instrument results in a successful response sent back to the client via 2205 and a refresh image representing the current prices of the requested instrument that is initiated at 2204. Additional control information is sent to the Firmware Application Module Chain to enable the routing of all subsequent events on the specified instrument to the client. Additional requests can be made for an instantaneous data snapshot, historical data, and other data or services, including but not limited to options calculation, user defined composites, and basket calculations.

Depending on the nature of the client request, the background and maintenance processing module can either issue commands to the FAMs contained in reconfigurable logic via the Hardware Interface Driver at 2204, or it can respond directly to client request by sending properly formatted responses to the MDC driver at 2205. The MDC Driver uses spinlocks to synchronize responses to client requests with real-time market events at 2206. Responses to client requests and real-time market events are processed in the same manner by the MDC Driver using common event routing logic. Events and responses destined for a remote client are passed via a fast track path to the Operating System supplied network protocol stack at 2207 for delivery to the remote client.

Thus, as shown in FIG. 6, a platform 600 developed in the practice of the invention can be designed to improve data processing speeds for financial market information, all while reducing the number of appliances needed for platform 600 (relative to conventional GPP-based systems) as well as the space consumed by such a platform. With a platform 600, a user such as a trader at a work station 104 (or even a customer-supplied application software program 150 that accesses the platform via an application programming interface (API), can obtain a variety of information on the financial markets with less latency than would be expected from a conventional system. This improvement in latency can translate into tremendous value for practitioners of the invention.

While these figures illustrate several embodiments of FAM pipelines that can be implemented to process real time financial data streams, it should be noted that numerous other FAM pipelines could be readily devised and developed by persons having ordinary skill in the art following the teachings herein.

Further still it should be noted that for redundancy purposes and/or scaling purposes, redundant appliances 604, 606, 608, 610, 612, 614 and 616 can be deployed in a given market data platform 600.

Furthermore, it should also be noted that a practitioner of the present invention may choose to deploy less than all of the functionality described herein in reconfigurable logic. For example, device 604 may be arranged to perform only options pricing in reconfigurable logic, or some other subset of the functions listed in FIG. 6. If a user later wanted to add additional functionality to device 604, it can do so by simply re-configuring the reconfigurable logic of system 200 to add any desired new functionality. Also, the dashed boxes shown in FIG. 6 enclose data processing functionality that can be considered to belong to the same category of data processing operations. That is, devices 612 and 614 can be categorized as management operations. Device 604 can be categorized as providing feed handling/processing for data access, value-added services, and historic services. Devices 606, 608 and 610 can be categorized as direct market access trading systems. As improvements to reconfigurable logic continues over time such that more resources become available thereon (e.g., more available memory on FPGAs), the inventors envision that further consolidation of financial data processing functionality can be achieved by combining data processing operations of like categories, as indicated by the dashed boxes, thereby further reducing the number of appliances 200 needed to implement platform 600. Further still, in the event of such resource improvements over time for FPGAs, it can be foreseen that even further consolidation occur, including consolidation of all functionality shown in FIG. 6 on a single system 200.

While the present invention has been described above in relation to its preferred embodiments, various modifications may be made thereto that still fall within the invention's scope as will be recognizable upon review of the teachings herein. As such, the full scope of the present invention is to be defined solely by the appended claims and their legal equivalents.

What is claimed is:

1. A method for processing a plurality of financial market data messages, each message corresponding to a financial instrument and comprising financial market data for its corresponding financial instrument, the method comprising:

storing a plurality of first memory financial instrument records in a first memory at a plurality of first memory addresses, each first memory financial instrument record corresponding to a financial instrument and comprising a plurality of fields for storing financial market data for their corresponding financial instruments;

storing a plurality of second memory financial instrument records in a second memory at a plurality of second memory addresses, each second memory financial instrument record corresponding to a financial instrument and comprising pointer information for locating a first memory financial instrument record in the first memory that corresponds to the same financial instrument; and processing streaming data corresponding to a plurality of the messages through a reconfigurable logic device, the processed data comprising (1) a plurality of symbol identifiers for the messages' corresponding financial instruments, and (2) a plurality of message fields having financial market data for the messages' corresponding financial instruments, the reconfigurable logic device comprising a plurality of pipelined data processing blocks deployed in firmware logic on the reconfigurable logic device, the pipelined data processing blocks comprising (1) an address resolution block, (2) a record retrieval block downstream from the address resolution block, and (3) a field updating block downstream from the record retrieval block, and wherein the processing step comprises:

the address resolution block (1) retrieving a plurality of second memory financial instrument records from the second memory based on the symbol identifiers, the retrieved second memory financial instrument records corresponding to the financial instruments which correspond to the symbol identifiers, and (2) processing the retrieved second memory financial instrument records to resolve the first memory addresses corresponding to the pointer information in the retrieved second memory financial instrument records;

the record retrieval block retrieving a plurality of first memory financial instrument records from the first memory based on the resolved first memory addresses; and the field updating block generating a plurality of updates for a plurality of the fields of the retrieved first memory financial instrument records based on the financial market data in a plurality of the message fields for the messages corresponding to the financial instruments which correspond to the retrieved first memory financial instrument records; and wherein the address resolution block, the record retrieval block, and the field updating block perform their respective steps simultaneously with respect to each other in a pipelined fashion.

2. The method of claim 1 further comprising:

communicating data representative of the generated updates from the reconfigurable logic device to customer-supplied application software via an application programming interface (API); and the application software further processing the communicated data.

3. A device for processing a plurality of streaming financial market data messages, each message corresponding to a financial instrument and comprising financial market data for its corresponding financial instrument, the device comprising:

a first memory configured to store a plurality of first memory financial instrument records at a plurality of first memory addresses, each first memory financial instrument record corresponding to a financial instrument and comprising a plurality of fields for storing financial market data for their corresponding financial instruments;

a second memory configured to store a plurality of second memory financial instrument records at a plurality of second memory addresses, each second memory financial instrument record corresponding to a financial instrument and comprising pointer information for locating a first memory financial instrument record in the first memory that corresponds to the same financial instrument; and a reconfigurable logic device configured to process data corresponding to a plurality of the streaming messages, the processed data comprising (1) a plurality of symbol identifiers for the messages' corresponding financial instruments, and (2) a plurality of message fields having financial market data for the messages' corresponding financial instruments, the reconfigurable logic device comprising a plurality of pipelined data processing blocks deployed in firmware logic on the reconfigurable logic device, the pipelined data processing blocks comprising:

an address resolution block;

a record retrieval block downstream from the address resolution block; and a field updating block downstream from the record retrieval block;

wherein the address resolution block is configured to (1) retrieve a plurality of second memory financial instrument records from the second memory based on the symbol identifiers, the retrieved second memory financial instrument records corresponding to the financial instruments which correspond to the symbol identifiers, and (2) process the retrieved second memory financial instrument records to resolve the first memory addresses corresponding to the pointer information in the retrieved second memory financial instrument records;

wherein the record retrieval block is configured to retrieve a plurality of first memory financial instrument records from the first memory based on the resolved first memory addresses; and wherein the field updating block is configured to generate a plurality of updates for a plurality of the fields of the retrieved first memory financial instrument records based on the financial market data in a plurality of the message fields for the messages corresponding to the financial instruments which correspond to the retrieved first memory financial instrument records; and wherein the address resolution block, the record retrieval block, and the field updating block are configured to operate simultaneously with respect to each other in a pipelined fashion.

4. The device of claim 3 further comprising:

an application programming interface (API) and customer-supplied application software in communication with the reconfigurable logic device, and wherein the customer-supplied application software is configured to (1) receive data representative of the generated updates from the reconfigurable logic device via the API and (2) further process the received data.

5. The device of claim 3 further comprising a third memory, the third memory comprising a cache memory configured to store a plurality of cached financial instrument records at a plurality of third memory addresses, each cached financial instrument record corresponding to a financial instrument and comprising financial market data for its corresponding financial instrument, and wherein the reconfigurable logic device is further configured to cache the retrieved first memory financial instrument records in the third memory.

6. The device of claim 5 wherein the pipelined data processing blocks further comprise a cache determination block downstream from the address resolution block and upstream from the record retrieval block, the cache determination block configured to (1) process the resolved first memory addresses for the retrieved second memory financial instrument records to determine whether a most up-to-date record for the financial instrument corresponding to each retrieved second memory financial instrument record is located in the first memory or the third memory, and (2) provide the record retrieval block with addresses in the first and third memories where the most up-to-date records for the financial instruments corresponding to the retrieved second memory financial instruments are stored;

wherein the record retrieval block is further configured to retrieve a plurality of third memory financial instrument records from the third memory based on the third memory addresses provided by the cache determination block; and wherein the address resolution block, the cache determination block, the record retrieval block, and the field updating block are configured to operate simultaneously with respect to each other in a pipelined fashion.

7. The device of claim 6 wherein the pipelined data processing blocks further comprise a record updating block downstream from the field updating block, the record updating block configured to update the first memory in accordance with the generated updates; and wherein the address resolution block, the cache determination block, the record retrieval block, the field updating block, and the record updating block are configured to operate simultaneously with respect to each other in a pipelined fashion.

8. The device of claim 6 further comprising a plurality of processing buffers, wherein the record retrieval block is further configured to load the retrieved first and third memory financial instrument records into the processing buffers, wherein the field updating block is configured to read from the processing buffers to determine the financial instrument records for which the updates are to be generated, and wherein the third memory and the processing buffers are located in the same memory space.

9. The device of claim 5 wherein the first memory financial instrument records comprise a plurality of regional financial instrument records and a plurality of composite financial instrument records, each regional financial instrument record corresponding to a financial instrument and comprising financial market data that is specific to a particular exchange on which its corresponding financial instrument is traded, each composite financial instrument record corresponding to a financial instrument and comprising financial market data that is general to all exchanges on which its corresponding financial instrument is traded;

wherein the second financial instrument records corresponding to financial instruments that are traded on multiple exchanges comprise pointer information for the regional and composite financial instrument records;

wherein the processed data further comprises a plurality of exchange identifiers for the messages;

wherein the address resolution block is further configured to resolve a plurality of first memory addresses where the regional and composite financial instrument records for the financial instruments corresponding to a plurality of retrieved second memory financial instrument records are stored based on the symbol identifiers and the exchange identifiers; and wherein the field updating block comprises a plurality of regional update engines and a plurality of composite update engines that are configured to generate, in parallel, a plurality of regional and composite field updates for the retrieved first memory financial instrument records.

10. The device of claim 9 wherein the first memory is further configured to store a plurality of regional list blocks at a plurality of first memory addresses, each regional list block corresponding to a financial instrument that is traded on multiple exchanges and comprising (1) a global exchange identifier for each exchange on which the corresponding financial instrument is traded, and (2) pointer information, in association with the global exchange identifiers, to the regional financial instrument records for the corresponding financial instruments, and wherein the address resolution block is further configured to process the regional block lists to determine the pointer information associated with the global exchange identifiers that match the messages' exchange identifiers.

11. The device of claim 5 wherein the third memory is internal to the reconfigurable logic device.

12. The device of claim 3 wherein the reconfigurable logic device further comprises a firmware application module (FAM) pipeline, the FAM pipeline comprising a symbol mapping FAM and a last value cache (LVC) updating FAM downstream from the symbol mapping FAM;

wherein the LVC updating FAM comprises the address resolution block, the record retrieval block, and the field updating block;

wherein the symbol mapping FAM is configured to (1) receive at least a plurality of financial market data messages corresponding to financial instruments for which there is a record in the first and second memories, each received financial market data message comprising a string for identifying that message's corresponding financial instrument, and (2) map each string to an address in the second memory where the second memory financial instrument record corresponding to the financial instrument identified by that string, the mapped addresses comprising the symbol identifiers for use by the address resolution block to retrieve the second memory financial instrument records; and wherein the LVC updating FAM and the symbol mapping FAM are configured to operate simultaneously with respect to each other in a pipelined fashion.

13. The device of claim 3 wherein the first memory financial instrument records comprise a plurality of regional financial instrument records and a plurality of composite financial instrument records, each regional financial instrument record corresponding to a financial instrument and comprising financial market data that is specific to a particular exchange on which its corresponding financial instrument is traded, each composite financial instrument record corresponding to a financial instrument and comprising financial market data that is general to all exchanges on which its corresponding financial instrument is traded;

wherein the second financial instrument records corresponding to financial instruments that are traded on multiple exchanges comprise pointer information for the regional and composite financial instrument records;

wherein the processed data further comprises a plurality of exchange identifiers for the messages; and wherein the address resolution block is further configured to resolve a plurality of first memory addresses where the regional and composite financial instrument records for the financial instruments corresponding to a plurality of retrieved second memory financial instrument records are stored based on the symbol identifiers and the exchange identifiers; and wherein the field updating block comprises a plurality of regional update engines and a plurality of composite update engines that are configured to generate, in parallel, a plurality of regional and composite field updates for the retrieved first memory financial instrument records.

14. The device of claim 13 wherein the first memory is further configured to store a plurality of regional list blocks at a plurality of first memory addresses, each regional list block corresponding to a financial instrument that is traded on multiple exchanges and comprising (1) a global exchange identifier for each exchange on which the corresponding financial instrument is traded, and (2) pointer information, in association with the global exchange identifiers, to the regional financial instrument records for the corresponding financial instruments, and wherein the address resolution block is further configured to process the regional block lists to determine the pointer information associated with the global exchange identifiers that match the messages' exchange identifiers.

15. The device of claim 14 wherein the address resolution block comprises a plurality of pipelined sub-blocks, the sub-blocks comprising:

a first sub-block configured to issue a stream of read commands to the second memory to retrieve the second memory financial instrument records based on the symbol identifiers;

a second sub-block configured to (1) process the second memory financial instrument records returned from the second memory in response to the second memory read commands, and (2) issue a stream of read commands to the first memory to retrieve the regional list blocks corresponding to the processed second memory financial instrument records;

a third sub-block configured to (1) process the regional list blocks returned from the first memory in response to the first memory read commands and (2) resolve first memory addresses from the pointer information for the regional financial instrument records corresponding to the messages; and a fourth sub-block configured to output the first memory addresses for the regional and composite financial instrument records corresponding to the retrieved second memory financial instrument records and the retrieved regional list blocks; and wherein the first, second, third, and fourth sub-blocks are configured to operate simultaneously with respect to each other in a pipelined fashion.

16. The device of claim 13 further comprising a composite record buffer, a message buffer, and a regional record buffer, the composite record buffer configured to store data representative of the retrieved composite financial instrument records, the message buffer configured to store financial market data representative of the messages, and the regional record buffer configured to store data representative of the retrieved regional financial instrument records;

wherein the regional update engines are configured to read from the message buffer and the regional record buffer to generate the regional field updates; and wherein the composite update engines are configured to read from the message buffer and the composite record buffer to generate the composite field updates.

17. The device of claim 3 wherein the first memory is external to the reconfigurable logic device.

18. The device of claim 17 wherein the second memory is external to the reconfigurable logic device.

19. The device of claim 17 wherein the second memory is internal to the reconfigurable logic device.

20. The device of claim 3 wherein the first memory is internal to the reconfigurable logic device.

21. The device of claim 3 wherein the second memory is external to the reconfigurable logic device.

22. The device of claim 3 wherein the second memory is internal to the reconfigurable logic device.

23. The device of claim 3 wherein the reconfigurable logic device comprises a field programmable gate array (FPGA), and wherein the address resolution block, the record retrieval block, and the field updating block are configured to perform their respective operations at hardware processing speeds.

24. The method of claim 3 further comprising:

the reconfigurable logic device caching a plurality of retrieved first memory financial instrument records in a third memory at a plurality of third memory addresses, each cached financial instrument record corresponding to a financial instrument and comprising financial market data for its corresponding financial instrument.

25. The method of claim 24 wherein the pipelined data processing blocks further comprise a cache determination block downstream from the address resolution block and upstream from the record retrieval block, and wherein the processing step further comprises:

the cache determination block (1) processing the resolved first memory addresses for the retrieved second memory financial instrument records to determine whether a most up-to-date record for the financial instrument corresponding to each retrieved second memory financial instrument record is located in the first memory or the third memory, and (2) providing the record retrieval block with addresses in the first and third memories where the most up-to-date records for the financial instruments corresponding to the retrieved second memory financial instruments are stored;

the record retrieval block retrieving a plurality of third memory financial instrument records from the third memory based on the third memory addresses provided by the cache determination block; and wherein the address resolution block, the cache determination block, the record retrieval block, and the field updating block perform their respective steps simultaneously with respect to each other in a pipelined fashion.

26. The method of claim 25 wherein the pipelined data processing blocks further comprise a record updating block downstream from the field updating block, and wherein the processing step further comprises:

the record updating block updating the first memory in accordance with the generated updates; and wherein the address resolution block, the cache determination block, the record retrieval block, the field updating block, and the record updating block perform their respective steps simultaneously with respect to each other in a pipelined fashion.

27. The method of claim 25 wherein the processing step further comprises:

the record retrieval block loading the retrieved first and third memory financial instrument records into s plurality of processing buffers; and the field updating block reading from the processing buffers to determine the financial instrument records for which the updates are to be generated; and wherein the third memory and the processing buffers are located in the same memory space.

28. The method of claim 24 wherein the first memory financial instrument records comprise a plurality of regional financial instrument records and a plurality of composite financial instrument records, each regional financial instrument record corresponding to a financial instrument and comprising financial market data that is specific to a particular exchange on which its corresponding financial instrument is traded, each composite financial instrument record corresponding to a financial instrument and comprising financial market data that is general to all exchanges on which its corresponding financial instrument is traded;

wherein the second financial instrument records corresponding to financial instruments that are traded on multiple exchanges comprise pointer information for the regional and composite financial instrument records;

wherein the streaming data further comprises a plurality of exchange identifiers for the messages;

wherein the field updating block comprises a plurality of regional update engines and a plurality of composite update engines; and wherein the processing step further comprises:

the address resolution block resolving a plurality of first memory addresses where the regional and composite financial instrument records for the financial instruments corresponding to a plurality of retrieved second memory financial instrument records are stored based on the symbol identifiers and the exchange identifiers; and the regional and composite update engines generating, in parallel, a plurality of regional and composite field updates for the retrieved first memory financial instrument records.

29. The method of claim 28 further comprising:

storing a plurality of regional list blocks in the first memory at a plurality of first memory addresses, each regional list block corresponding to a financial instrument that is traded on multiple exchanges and comprising (1) a global exchange identifier for each exchange on which the corresponding financial instrument is traded, and (2) pointer information, in association with the global exchange identifiers, to the regional financial instrument records for the corresponding financial instruments; and wherein the processing step further comprises the address resolution block processing the regional block lists to determine the pointer information associated with the global exchange identifiers that match the messages' exchange identifiers.

30. The method of claim 24 wherein the third memory is internal to the reconfigurable logic device.

31. The method of claim 1 wherein the reconfigurable logic device further comprises a firmware application module (FAM) pipeline, the FAM pipeline comprising a symbol mapping FAM and a last value cache (LVC) updating FAM downstream from the symbol mapping FAM;

wherein the LVC updating FAM comprises the address resolution block, the record retrieval block, and the field updating block; and wherein the processing step further comprises the symbol mapping FAM (1) receiving at least a plurality of financial market data messages corresponding to financial instruments for which there is a record in the first and second memories, each received financial market data message comprising a string for identifying that message's corresponding financial instrument, and (2) mapping each string to an address in the second memory where the second memory financial instrument record corresponding to the financial instrument identified by that string, the mapped addresses comprising the symbol identifiers for use by the address resolution block to retrieve the second memory financial instrument records; and wherein the LVC updating FAM and the symbol mapping FAM perform their respective steps simultaneously with respect to each other in a pipelined fashion.

32. The method of claim 1 wherein the first memory financial instrument records comprise a plurality of regional financial instrument records and a plurality of composite financial instrument records, each regional financial instrument record corresponding to a financial instrument and comprising financial market data that is specific to a particular exchange on which its corresponding financial instrument is traded, each composite financial instrument record corresponding to a financial instrument and comprising financial market data that is general to all exchanges on which its corresponding financial instrument is traded;

wherein the second financial instrument records corresponding to financial instruments that are traded on multiple exchanges comprise pointer information for the regional and composite financial instrument records;

wherein the streaming data further comprises a plurality of exchange identifiers for the messages; and wherein the field updating block comprises a plurality of regional update engines and a plurality of composite update engines; and wherein the processing step further comprises:

the address resolution block resolving a plurality of first memory addresses where the regional and composite financial instrument records for the financial instruments corresponding to a plurality of retrieved second memory financial instrument records are stored based on the symbol identifiers and the exchange identifiers; and the regional and composite update engines generating, in parallel, a plurality of regional and composite field updates for the retrieved first memory financial instrument records.

33. The method of claim 32 further comprising:

storing a plurality of regional list blocks in the first memory at a plurality of first memory addresses, each regional list block corresponding to a financial instrument that is traded on multiple exchanges and comprising (1) a global exchange identifier for each exchange on which the corresponding financial instrument is traded, and (2) pointer information, in association with the global exchange identifiers, to the regional financial instrument records for the corresponding financial instruments; and wherein the processing step further comprises the address resolution block processing the regional block lists to determine the pointer information associated with the global exchange identifiers that match the messages' exchange identifiers.

34. The method of claim 33 wherein the address resolution block comprises a plurality of pipelined sub-blocks, the sub-blocks comprising first sub-block, a second sub-block downstream from the first sub-block, a third sub-block downstream from the second sub-block, and a fourth sub-block downstream from the third sub-block; and wherein the processing steps further comprise:

the first sub-block issuing a stream of read commands to the second memory to retrieve the second memory financial instrument records based on the symbol identifiers;

the second sub-block (1) processing the second memory financial instrument records returned from the second memory in response to the second memory read commands, and (2) issuing a stream of read commands to the first memory to retrieve the regional list blocks corresponding to the processed second memory financial instrument records;

the third sub-block (1) processing the regional list blocks returned from the first memory in response to the first memory read commands and (2) resolving the pointer information for the regional financial instrument records corresponding to the messages; and the fourth sub-block outputting the first memory addresses for the regional and composite financial instrument records corresponding to the retrieved second memory financial instrument records and the retrieved regional list blocks; and wherein the first, second, third, and fourth sub-blocks perform their respective steps simultaneously with respect to each other in a pipelined fashion.

35. The method of claim 32 further comprising:

storing data representative of the retrieved composite financial instrument records in a composite record buffer;

storing financial market data representative of the messages in a message buffer;

storing data representative of the retrieved regional financial instrument records in a regional record buffer;

the regional update engines reading from the message buffer and the regional record buffer to generate the regional field updates; and the composite update engines reading from the message buffer and the composite record buffer to generate the composite field updates.

36. The method of claim 1 wherein the first memory is external to the reconfigurable logic device.

37. The method of claim 36 wherein the second memory is external to the reconfigurable logic device.

38. The method of claim 36 wherein the second memory is internal to the reconfigurable logic device.

39. The method of claim 1 wherein the first memory is internal to the reconfigurable logic device.

40. The method of claim 1 wherein the second memory is external to the reconfigurable logic device.

41. The method of claim 1 wherein the second memory is internal to the reconfigurable logic device.

42. The method of claim 1 wherein the reconfigurable logic device comprises a field programmable gate array (FPGA), and wherein the address resolution block, the record retrieval block, and the field updating block perform their respective steps at hardware processing speeds.

* * * * *